(12) United States Patent
Lee et al.

(10) Patent No.: US 8,127,317 B2
(45) Date of Patent: Feb. 28, 2012

(54) DISC CHANGER

(75) Inventors: Chi Wei Lee, Singapore (SG); Mum Pew Ng, Singapore (SG); Mok Tiong Tan, Singapore (SG); Rico Paolo O. Ramirez, Singapore (SG); Masahiko Nakamura, Singapore (SG); Soon Han Poo, Singapore (SG); Lay Ghee Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 12/090,690

(22) PCT Filed: Oct. 16, 2006

(86) PCT No.: PCT/JP2006/320987
§ 371 (c)(1),
(2), (4) Date: Dec. 4, 2008

(87) PCT Pub. No.: WO2007/046514
PCT Pub. Date: Apr. 26, 2007

(65) Prior Publication Data
US 2009/0122661 A1 May 14, 2009

(30) Foreign Application Priority Data
Oct. 18, 2005 (SG) ............................ 200506742-6

(51) Int. Cl.
*G11B 17/03* (2006.01)
*G11B 17/04* (2006.01)
*G11B 33/02* (2006.01)
*G11B 21/08* (2006.01)
*G11B 7/085* (2006.01)

(52) U.S. Cl. ................................... 720/614; 369/30.92

(58) Field of Classification Search .................. 720/607, 720/608, 610, 614, 615; 369/30.92–30.99
See application file for complete search history.

(56) References Cited

U.S. PATENT DOCUMENTS
| | | | |
|---|---|---|---|
| 6,031,811 A | 2/2000 | Umesaki et al. | |
| 2003/0161225 A1* | 8/2003 | Morioka et al. | 369/30.85 |
| 2004/0183852 A1* | 9/2004 | Yoshida et al. | 347/22 |

FOREIGN PATENT DOCUMENTS
| | | |
|---|---|---|
| EP | 1 341 170 | 9/2003 |
| JP | 3-216857 | 9/1991 |

OTHER PUBLICATIONS

International Search Report issued Dec. 18, 2006 in the International (PCT) Application of which the present application is the U.S. National Stage.
Written Opinion of the International Searching Authority issued Dec. 18, 2006 in PCT/JP2006/320987.

* cited by examiner

*Primary Examiner* — Daniell L Negron
*Assistant Examiner* — Adam B Dravininkas
(74) *Attorney, Agent, or Firm* — Wenderoth, Lind & Ponack, L.L.P.

(57) ABSTRACT

The invention provides a disc changer including a plurality of trays which can be moved respectively in a horizontal direction, a tray driving gear unit capable of shuttling the trays between a standby position and a disc exchange position, a gear driving mechanism for driving the tray driving gear unit, a tray triggering unit capable of locking/unlocking the trays in the standby position, pushing all trays to engage with the tray driving gear unit after unlocking the trays, and driving the trays toward the disc exchange position, wherein the tray driving gear unit can be used for checking the discs by driving all trays to protrude outward from the mechanical chassis to the disc exchange position, and can drive the trays individually from the disc exchange position to the standby position from top to bottom, thereby each disc can be checked until its tray is closed.

8 Claims, 75 Drawing Sheets

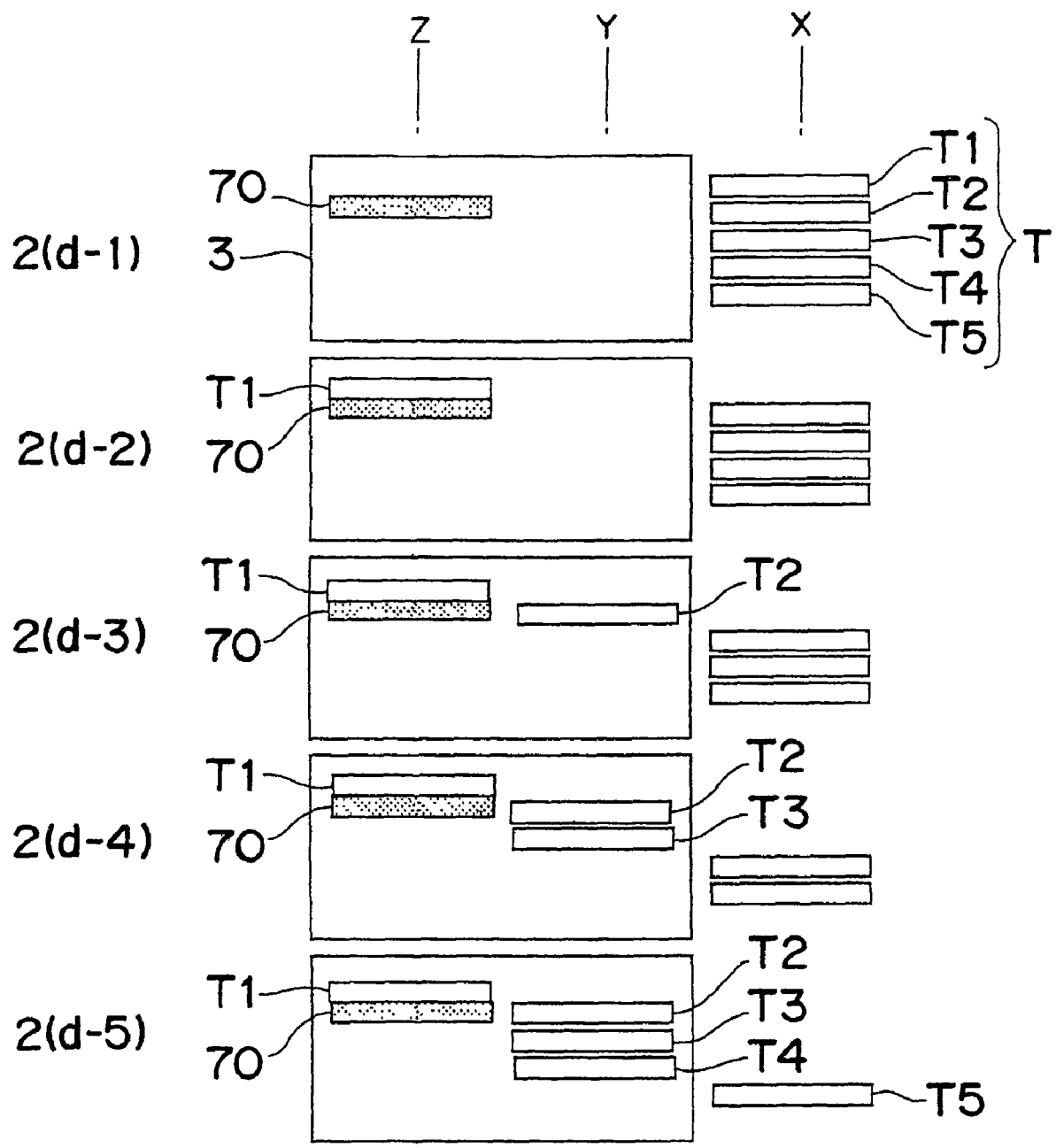

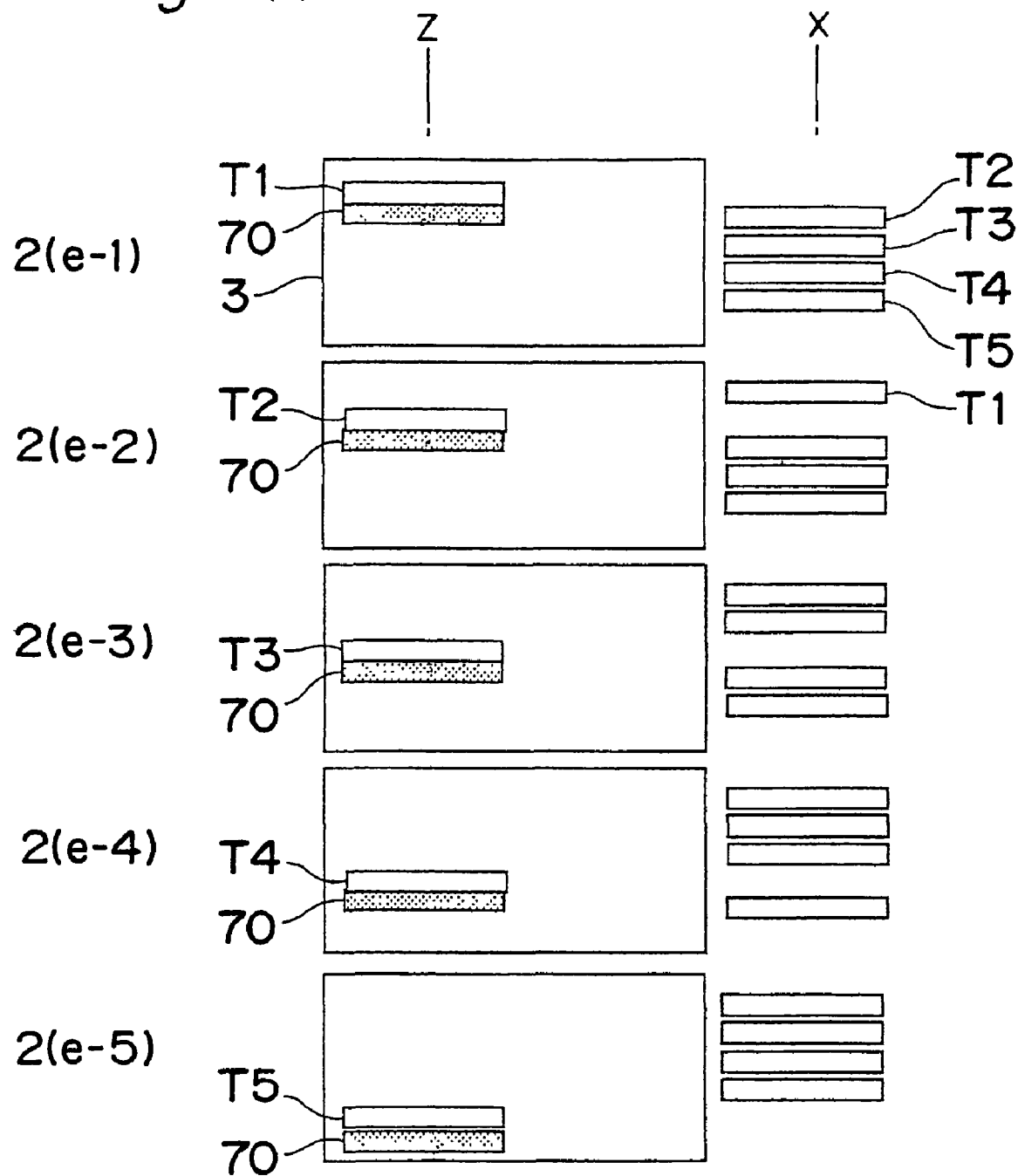

REAR ← → FRONT

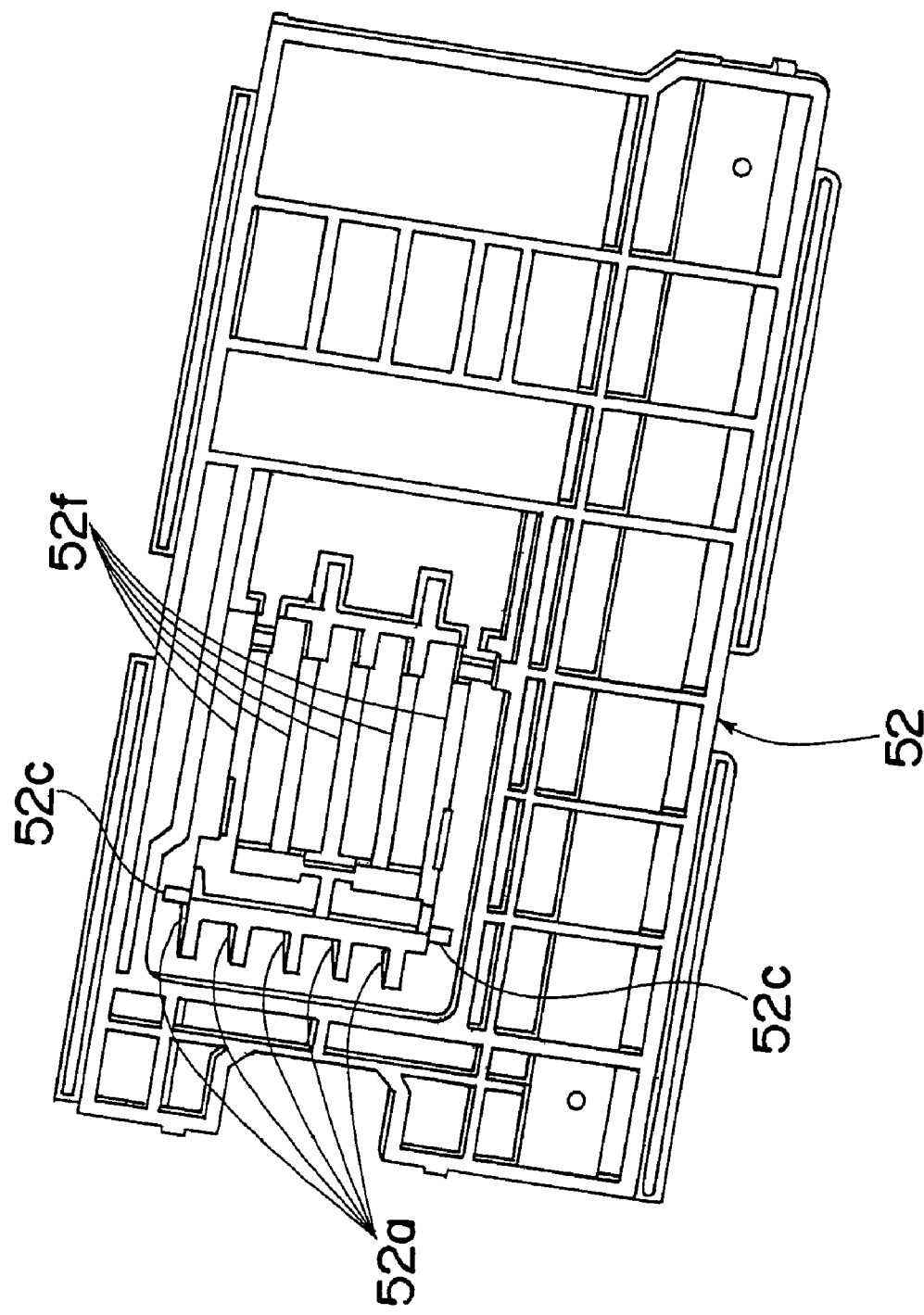

Disc exchanging position →

Return to standby position ←

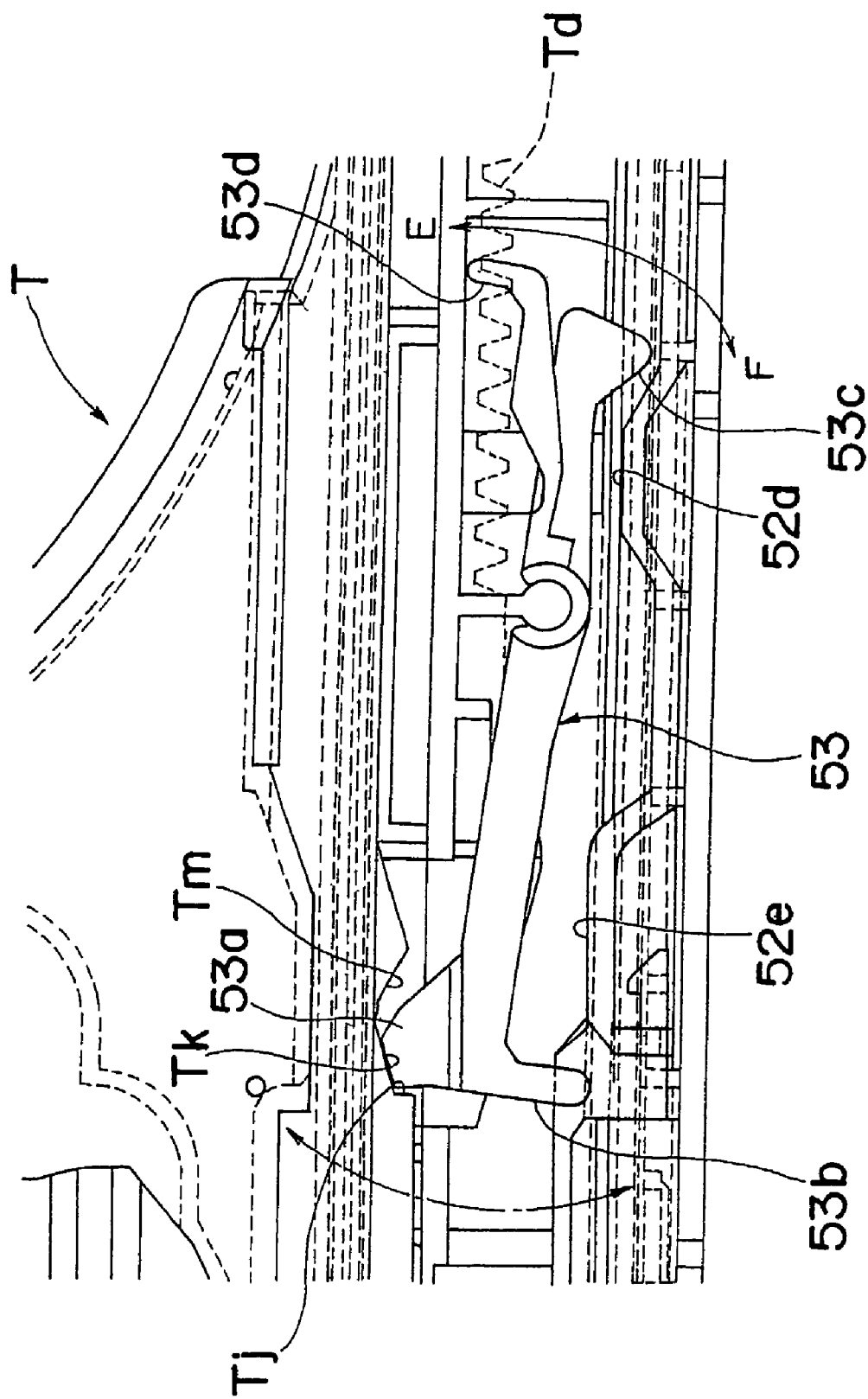

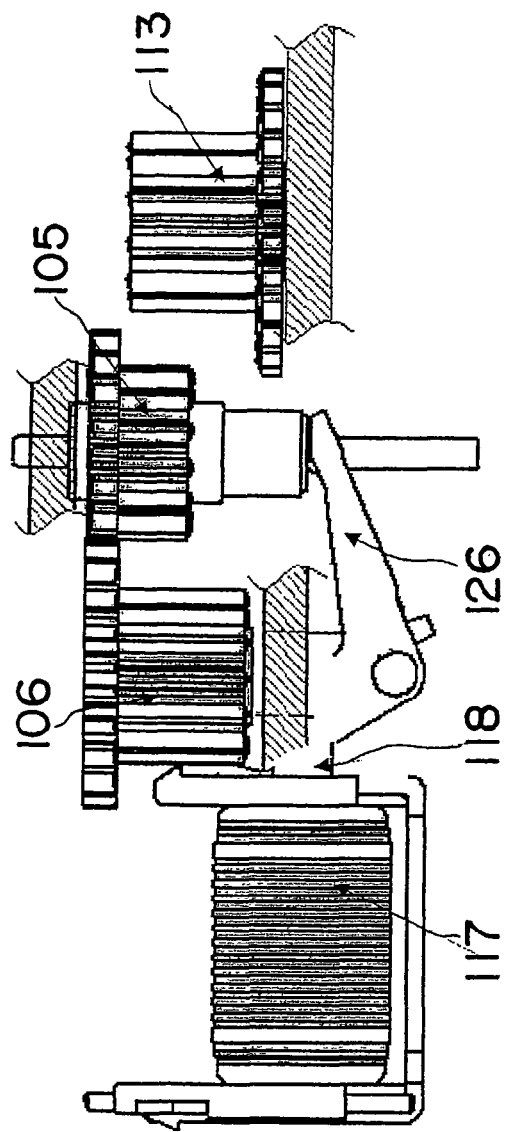
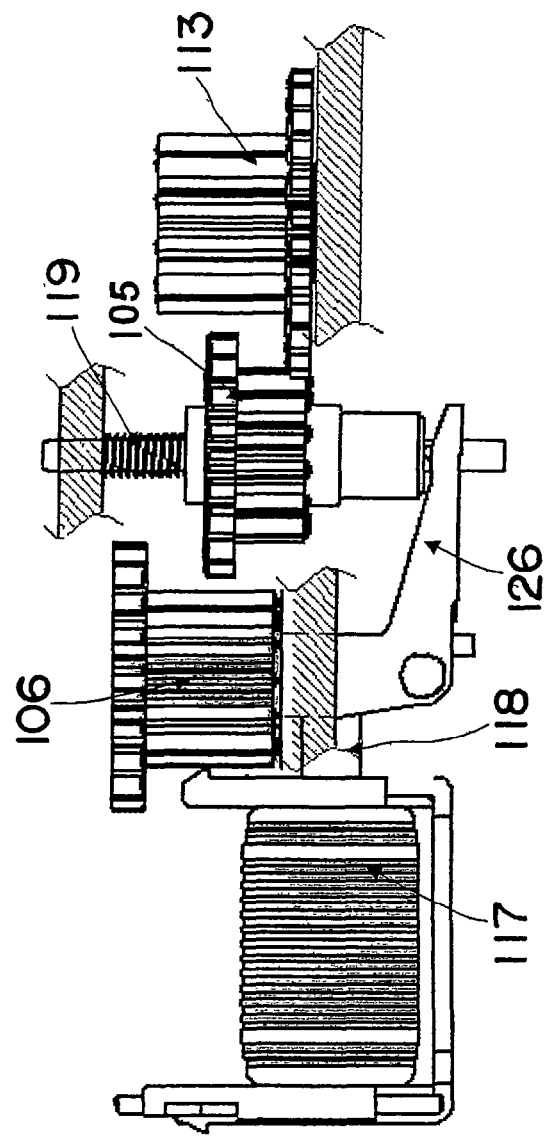
Fig. 25(a)
Fig. 25(b)

*Fig.28* (a)
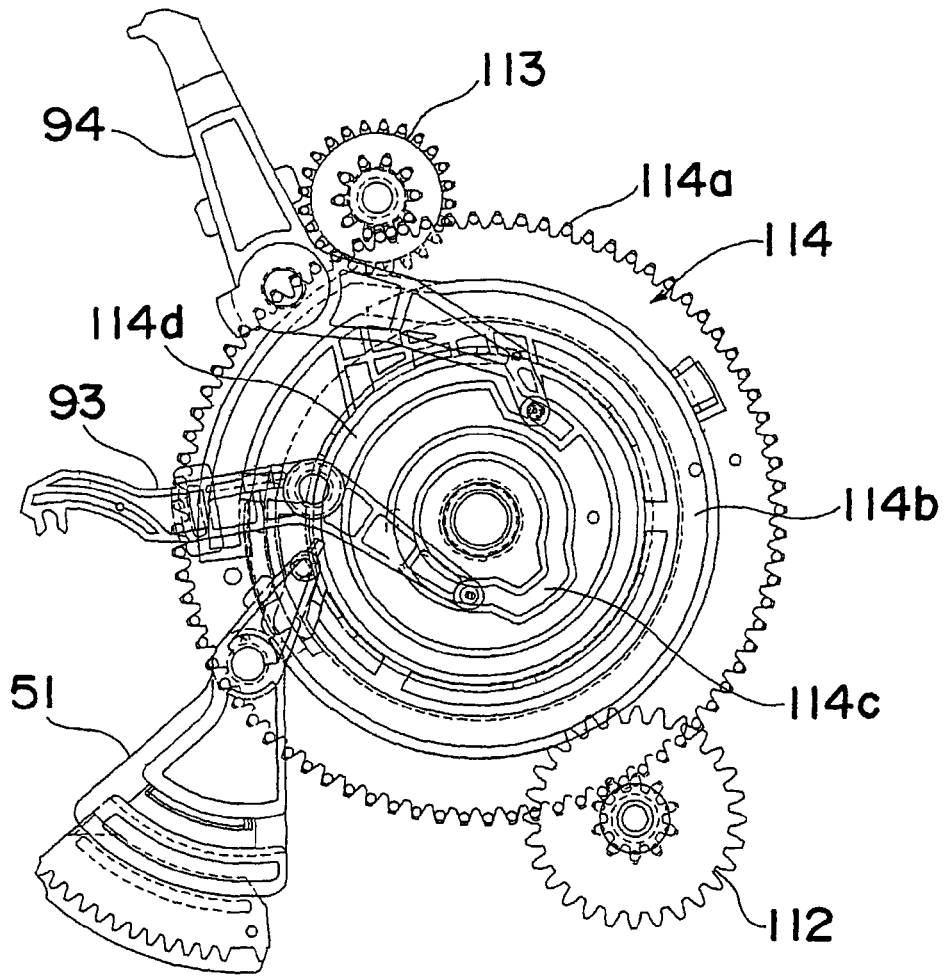
*Fig.*28(b)
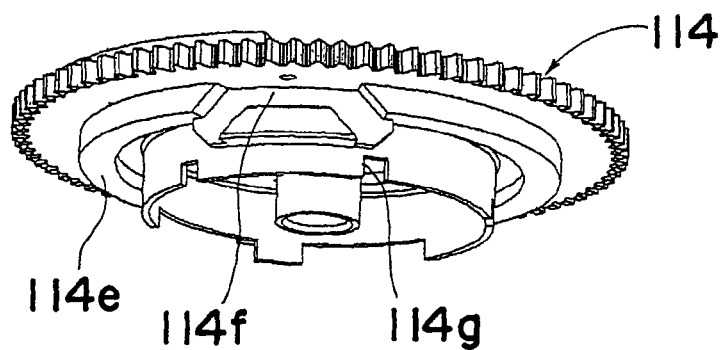

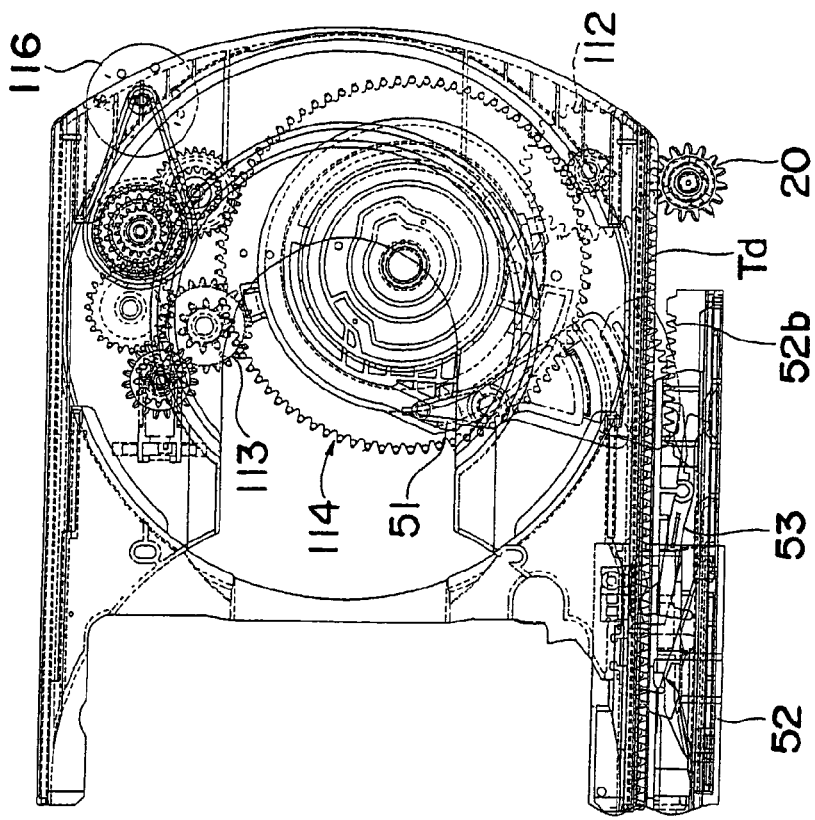
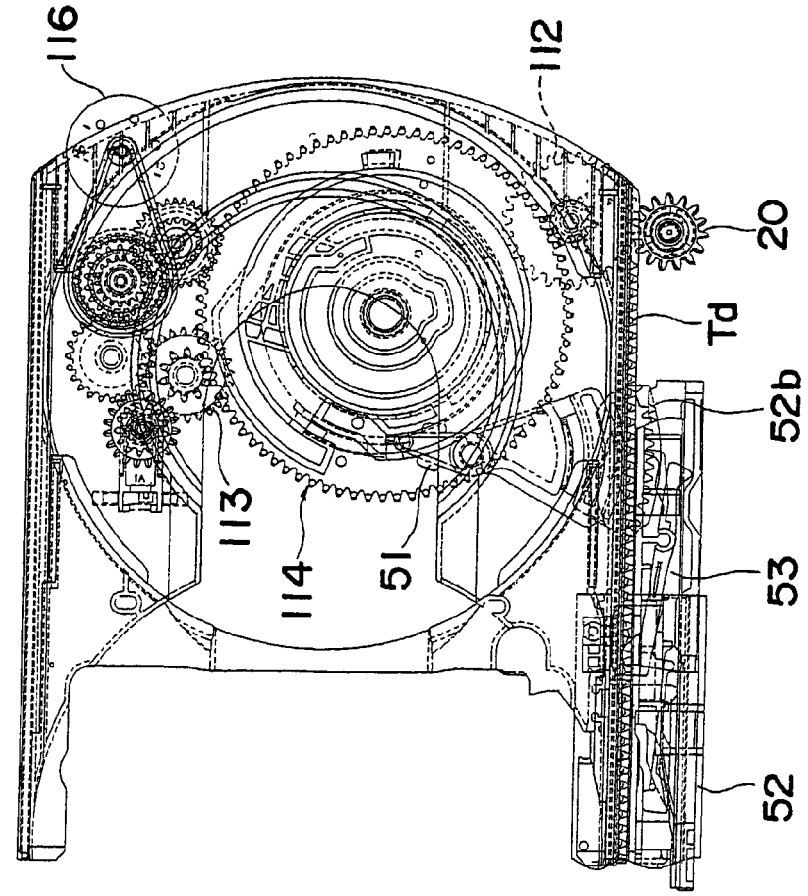

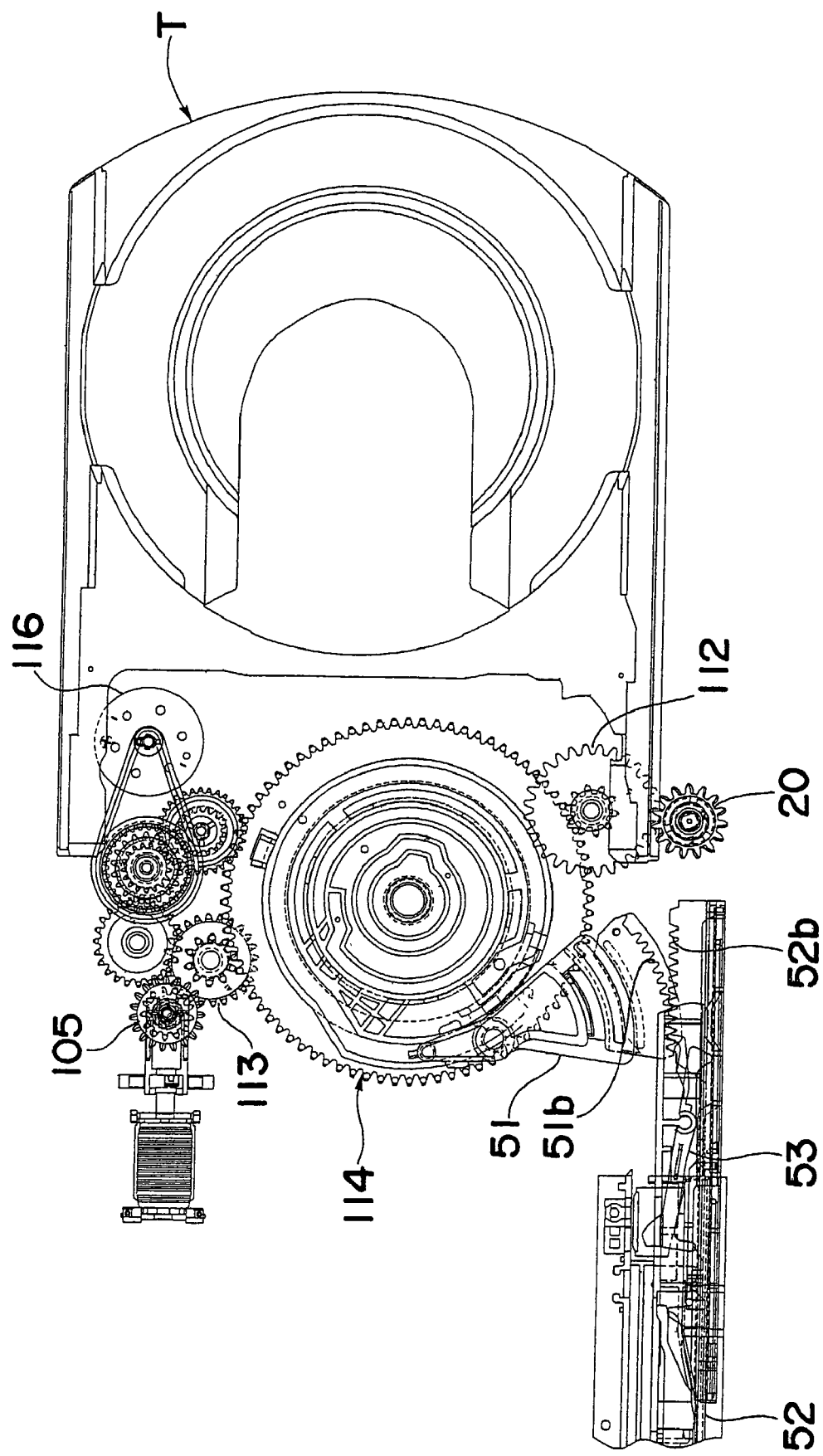

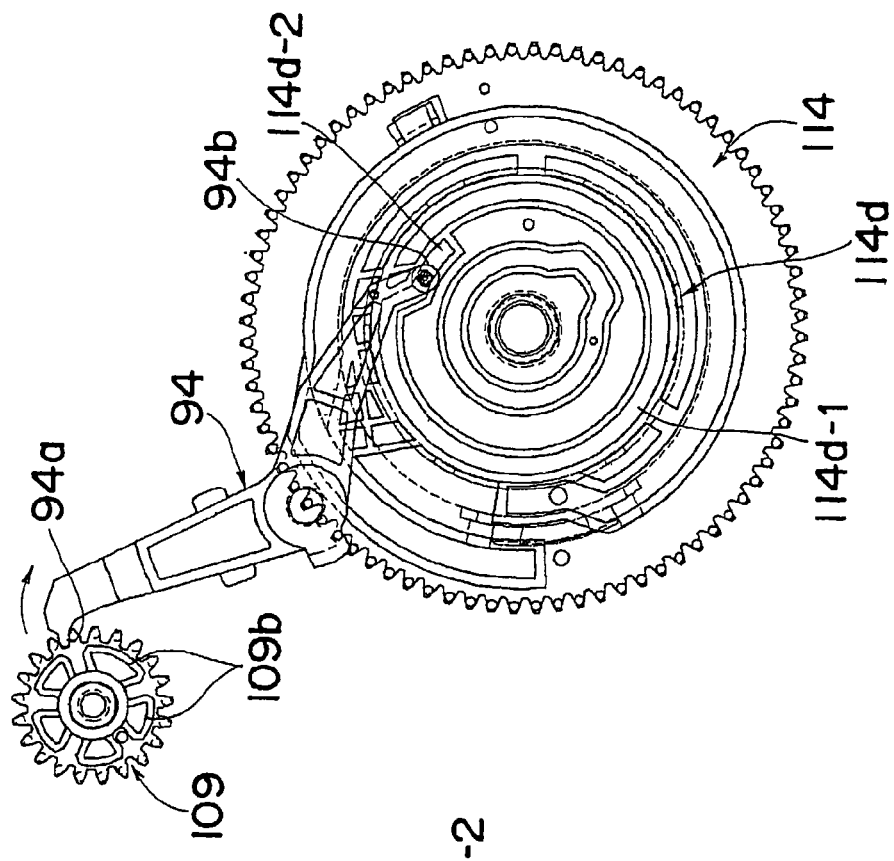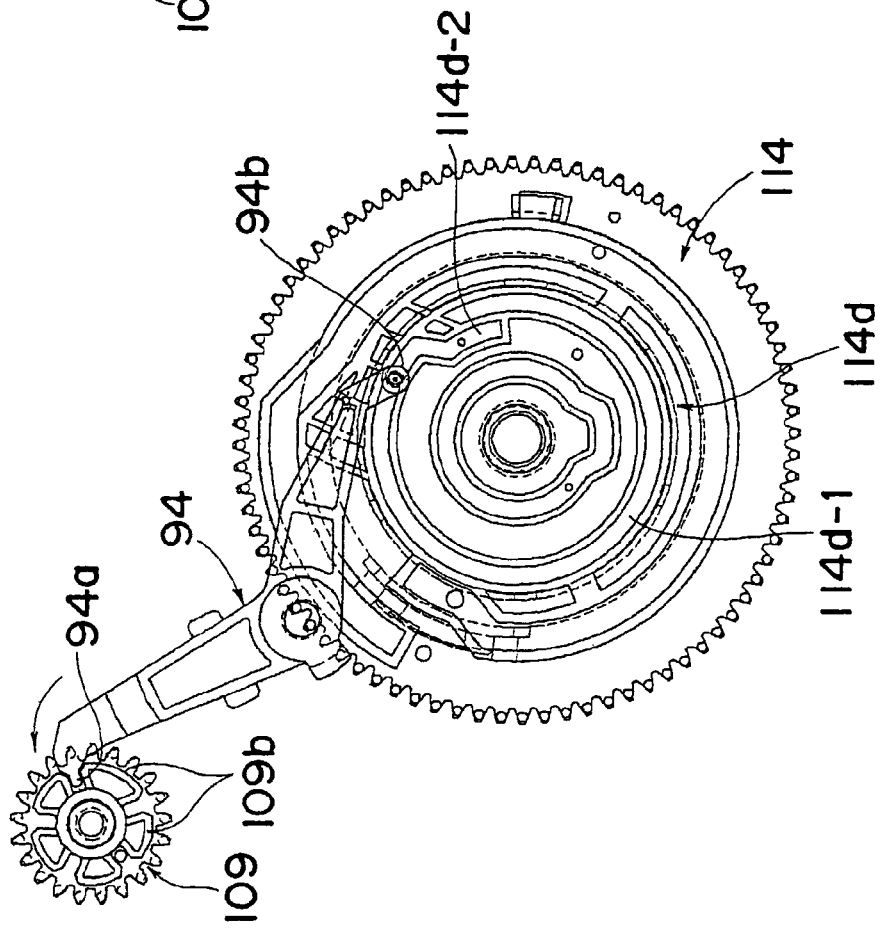

| POSITION | OPERATION | |
|---|---|---|
| | Rotate Clockwise | Rotate Counter-Clockwise |
| A | Tray driving gear unit RESET (tray no movement) | Drive tray 2 to 4 to disc standby |
| B | Trigger slide plate trigger trays | Trigger slide plate return |
| C | Drive tray to disc exchanging position | Drive tray 1 to disc standby position |

Fig.62

| Changer Operation Position/condition | Select tray to recording/reproducing section | Drive tray to recording/reproducing section | Disc at recording/reproducing operation (clamped) |
|---|---|---|---|
| Cam gear position | Home Position | Play Driving | Home Position |
| Connected gear train | Elevation system | Tray play/stock system | Tray open/close system |
| Lock lever 1 condition | Lock | Unlock | Lock |
| Lock lever 2 condition | Unlock | Lock | Unlock |
| Transverse slide plate pin | Away from UD rack R | Away from UD rack R | Lock UD rack R |

DISC CHANGER

TECHNICAL FIELD

The present invention relates to a disc changer, particularly but not exclusively to a disc changer that stores a plurality of discs therein, transports a disc selected from a plurality of discs, and performs recording and/or reproducing information signal on the disc. In the specification, the wording of "recording/reproducing an information signal on a disc" refers to "at least one of recording an information signal on a disc and reproducing an information signal from a disc" as an abbreviated form of expression.

BACKGROUND ART

A conventional disc changer normally has a plurality of trays housed within a casing, with each tray arranged to carry an optical disc. In one known type, the disc changer includes a single selected tray or a main tray with a selected sub tray and by depressing an eject button the main tray carries the sub tray to move from a standby position within the casing to protrude outward to a disc exchange position for inputting or exchange of a disc. A disc can then be placed on the sub tray which, upon receiving a suitable signal, carries the disc together with the main tray into the standby position. At the standby position, the sub tray departs from the main tray to carry the disc to a storage rack within the casing which can hold a plurality of disc to be played. With this configuration, only one disc can be input or exchanged at a time, and to load a disc or replace a disc, each of the rest of the trays have to be ejected individually transported by the main tray. This can greatly inconvenience an end user since, more often than not, after keeping the discs inside the disc changer for a period of time, the user would not be able to remember the correct arrangement of the discs inside the disc changer and to find out, it will be necessary to inspect the contents of each tray.

Another known type of disc changer has a number of sub-trays arranged on a main tray and the main tray is used to transport all the sub-trays to a disc exchange position. However, it is necessary to have a main tray which increases manufacturing costs of the disc changer and loading and replacement of disc are still inconvenient. Further, returning of each tray to its standby position within the casing is inefficient.

Some disc changers include a "Disc Check" function which allows a number of trays to be ejected at different distances away from the casing so that the trays partially overlap each other. This allows the content of the trays to be checked. However, this method is suitable only if the disc changer has a few trays and further, such a function does not allow discs to be loaded/replaced.

Further, in the conventional disc changers mentioned above, when the trays are at the standby position waiting to carry a selected disc to a position for reproducing/recording operation, the tray is engaged with a tray drive gear train, and kept in this position only by friction force of the gear train engagement and a tension of a motor belt. Consequently, the trays are not held securely and misalignment of the trays can occur if the disc changer is transported when the trays are in such a position.

If a locking device is provided to lock all the trays, an additional driving source is needed to unlock the locking state prior to drive the trays. In general, a complicated design is needed to lock the trays. As a locking device in a conventional disc changer usually needs some time to activate the locking function, a shifting of the tray from its standby position easily happens during the tray "non-lock" period. This problem is exacerbated when the "non-lock" period is long, and occurs many times during the disc changer operating period.

SUMMARY OF INVENTION

The present invention has been developed in view of the aforementioned technical problems and aims to provide a new and useful disc changer device. A preferred embodiment of the invention is a disc changer capable of ejecting all trays from the standby position to a disc exchange position where the discs can be exchanged, and capable also of closing the trays one by one from top tray to bottom one. Furthermore, the preferred embodiment makes it possible to check directly and visually the discs stored inside the disc changer automatically with a single button operation.

According to a first aspect of the present invention, there is provided a disc changer for storing a plurality of discs, transporting a disc selected from the plurality of discs, and performing recording/reproducing information signal on the disc, the disc changer comprising: a plurality of trays which respectively can be loaded with discs, can be moved substantially in a horizontal direction parallel to main surfaces of the discs, and are stacked substantially in a vertical direction perpendicular to the main surfaces of the discs; a tray driving gear unit capable of shuttling the trays between a standby position in which the trays are stored in a mechanical chassis as a housing of the disc changer and a disc exchange position in which the trays are protruded outward from the mechanical chassis thereby the discs can be put on the trays and removed form the trays; a gear driving mechanism driven by an electrical motor to generate driving force for driving the tray driving gear unit; a tray triggering unit capable of locking/unlocking the trays in the standby position, the unit capable of pushing all trays to engage with the tray driving gear unit after unlocking the trays and capable of driving the trays outward from the mechanical chassis toward the disc exchange position; a recording/reproducing unit for recording and/or reproducing information signal on a disc placed on a turntable; and an elevation unit capable of moving the recording/reproducing unit with the turntable in a vertical direction to align the recording/reproducing unit to a tray and place a disc on the tray onto the turntable; wherein the tray driving gear unit is commonly used for checking the discs by driving all trays to protrude outward from the mechanical chassis to the disc exchange position, the tray driving gear unit is capable of individually driving the trays from the disc exchange position to the standby position from top to bottom in a operation of closing discs, and each disc can be checked until it is closed.

According to the configuration of the first aspect of the invention, the tray driving gear unit is capable of driving the trays from the standby position to the disc exchange position with an all-at-once operation. At this time all tray driving gears of the tray driving gear unit rotate in a tray opening direction as one solid gear for driving the plurality of trays. Further, when the tray driving unit rotates in an opposite direction the trays are driven one by one from the top tray to the bottom tray. Thus, it is possible to eject all trays at once, and exchange all discs from the top tray to bottom tray. This simplifies the operation of exchanging all discs in the disc changer. While all the trays are protruding, all the discs can be checked at all time. The same tray driving gear unit is commonly used for both shuttling the trays between the standby position and the disc exchange position and disc checking function, thereby it is possible to simplify the design of the tray driving gear unit, simplify the disc changer operation, shorten the changing time and reduce the possibility of tray jams.

Further, in a second aspect of the present invention, there is provided a disc changer for storing a plurality of discs, transporting a disc selected from the plurality of discs, and performing recording/reproducing information signal on the disc, the disc changer comprising: a plurality of trays which respectively can be loaded with discs, can be moved substantially in a horizontal direction parallel to main surfaces of the discs, and are stacked substantially in a vertical direction perpendicular to the main surfaces of the discs; a tray driving gear unit capable of shuttling the trays between a standby position in which the trays are stored in a mechanical chassis as a housing of the disc changer and a disc exchange position in which the trays are protruded outward from the mechanical chassis thereby the discs can be put on the trays and removed form the trays; a gear driving mechanism driven by an electrical motor to generate driving force for driving the tray driving gear unit; a tray triggering unit capable of locking/ unlocking the trays in the standby position, the unit capable of pushing all trays to engage with the tray driving gear unit after unlocking the trays and capable of driving the trays outward from the mechanical chassis toward the disc exchange position; a recording/reproducing unit for recording and/or reproducing information signal on a disc placed on a turntable; and an elevation unit capable of moving the recording/reproducing unit with the turntable in a vertical direction to align the recording/reproducing unit to a tray and place a disc on the tray onto the turntable; wherein the tray driving gear unit can be commonly used for checking the discs by driving all trays other than a tray above the recording/reproducing unit to protrude outward from the mechanical chassis to the disc exchange position, the tray driving gear unit is capable of individually driving the trays from the disc exchange position to the standby position from top to bottom in a operation of closing discs, and each disc can be checked until it is closed.

According to the configuration of the second aspect of the invention, the tray driving gear unit is capable of driving all trays other than the tray above the recording/reproducing unit from the standby position to the disc exchange position with an all-at-once operation. At this time all tray driving gears of the tray driving gear unit other than for the tray above the recording/reproducing unit rotate in a tray opening direction as one solid gear for driving all trays other than the tray above the recording/reproducing unit. Further, when the tray driving unit rotates in an opposite direction the trays are driven one by one from the top tray to bottom tray. Thus, it is possible to eject all trays other than the tray above the recording/reproducing unit at once, and exchange all discs other than the tray above the recording/reproducing unit from top tray to bottom tray. This simplifies the operation for exchanging all discs other than the tray above the recording/reproducing unit in the disc changer. While all the trays are protruding, the discs can be checked be done at all time. The same tray driving gear unit can be commonly used for both shuttling the trays between the standby position and the disc exchange position and disc checking function, thereby it is possible to simplify the design of the tray driving gear unit, simplify the disc changer operation, shorten the changing time and reduce the possibility of tray jams.

Furthermore, in a third aspect of the present invention, there is provided an optical disc changer for performing at least one of the operations of reproducing information from an optical disc or for recording information thereto, the apparatus comprising: a turntable; a recording/reproducing unit operative to perform at least one of the operations of recording and/or reproducing an information signal on an optical disc placed on the turntable; a plurality of trays for carrying respective optical discs; a housing for receiving the plurality of trays; a mechanism for placing a disc on a selected one of the trays onto the turntable; a tray driving gear unit operative to drive the trays to a disc exchange position in which the trays are ejected from the housing for loading or removal of respective optical discs, and also operative to withdraw the plurality of trays from the disc exchange position to the standby position, the tray driving gear unit comprising a plurality of tray drive gears and a coupling mechanism for coupling the tray drive gears together, the tray driving gear unit being configurable into a RESET configuration in which the tray drive gears are coupled together for rotation together in a tray-opening rotational direction; a tray triggering unit for locking the trays in a standby position in which the trays are received within the housing, for releasing the trays, and for driving the trays from the standby position to a position in which the trays are coupled to respective tray drive gears of the tray driving gear unit while the tray driving gear unit is in the RESET configuration; whereby rotation together of the tray drive gears in said one tray-opening direction drives the trays together to the disc exchange position.

From the RESET configuration, the tray drive gears can be rotated individually in the opposite rotational direction, which allows the trays to be withdrawn individually into the housing.

An alternative, but more specific, expression of the third aspect of the invention is a disc changer for storing a plurality of discs, transporting a disc selected from the plurality of discs, and performing recording/reproducing information signal on the disc, the disc changer comprising: a plurality of trays which respectively can be loaded with discs, can be moved substantially in a horizontal direction parallel to main surfaces of the discs, and are stacked substantially in a vertical direction perpendicular to the main surfaces of the discs; a tray driving gear unit capable of shuttling the trays between a standby position in which the trays are stored in a mechanical chassis as a housing of the disc changer and a disc exchange position in which the trays are protruded outward from the mechanical chassis thereby the discs can be put on the trays and removed form the trays; a gear driving mechanism driven by an electrical motor to generate driving force for driving the tray driving gear unit; the tray triggering unit capable of locking/unlocking the trays in the standby position, the unit capable of pushing all trays to engage with the tray driving gear unit after unlocking the trays and capable of driving the trays outward from the mechanical chassis toward the disc exchange position; a recording/reproducing unit for recording and/or reproducing information signal on a disc placed on a turntable; and an elevation unit capable of moving the recording/reproducing unit with the turntable in a vertical direction to align the recording/reproducing unit to a tray and place a disc on the tray onto the turntable; wherein the tray driving gear unit has a series of tray drive gears and can rotate to RESET condition in which all drive gears can rotate as all-at-once, and wherein the trays at the standby position are not engage with the tray driving gear unit, after the tray driving gear unit rotates to RESET condition, the tray triggering unit moves and pushes the trays to engage with the tray driving gear unit.

According to the configuration of the third aspect of the invention, the tray driving gear unit has a series of tray drive gears and can rotate to RESET condition, and the trays at the standby position are engaged with the tray driving gear unit by the tray triggering unit after the tray driving gear unit rotates to RESET condition. Thus, for each exchange of a disc, the trays protrude to the disc exchange position and return to the standby position one by one from top to bottom. This simplifies the operation of exchanging all discs, since it is possible to put a disc onto any of the empty tray without opening the trays one by one.

In an embodiment of the third aspect of the invention, the tray driving gear unit is provided with a shaft gear body, comprising a shaft gear connected to a driving source and a shaft on which the tray drive gears are mounted and stacked in a laminated manner, and each tray is driven by a single tray drive gear.

According to the embodiment, the tray drive gears are separate from the shaft gear body, therefore the tray driving gear unit can be manufactured much more easily in comparison with one body construction.

Also, in another embodiment of the third aspect of the invention, the tray driving gear is provided with a shaft gear body, comprising a shaft gear connected to a driving source and a shaft on which the tray drive gears are mounted and stacked in a laminated manner, a top level tray drive gear is fixed to the shaft gear body and rotates as one body therewith at all times; and each drive gear has a rib profile as a stopper rib extending along with an axis of the shaft by a predetermined amount, when an upper level tray drive gear's stopper rib pushes to a lower level tray drive gear's stopper rib in a rotational direction of the upper level tray drive gear, the lower level tray drive gear is forced to rotate in the rotational direction of the upper level tray drive gear.

According to the embodiment, the tray drive gears are separate from the shaft gear body, therefore the tray driving gear unit can be manufactured much easier in comparison with one body construction. Further, a top level tray drive gear fixed to the shaft gear body rotates as one body therewith at all time, and the rotational movement of the top level tray drive gear is transferred to the lower level drive gear through the stopper ribs thereof. Thus, all tray drive gears are driven to rotate one by one through the stopper ribs.

Furthermore, in still another embodiment of the third aspect of the present invention, at least one spacer ring is provided between two tray drive gears adjacent to each other, the spacer ring allows the upper level tray drive gear to have an additional rotation before it drives the lower level tray drive gear, thereby the additional rotation is provided to each tray drive gear.

According to the embodiment, the additional rotation is provided to each tray drive gear by at least one spacer ring placed between two tray drive gears adjacent to each other. The spacer ring can acts as a dummy gear in the rotational movement of the tray driving gear unit, and can reduce the size of the tray drive gear, because, in a case that the tray driving gear unit does not have a spacer ring, the drive gear pitch diameter needs to provide a total circumference equivalent to a total stroke for one complete rotation, and this increases the diameter of the tray drive gear.

Furthermore, in still another embodiment of the third aspect of the present invention, each spacer ring has stopper ribs which are same as the stopper ribs of the tray drive gear, the size in a rotational direction of the stopper ribs is designed to be equivalent to a multiple of gear teeth pitching angle, and the tray drive gear teeth align after all stopper ribs contact each other, thereby the all tray drive gear can be driven to move all trays to the disc exchange position evenly.

According to the embodiment, an upper level tray drive gear's stopper rib pushes to a lower level tray drive gear's stopper rib, through the spacer ring's stopper ribs, in a rotational direction of the upper level tray drive gear, and the lower level tray drive gear is forced to rotate in the rotational direction of the upper level tray drive gear. Thus, the rotational movement of the top level tray drive gear is transferred to the lower level drive gear through the stopper ribs, and all tray drive gears are driven to rotate one by one through the stopper ribs. Specifically, the size in a rotational direction of the stopper ribs is designed to equivalent to a multiple of gear teeth pitching angle, therefore the stopper ribs can contact to each other more in a more stable way.

Furthermore, in still another embodiment of the third aspect of the present invention, a total rotational stroke of the tray drive gear before the lower level tray drive gear starts to rotate is equivalent to the total stroke for moving a tray from the disc exchange position to the standby position.

According to the embodiment, it is possible to provide the tray driving gear unit with a dummy turn which is equivalent to the total stroke for moving a tray from the disc exchange position to the standby position, thereby the size of the tray drive gear can be reduced.

Furthermore, in still another embodiment of the third aspect of the present invention, the first gear tooth of the tray's gear rack has a shape profile for easy engagement of trays to tray driving gear unit after triggered by the tray triggering unit.

According to the embodiment, owing to the shape profile of the first gear tooth of the tray's gear rack, the tray's gear rack can be easily engaged with the tray driving gear unit after triggered by the tray triggering unit. Thereby, the tray can start to move smoothly by the tray driving gear unit.

BRIEF DESCRIPTION OF DRAWINGS

FIG. 10(b) is a side view of the trigger slide plate;

FIGS. 12(a) to 12(d) are explanatory drawings showing a sequence of a motion of a tray lock lever;

FIGS. 25(a) and 25(b) are schematic side views showing a first gear train changing system by a switching gear;

FIG. 28(a) is a plan view showing a cam gear;

FIG. 28(b) is a perspective view showing the outer profiles at the lower side of the cam gear;

FIGS. 31(a) to 31(d) are plan views showing the sequence of tray opening operation which mainly controlled by cam gear;

FIG. 58(a) is a plan view showing a locking condition of the second lock lever;

FIG. 58(b) is a plan view showing an unlocking condition of the second lock lever;

FIG. 62 is a locking system summary table at recording/reproducing section.

DETAILED DESCRIPTION OF THE INVENTION

Hereinafter, preferred embodiments of the present invention will be described with reference to the accompanied drawings.

Figure 1:
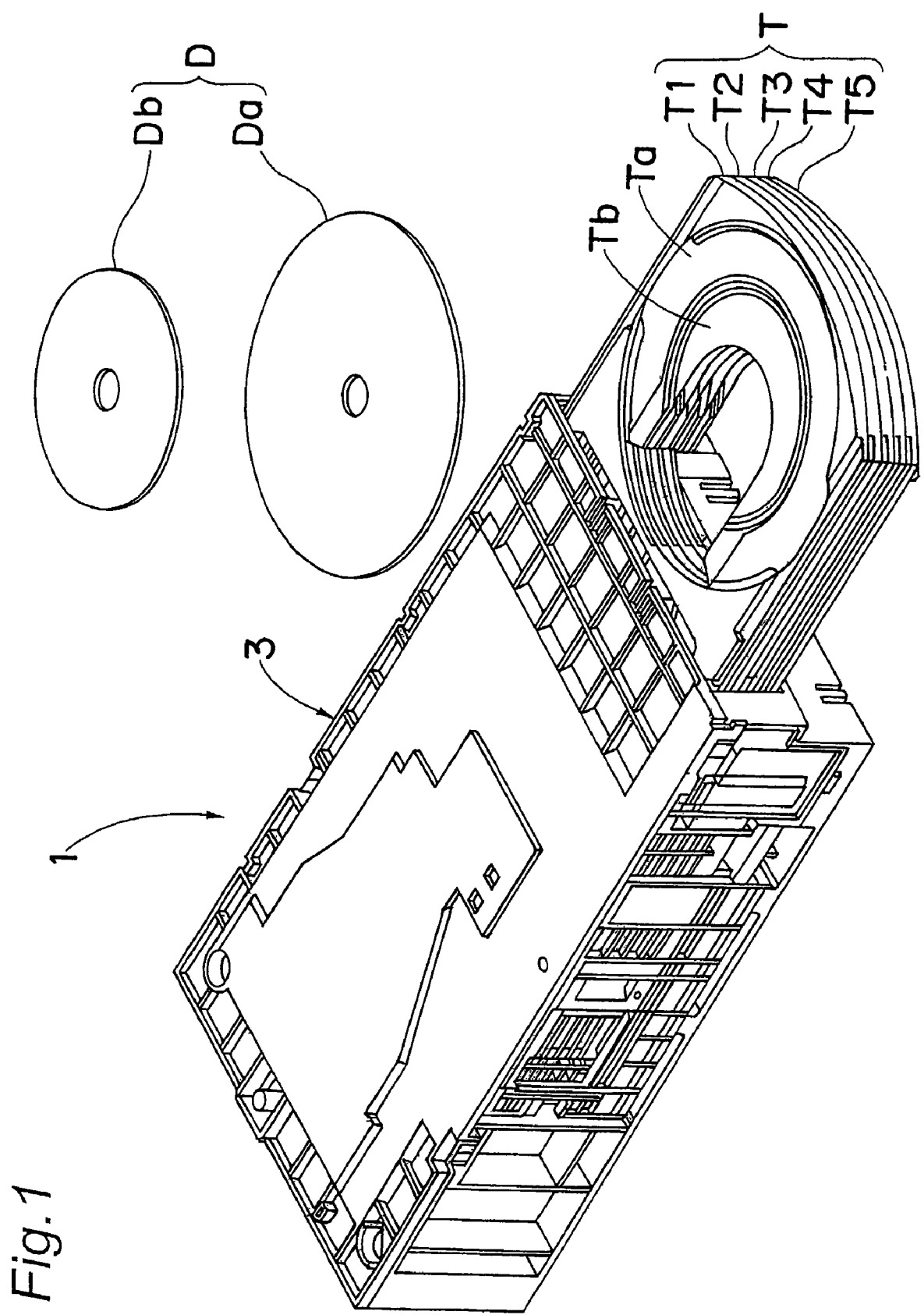
FIG. 1 is a perspective view showing a disc changer according to the present embodiment in a state that all trays are opened.

FIG. 1 is a perspective view showing a disc changer 1 according to the present embodiment in a state that all trays T are opened. As shown in FIG. 1, the disc changer 1 is provided with a plurality of trays T. In the embodiment, the disc changer 1 is provided with five trays T (labeled T1-T5), but in other embodiments there may be a different number of trays T. Each tray T is capable of carrying a disc D thereon. The disc D may be a large disc Da having a larger diameter of 12 cm or a small disc Db having a smaller diameter of 8 cm depending on user's requirement, for example. The disc changer 1 is also provided with a generally box-like shaped mechanical chassis 3 which serves as a housing or an outer frame body thereof.

Each tray T can be stored within the mechanical chassis 3 in a state that they are stacked in a substantially vertical direction perpendicular to a main surface of the disc D, and can be moved in a substantially horizontal direction parallel to the main surface of the disc D.

FIGS. 2(a) to 2(e) are schematic side views of the disc changer 1 showing various operations of the trays T and a recording/reproducing section 70 of the disc changer 1. As shown in the drawings, the disc changer 1 is provided with, as tray positions, three different positions which are different in horizontal direction to each other. That is, a disc exchange position X in which the tray T protrudes outward from the mechanical chassis 3, a standby position Y in which the tray T is stored in the mechanical chassis 3 and a recording/reproducing position Z in which the tray T is correctly positioned to interact with the recording/reproducing section 70. The recording/reproducing position Z is set at near a back in the mechanical chassis 3, and the standby position Y is set at near an entrance of the mechanical chassis 3.

Among the FIGS. 2(a) to 2(e), FIG. 2(a) shows a RESET state. In this RESET state, all the five trays T except for the highest level tray T1 are stored and aligned with one another at the standby position Y. The recording/reproducing section 70 is movable in a vertical direction, and is shown in FIG. 2(a) at its highest position. The highest level tray T1 is stored at recording/reproducing position Z.

Figure 2:
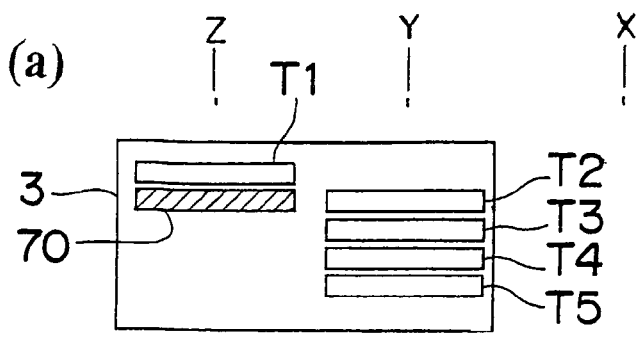
FIGS. 2(a) to 2(e) are schematic side views of the disc changer showing various operations of the trays and a recording and/or reproducing unit of the disc changer.
Figure 2:
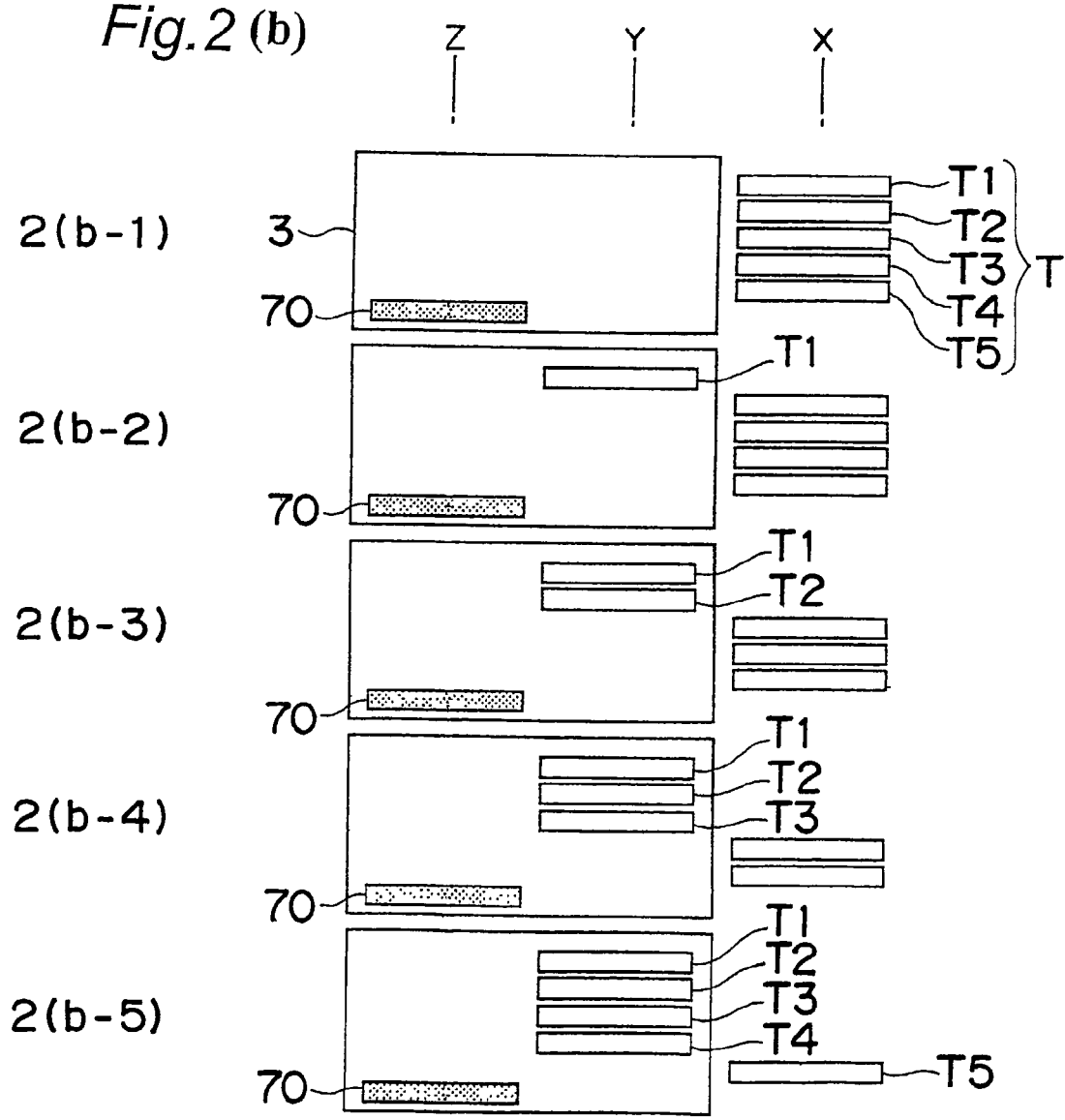
Figure 2:
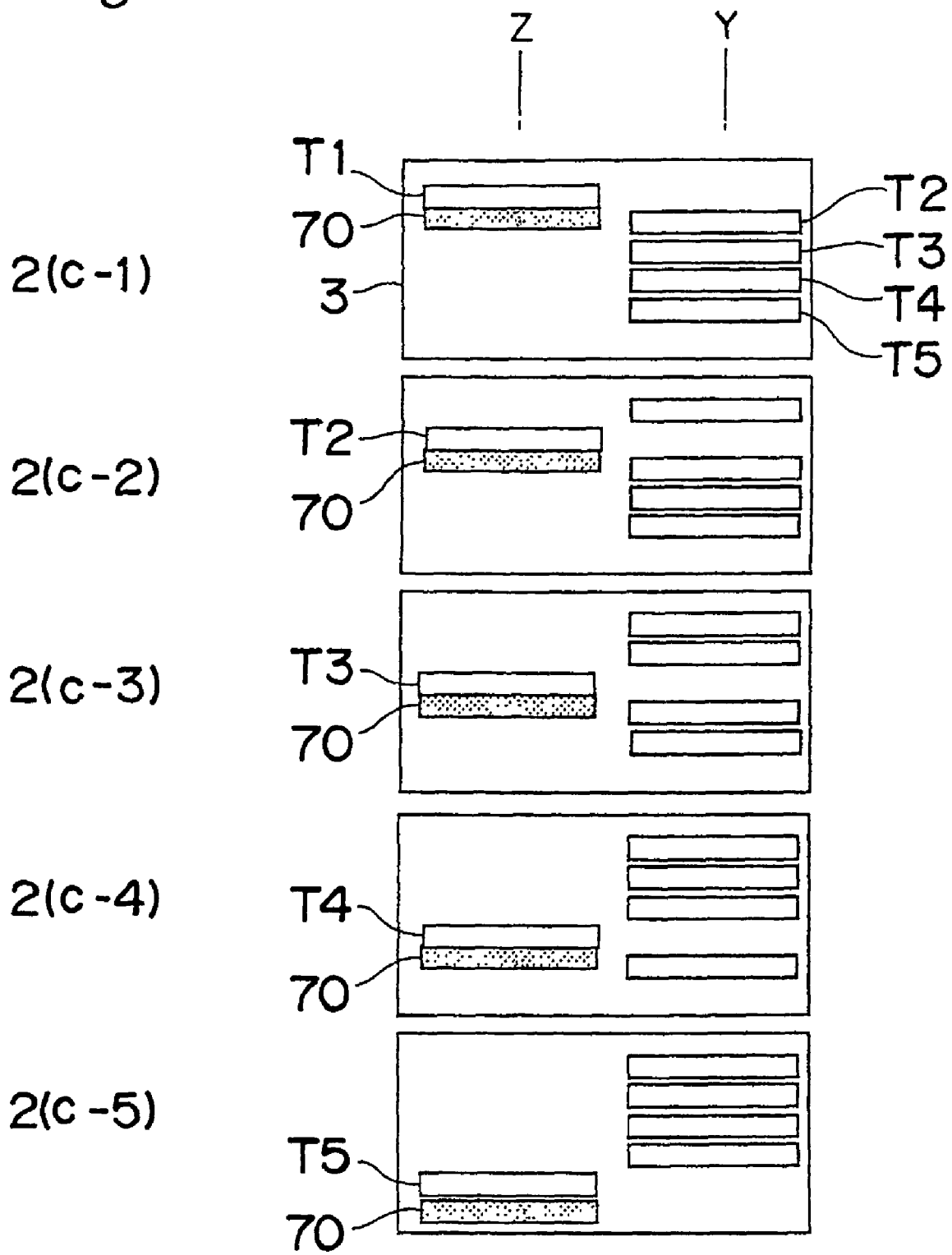

FIG. 2(b) shows a series of disc exchanging states. In the state shown in FIG. 2(b-1), all trays T are moved to the disc exchange position X at once. It will be noted that the discs D (Da or Db) can be put on the trays T or removed from the trays T by moving the trays T one by one from top to bottom, as shown in the sequence of images 2(b-1) to 2(b-5).

FIG. 2(c) shows a series of recording/reproducing states. In each of these states, a specified tray T is moved to the recording/reproducing position Z form the standby position Y and is stopped there, thereafter a recording or reproducing signal on the disc D on the specified tray T is started. The disc D which is to be performed the recording or reproducing signal thereon can be exchanged by exchanging the specified tray T. With respect to FIG. 2(c-1), the arrangement of the trays T is the same as the RESET shown in state FIG. 2(a), because the highest tray T1 is located to the recording/reproducing unit 70. The sequence of images FIG. 2(c-1) to FIG. 2(c-5) show how the trays T are successively moved to the recording/reproducing position Z.

Moreover, FIG. 2(d) shows a series of disc exchanging states during the recording and/or reproducing operation, for example a disc exchanging while tray T1 is at the recording/reproducing position Z. FIG. 2(d-1) shows the disc changer 1 in the same configuration as FIG. 2(c-1) in which all the discs D are in the disc exchange position X. In the state shown in FIG. 2(d-2), except for the tray T1 which supports a disc D during the recording or reproducing operation, all trays T (T2-T5) are positioned at the disc exchange position X, and in the sequence of images 2(d-2) to 2(d-5) the trays T are closed one by one from top to bottom, so that a disc D can be put on and/or removed from each tray T (T2-T5) when that tray T is the uppermost one at the disc exchange position X.

FIG. 2(e) shows in FIG. 2(1-e) to 2(e-5) a series of images which are respective fully-open states of the trays T during the recording and/or reproducing operation. In each of these states a single specified tray T is at the recording or reproducing position Z, and all the other trays T are positioned at the disc exchange position X. A disc D can be put on the corresponding tray or removed from it when the tray T is in the disc exchange position X, while the disc D on the specified tray T in the recording or reproducing position Z is experiencing the recording or reproducing operation.

The whole configuration of a disc changer 1 according to an embodiment of present invention which performs the above-described operations will be explained in accordance with FIGS. 3 to 5.

Figure 3A:
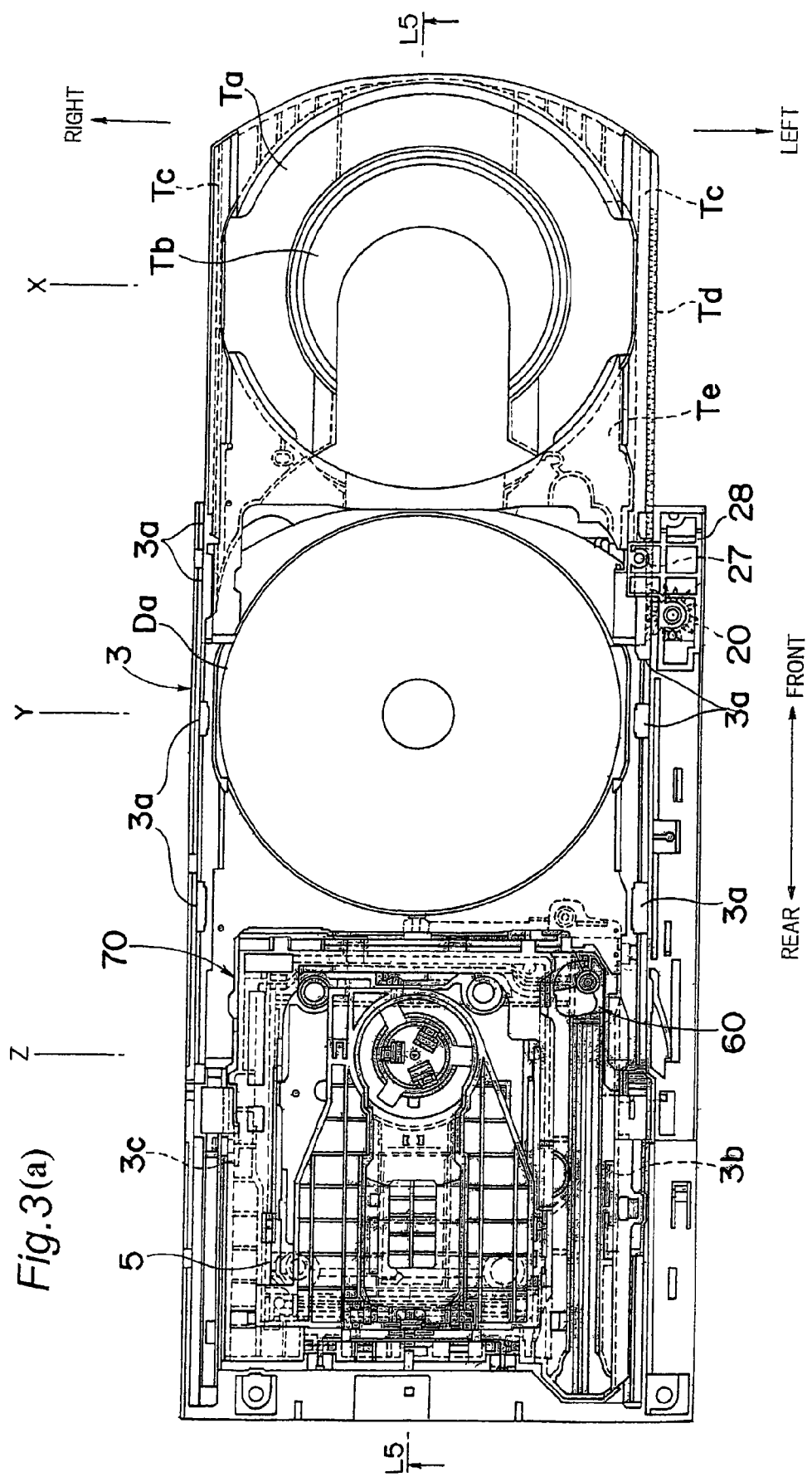
FIG. 3(a) is a plan view of the disc changer according to the embodiment.
Figure 3B:
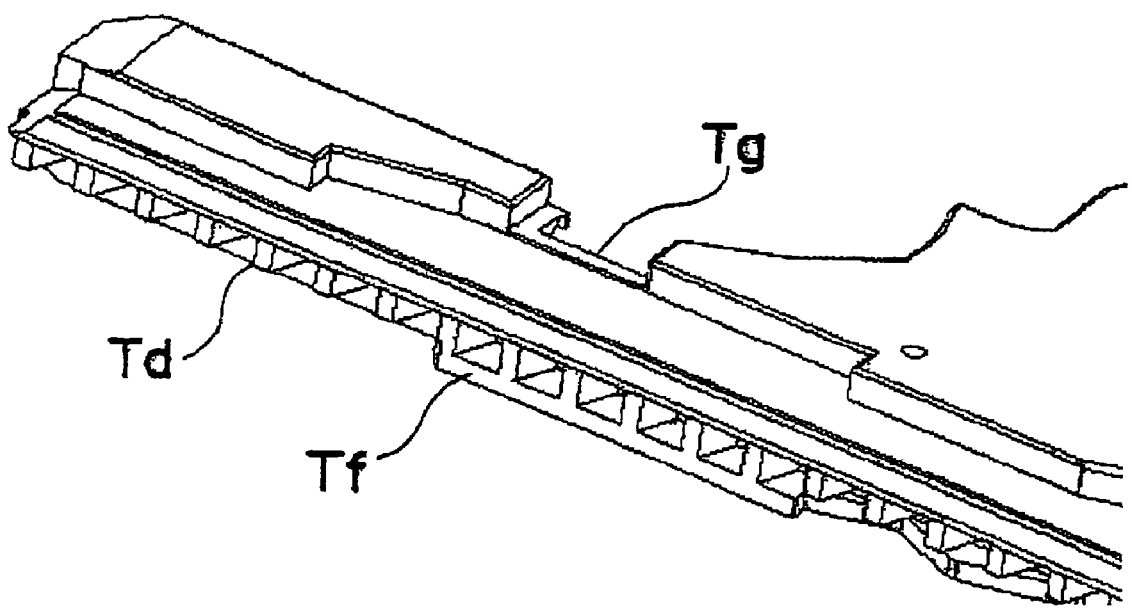
FIG. 3(b) is an enlarged perspective view of a part of a disc tray.
Figure 4:
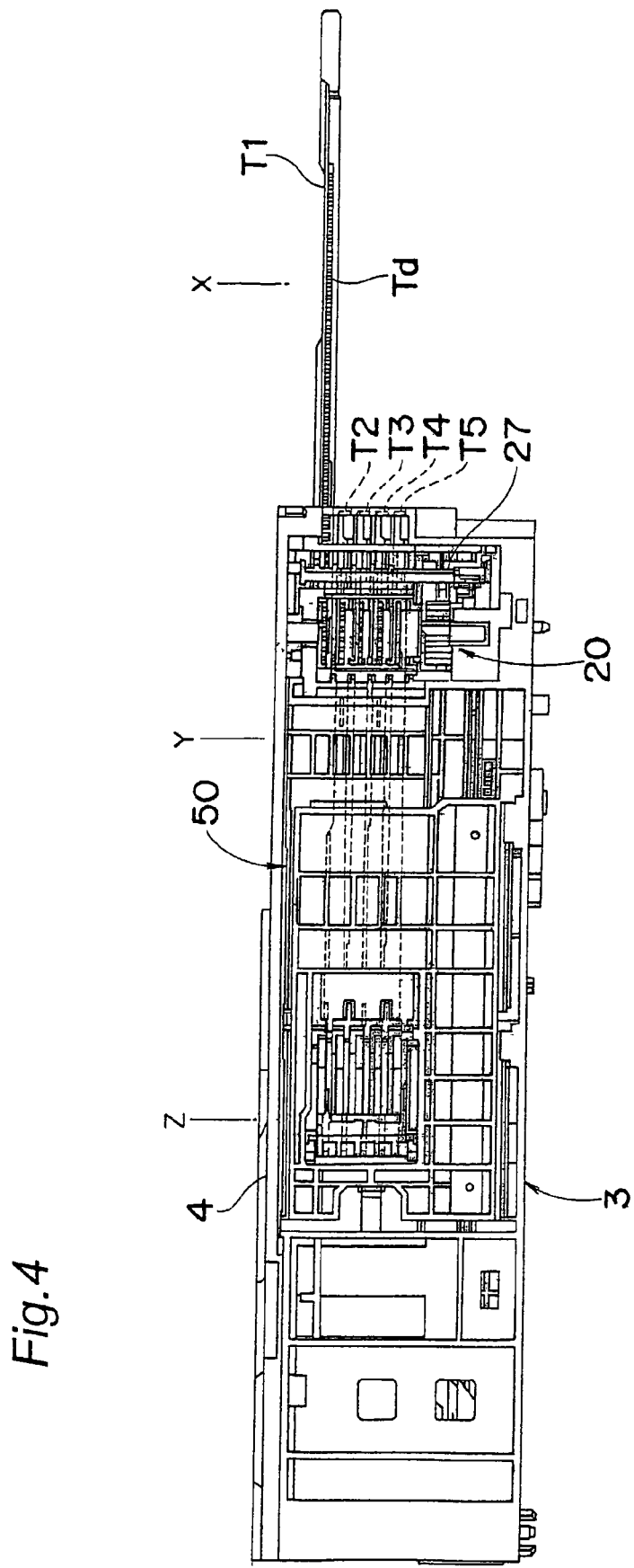
FIG. 4 is a side view of the disc changer shown in FIG. 3(a)
Figure 5:
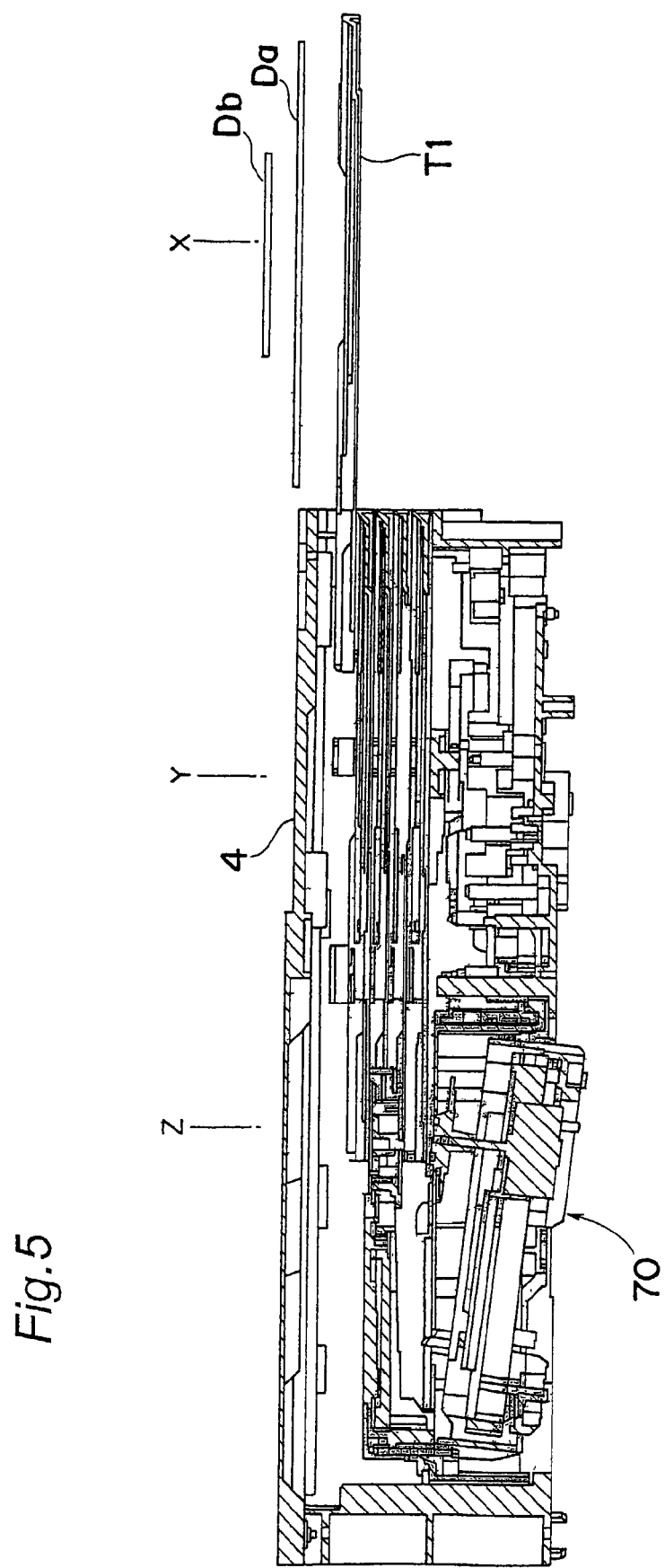
FIG. 5 is a sectional view of the disc changer taken along line L5-L5 in FIG. 3(a)

FIG. 3(a) is a plan view of the disc changer 1 according to the embodiment, FIG. 3(b) is an enlarged perspective view of a part of a tray T, FIG. 4 is a side view of the disc changer 1 shown in FIG. 3, and FIG. 5 is a sectional view of the disc changer 1 taken along line L5-L5 of FIG. 3(a).

As shown in FIGS. 3 to 5, each tray T has a large diameter step Ta and a small diameter step Tb on the upper surface. Thereby, a selected one of large disc Da and a small disc Db having different diameters (12 cm and 8 cm) to each other can be loaded on the tray T.

In the tray T, grooves Tc are formed on both right and left sides at the back, a gear rack Td is formed on one side (the left side, for example), a step up surface Te is formed on the left side at the back in rear portion of the tray T. Also, as shown in FIG. 3(b), a rib Tf is formed on the left side at the back in rear portion of the tray T, underneath the rack Td. Further, an opening of a hook profile Tg is formed on the left side of the rear portion of a tray support.

A plurality of (e.g. five) trays T are separately arranged in parallel while being stacked substantially in a vertical direction, that is, perpendicular to the main surfaces of the discs D. Moreover, as shown in FIG. 3, the trays T are supported by guide ribs 3a provided inside on the right and left sides of the mechanical chassis 3, so that the trays T can move substantially in a horizontal direction (lateral direction), that is in parallel with main surfaces of the disc D.

The trays T are moved by a tray driving gear unit 20 provided on the left side of the mechanical chassis 3, between the disc exchange position X and the standby position Y. A tray driving rack unit 60 is provided on the left side rearward of the trays T. The tray driving rack unit 60 is mounted on an UD base 5, moves and aligns itself to a specified tray address, and transfers trays T to the recording/reproducing section 70. It is to be noted that FIGS. 3 to 5 show a state in which the highest level tray T1 (the first tray) is located at the disc exchange position X.

The disc recording/reproducing section 70 is provided behind the trays T located at the standby position Y. The disc recording/reproducing section 70 is supported by a left guide rib 3b and a right guide rib 3c which are formed on the sides of mechanical chassis 3, and is moved in a up and down direction (vertical direction) by an elevating unit 30 which will be discussed later.

A triggering unit 50 (shown in FIG. 4, and described in more detail below with reference to FIG. 31) is provided on the left side of the disc changer 1, and moves in a direction parallel to the left side surface of the mechanical chassis 3 to push the trays T so as to engage them with the tray driving gears unit 20. Further, there is provided a driving mechanism 100 (described below with reference to FIG. 21) composed of a motor for driving each part, gear trains, a plunger unit for switching between gear trains, and a detection switch, under the trays T located at the standby position Y.

As mentioned above, the tray driving gear unit 20 is located on the left side of the mechanical chassis 3, and an open switch lever 27 for detecting trays T to be driven toward the disc exchange position X is provided at the vicinity of the tray driving gear unit 20. A gear cover 28 is mounted to cover a predetermined part of the top of the mechanical chassis 3, including the top of the tray driving gear unit 20 and the open switch lever 27. Thereby, longitudinal (vertical) axes of the tray driving gear unit 20 and the open switch lever 27 are correctly and stably positioned in relation to each other. Moreover, a top cover 4 is mounted on the top of the mechanical chassis 3 to increase the stiffness of the mechanical chassis 3 and to protect it from dust.

Figure 6:
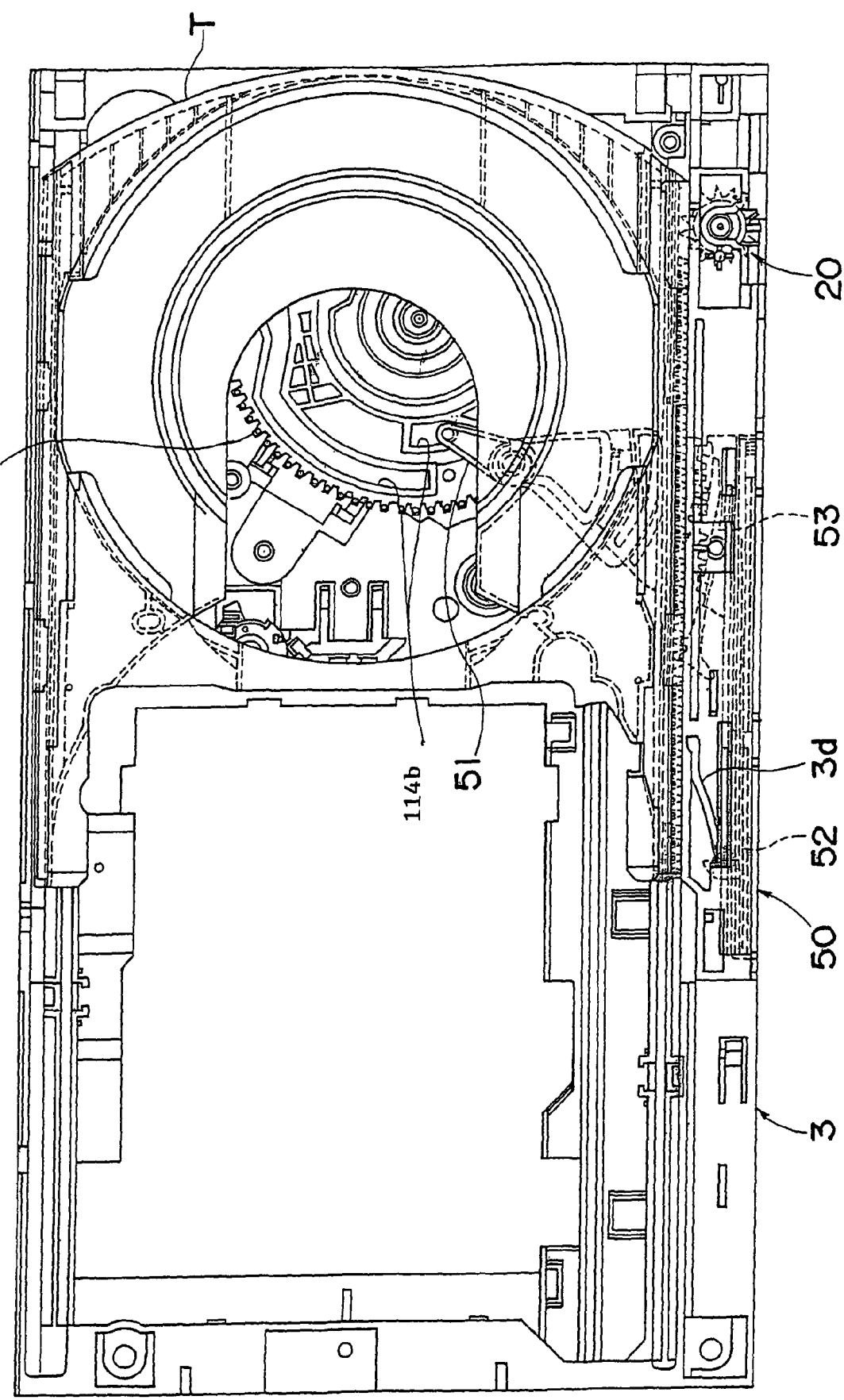
FIG. 6 is a plan view showing a detail of tray opening mechanism of the disc changer.

FIG. 6 is a top view showing a detail of the tray opening mechanism of the disc changer 1. The tray opening system includes the trays T, the tray driving gear unit 20 capable of driving trays T from the standby position Y to the disc exchange position X, and a trays triggering unit 50 having a trigger slide plate 52. The trigger slide plate 52 is moved by a trigger gear 51 and a cam gear 114 to lock/unlock trays T at standby position and pushes all trays T to engage them with the tray driving gear unit 20. The trigger slide plate 52 moves by sliding at the side of mechanical chassis 3, while a boss portion 52c on the trigger slide plate 52 moves to follow cam profiles 3d on both the top and bottom of mechanical chassis 3.

Figure 7:
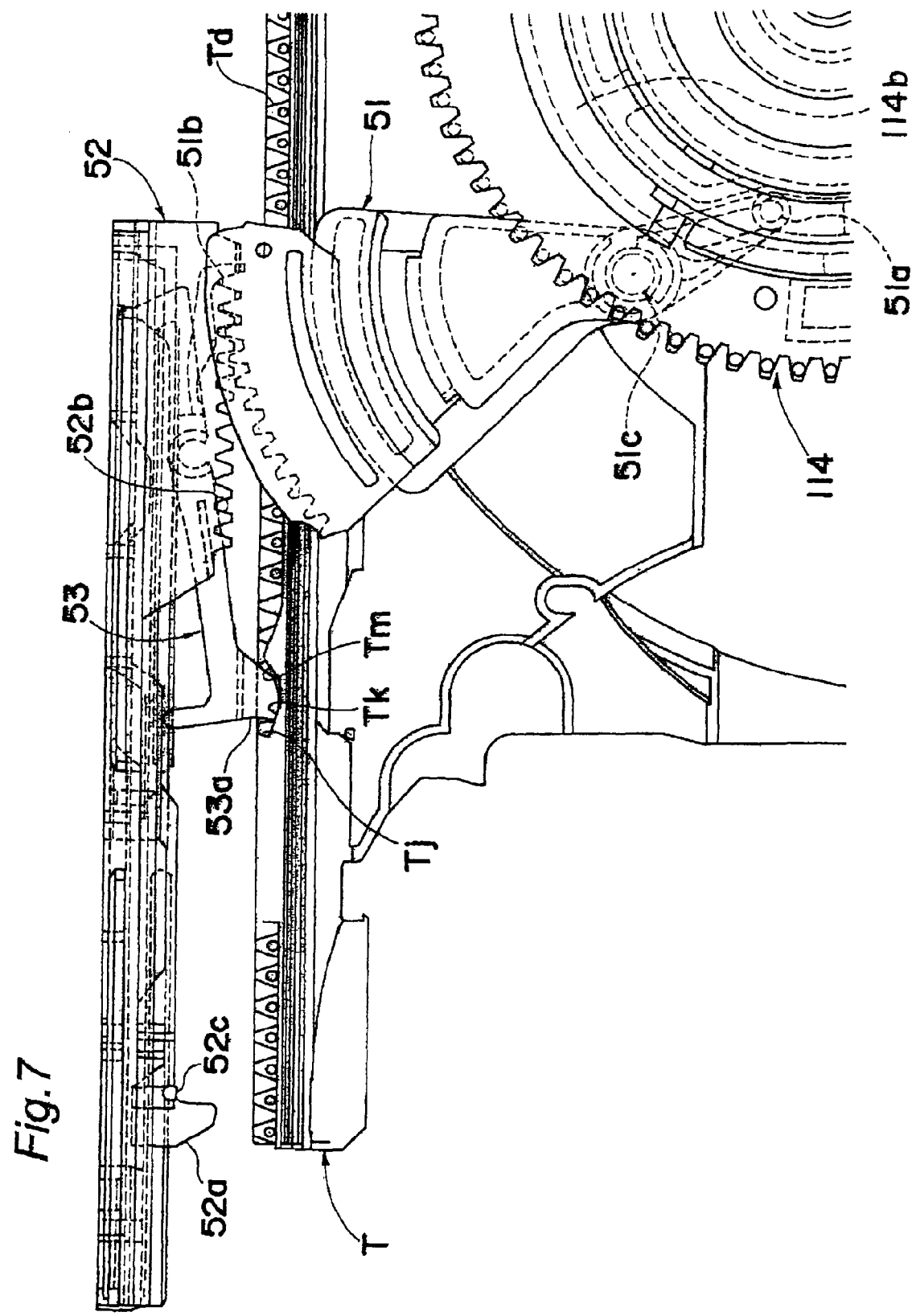
FIG. 7 is a bottom view of FIG. 6 focusing the tray triggering unit.

FIG. 7 is a bottom view of a portion of the section of the disc changer 1 shown in FIG. 6, focusing on the tray triggering unit 50. As shown in FIG. 7, the trigger gear 51 with a gear rack 51b is connected to the cam gear 114 by a boss 51a is fitted into a groove 114b (see FIG. 6) of the cam gear 114. When the cam gear 114 is rotated, the boss 51a is driven in accordance with a profile of the cam groove 114b, thereby the trigger gear 51 is rotated around a supporting boss 51c. Thus, a gear rack 51b on the trigger gear 51 which engages with a rack profile 52b of the trigger slide plate 52 will push the trigger slide plate 52 to move in forward direction, and then push trays T at a trigger rib Th (see FIG. 8(b)).

A tray lock lever 53 is arranged between the trays T and the trigger side plate 52. The tray lock lever 53 is provided with a locking profile 53a (a convex part, for example) for locking trays T at standby position Y. The locking profile 53a controls the trays T at the standby position by contacting surfaces Tk and Tm of a recess formed on the side of the trays T.

Figure 8A:
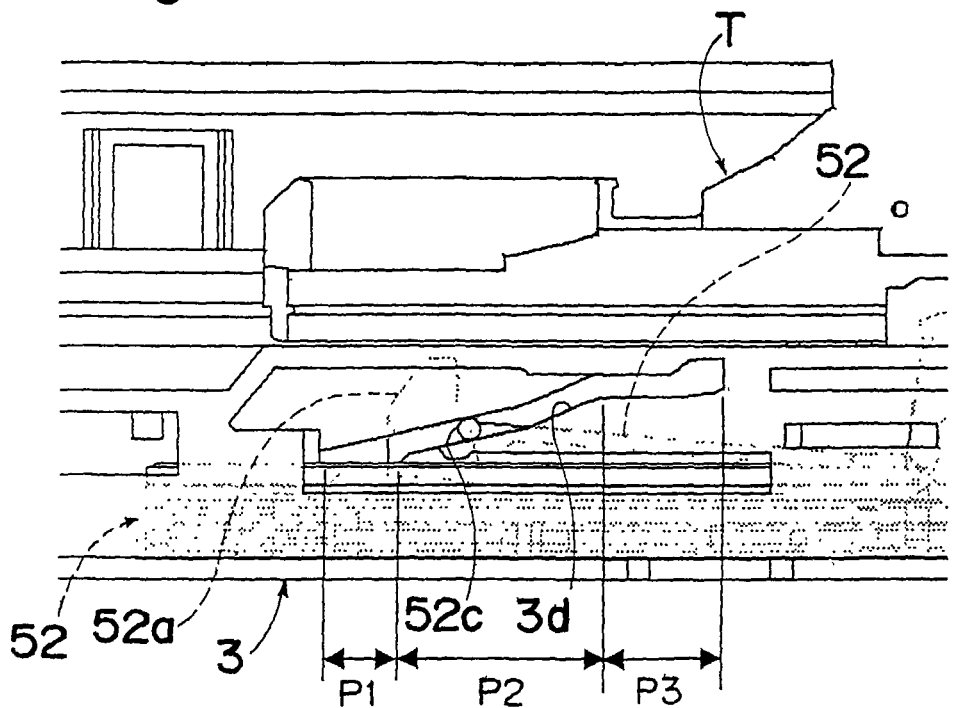
FIGS. 8(a) and 8(b) are plan views of a focused part of the disc changer showing a moving process of the trigger slide plate for triggering trays.
Figure 8B:
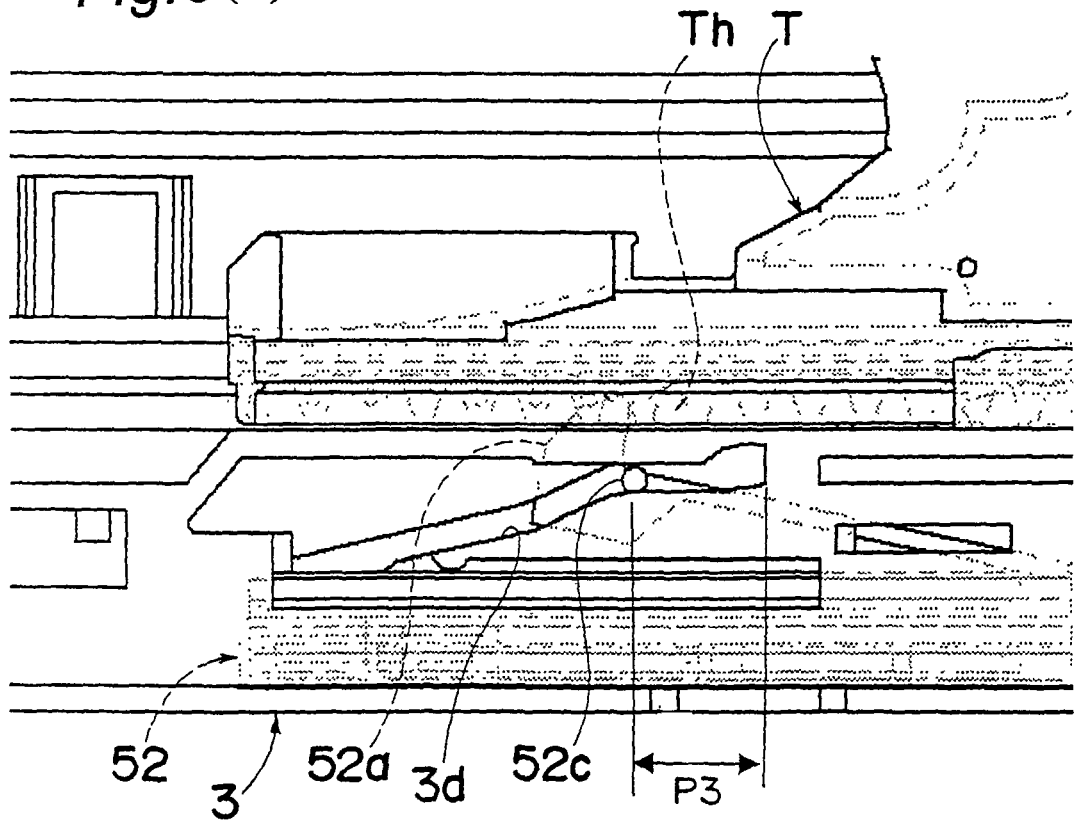

FIGS. 8(a) and 8(b) show a moving process of the trigger slide plate 52 for triggering trays T. Boss shaped portions 52c are provided on the top and the bottom of the trigger slide plate 52. The boss portion 52c is fitted into a cam groove 3d formed on the top and the middle of the mechanical chassis 3. The cam groove 3d includes three moving paths P1-P3 for the boss portion 52c of the trigger slide plate 52.

A moving path P1 is a "HOME" path for the boss portion 52c of the trigger slide plate 52, a moving path P2 is a "TRIGGER" path P3 and a moving path P2 is a "TRANSITION" path located between the "HOME" path P1 and the "TRIGGER" path P3.

FIG. 8(b) shows the boss portion 52c of the trigger slide plate 52 in the "TRIGGER" path P3, the driving rib 52a of the trigger slide plate 52 is touching the trigger rib Th of the tray T, and ready to push trays T to move towards the tray driving gear unit 20.

Figure 9A:
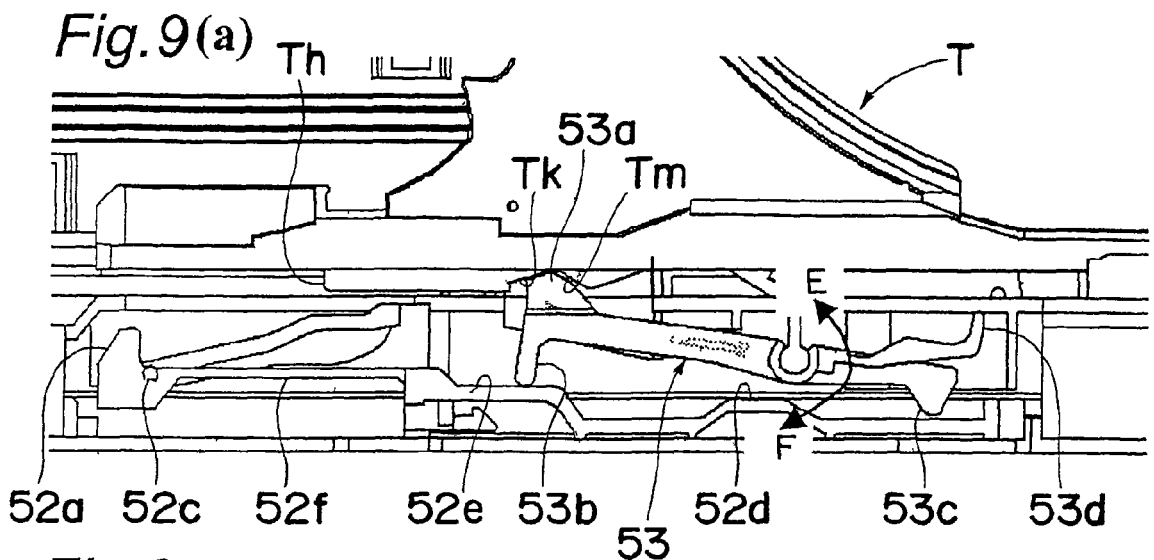
FIGS. 9(a) to 9(c) are plan views of the trigger slide plate showing a moving sequence thereof for triggering trays and locking/unlocking trays in a standby position.
Figure 9B:
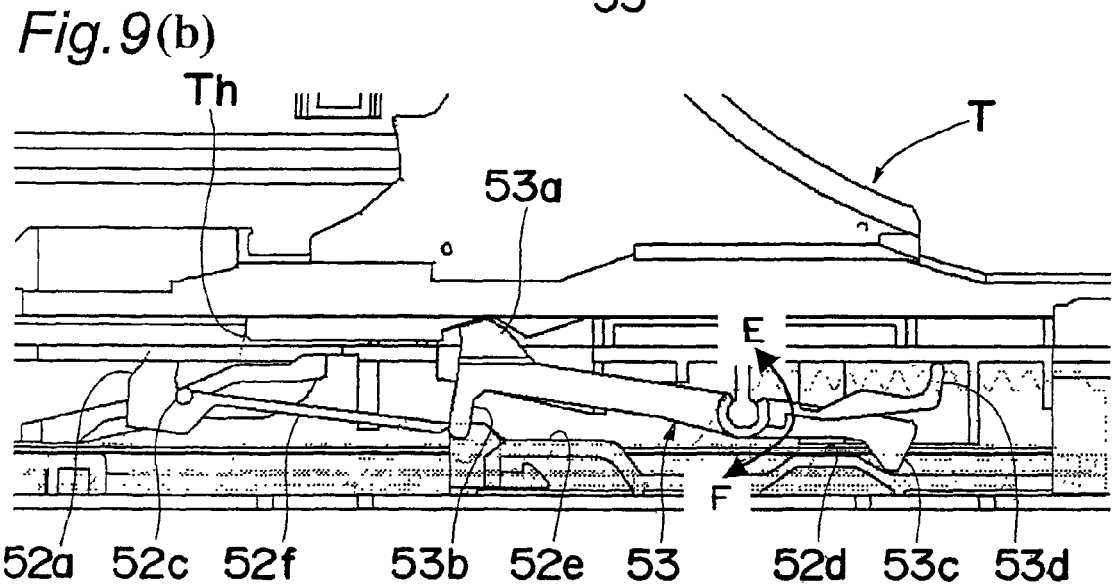
Figure 9C:
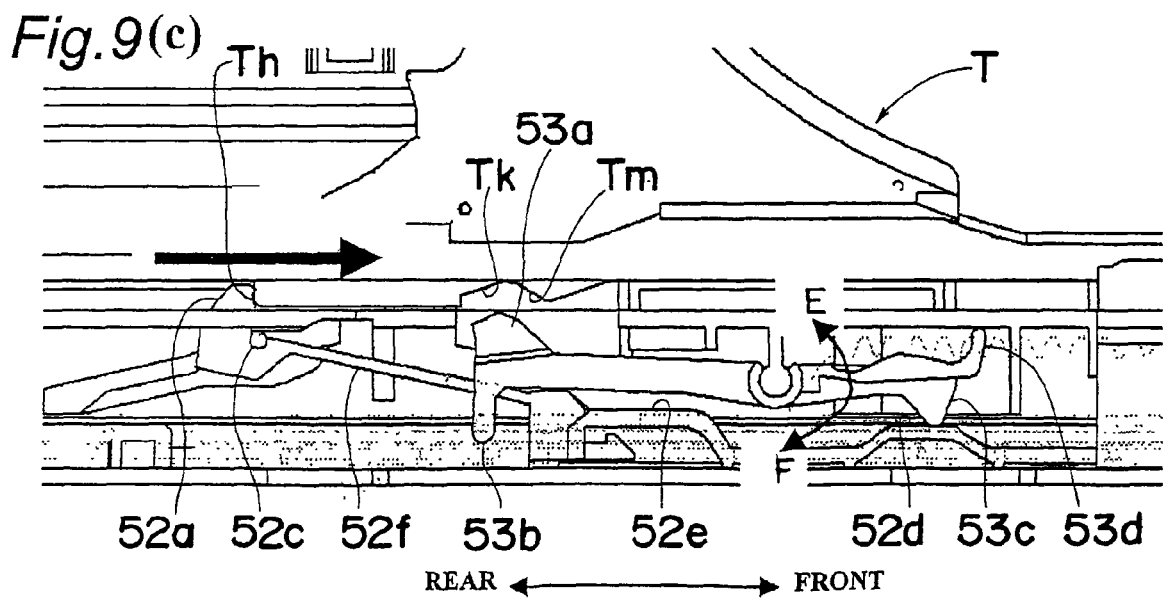

FIGS. 9(a) to 9(c) show a moving sequence of the trigger slide plate 52 for triggering the trays T and locking/unlocking the trays T in the standby position Y. FIG. 9(a) shows the trigger slide plate 52 at "HOME" position. A first protrusion profile 52e is touching a rib 53b protruding from the tray lock lever 53, thereby a movement of the tray lock lever 53 in arrow F or arrow E direction is prevented. The locking profile 53a is touching the surfaces Tk and Tm, thereby trays T are "locked" at the standby position Y. When the boss portion 52c of the trigger slide plate 52 moves to the "TRANSITION" path, the first protrusion 52e moves away from the rib 53b, as shown in FIG. 9(b). However, the tray lock lever 53 will remain in the same condition as FIG. 9(a).

This is due to a function of a plastic spring 53d of the tray lock lever 53. The plastic spring 53d does not allow the tray lock lever 53 to rotate in the direction of the arrow E and urge the tray lock lever 53 towards the direction of the arrow F, if a bending force is applied on the plastic spring 53d. Before the driving rib 52a of the trigger slide plate 52 reaches so as to touch the surface Th of a recess formed on tray T as shown in FIG. 9(c), the second protrusion 52d already pushes a convex part 53c of the tray lock lever 53 to another level. Thus, the tray lock lever 53 rotates in direction of arrow E and "unlocks" trays T.

Figure 10A:
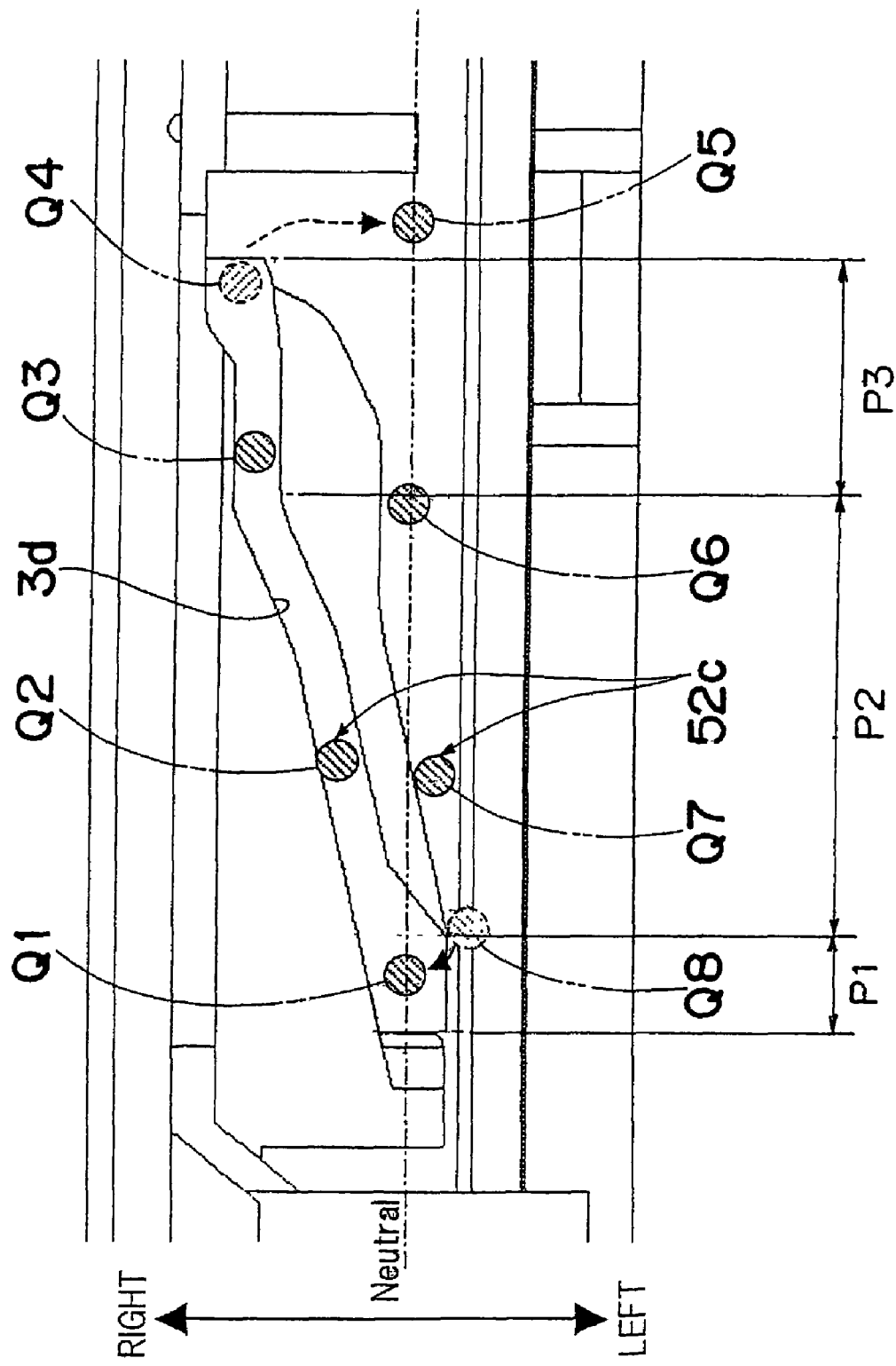
FIG. 10(a) is an explanatory drawing showing various locations of a boss portion of the trigger slide plate.

FIG. 10(a) explains the various locations of the boss portion 52c of the trigger slide plate 52 from a "HOME" position Q1 to a "TRIGGER" position Q3 and from a "TRIGGER" position Q4 to a "HOME" position Q7. At a neutral-line position, trigger slide plate ribs 52f are in no stress condition. The stress increases as the boss portion 52c of the trigger slide plate 52 travels from the "HOME" position Q1 to the "TRIGGER" position Q3 through a "TRANSITION" position Q2. FIG. 10(b) shows a side view of the trigger slide plate 52.

At the "TRIGGER" position Q3, the trigger slide plate 52 starts to push trays T to engage them with the tray driving gear unit 20. At end of moving sequence, the opening of the cam profile allows the boss portion 52c to release the stress trigger slide plate ribs 52f and return to the neutral condition. Thus, the boss portion 52c of the trigger slide plate 52 can return to "HOME" position following the other path to avoid its profile overlapping with the trays T when the trays T return from the disc exchange position X to the standby position Y.

At the "HOME" position Q7, bending stress start to increase on the trigger slide plate rib 52f at the opposite direction (towards the left). At a position Q8, the stressed trigger slide plate ribs 52f is released after the trigger slide plate 52 moves to an opening on the cam profile and return to its origin position ("HOME" position).

Figure 11A:
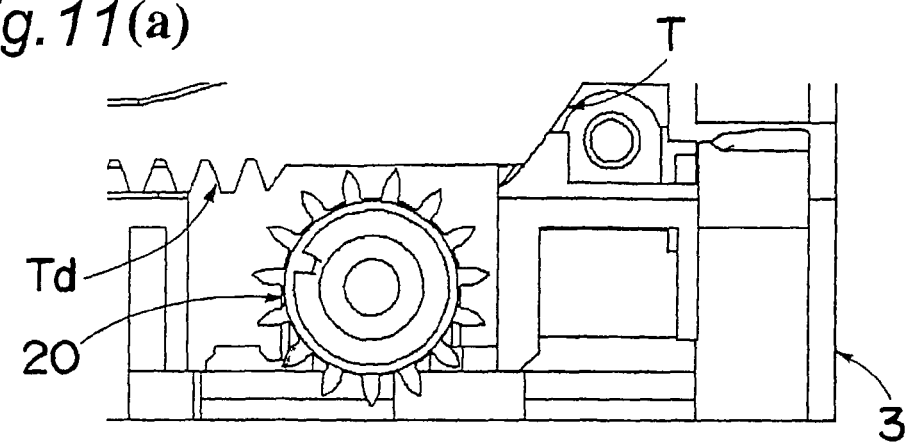
FIGS. 11(a) to 11(c) are plan view of a tray driving gear unit showing engagement and disengagement thereof to the tray.
Figure 11B:
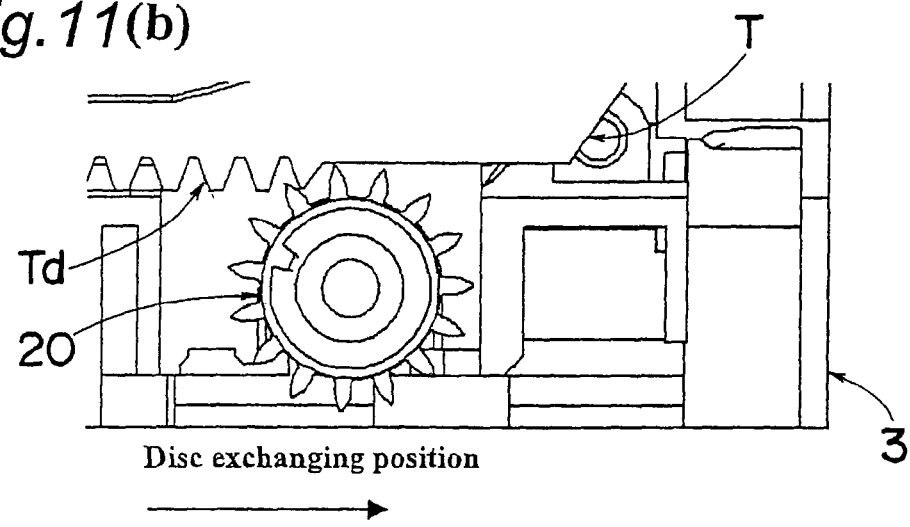
Figure 11C:
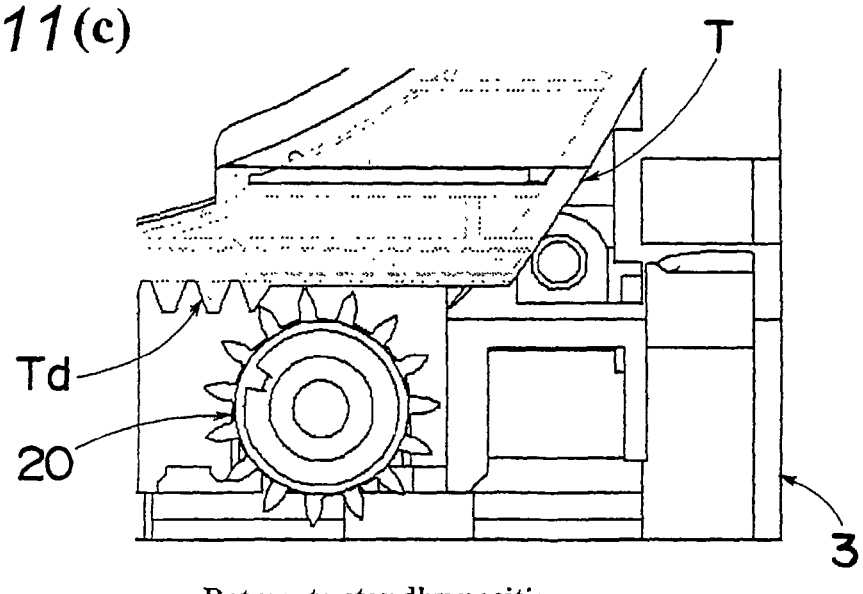

FIGS. 11(a) to 11(c) show the engagement and disengagement of the tray driving gear unit 20 with a tray T. At an initial condition (when the trays T are at standby position Y, before they are triggered by the trigger slide plate 52), the gear rack Td is not engaged with the tray driving gear unit 20. After the trays T are triggered by the trigger slide plate 52, the trays T move forward and the gear rack Td will engage with the tray driving gear unit 20. Thus, all trays T will be driven forward at the same time to the disc exchange position X.

Figure 12B:
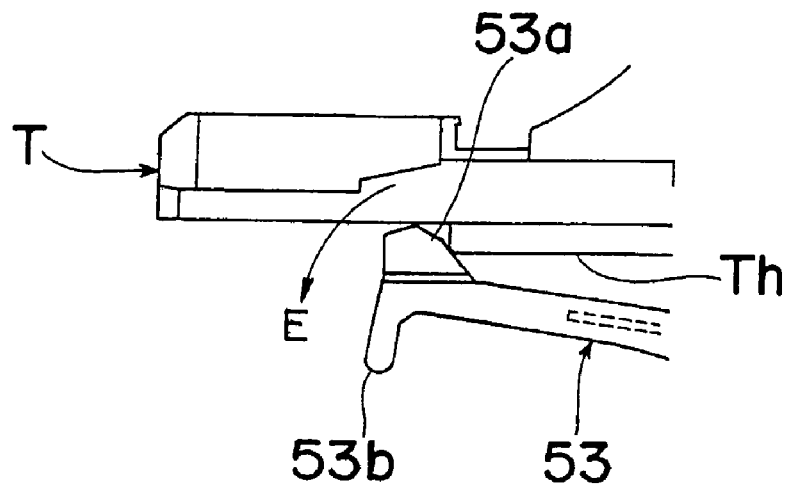
Figure 12C:
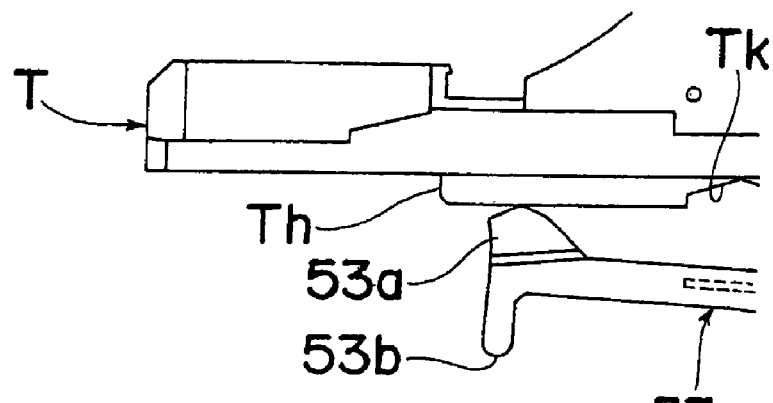
Figure 12D:
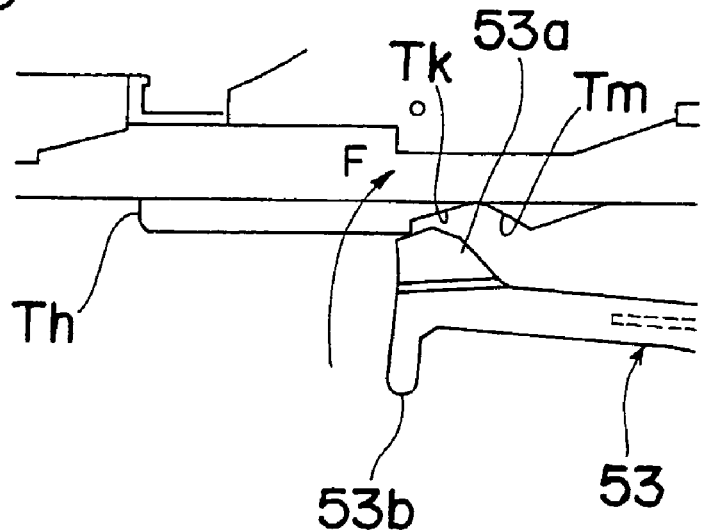

For the return condition, the gear rack Td leaves the tray driving gear unit 20 when it reaches the standby position Y. The tray lock lever 53 will be pushed away by trigger rib Th as shown in FIG. 12(b), at the time that the last gear tooth of the gear rack Td leaves the tray driving gear units 20, and the tray lock lever 53 rotates into the recess of tray rib as FIG. 12(a). The contact of the locking profile 53a and a surface Tj of the recess create an inter-lock effect to prevent trays T from moving towards the disc exchange position X after reaching the standby position Y. After all the trays reach to the standby position Y, the first protrusion 52e of the trigger slide plate 52 will be pushed to the lock lever rib 53b and aligns and locks the trays T at the standby position Y as shown in FIG. 9(a).

Figure 13A:
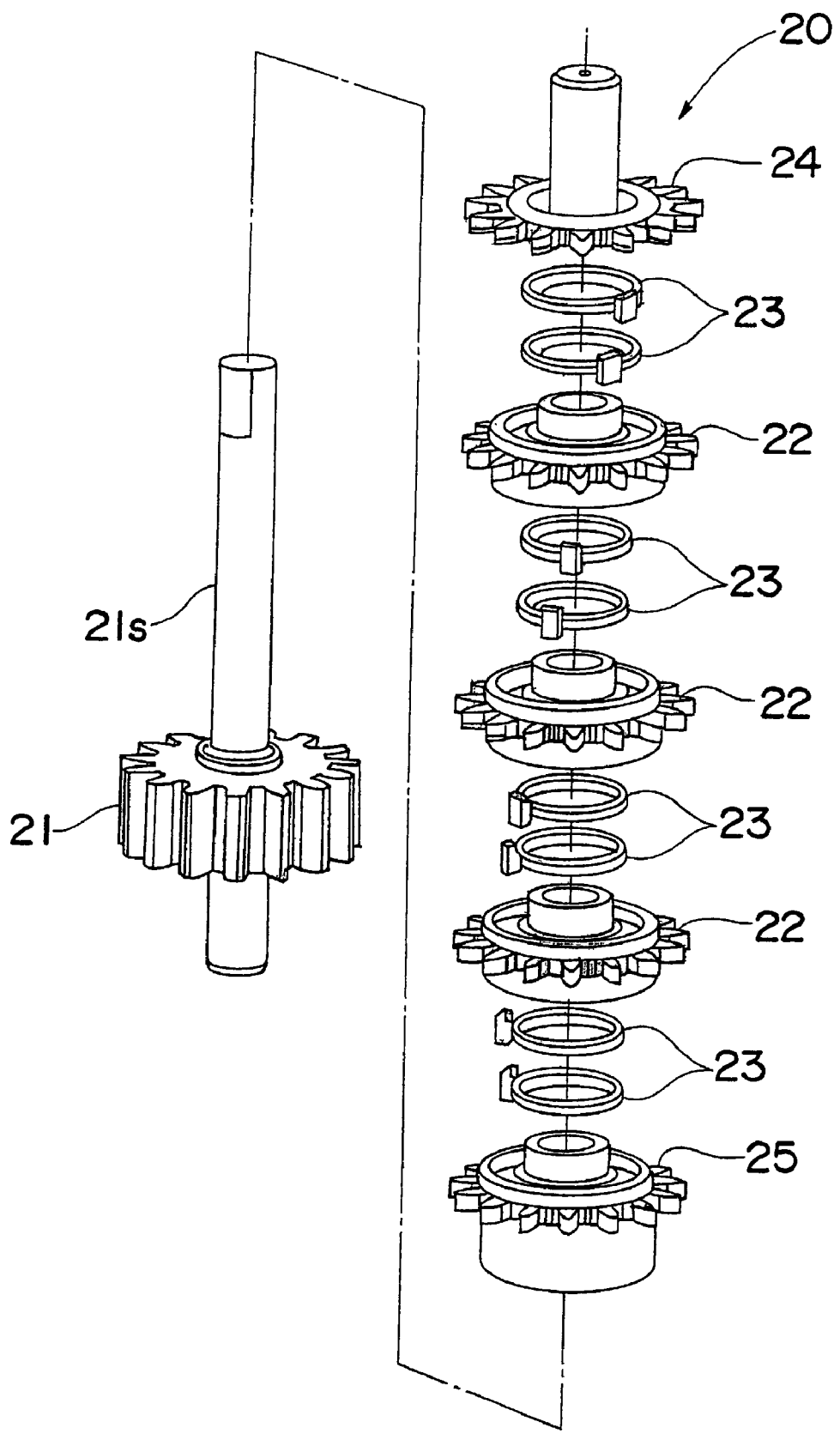
FIG. 13(a) is an exploded view of a tray driving gear unit.
Figure 13B:
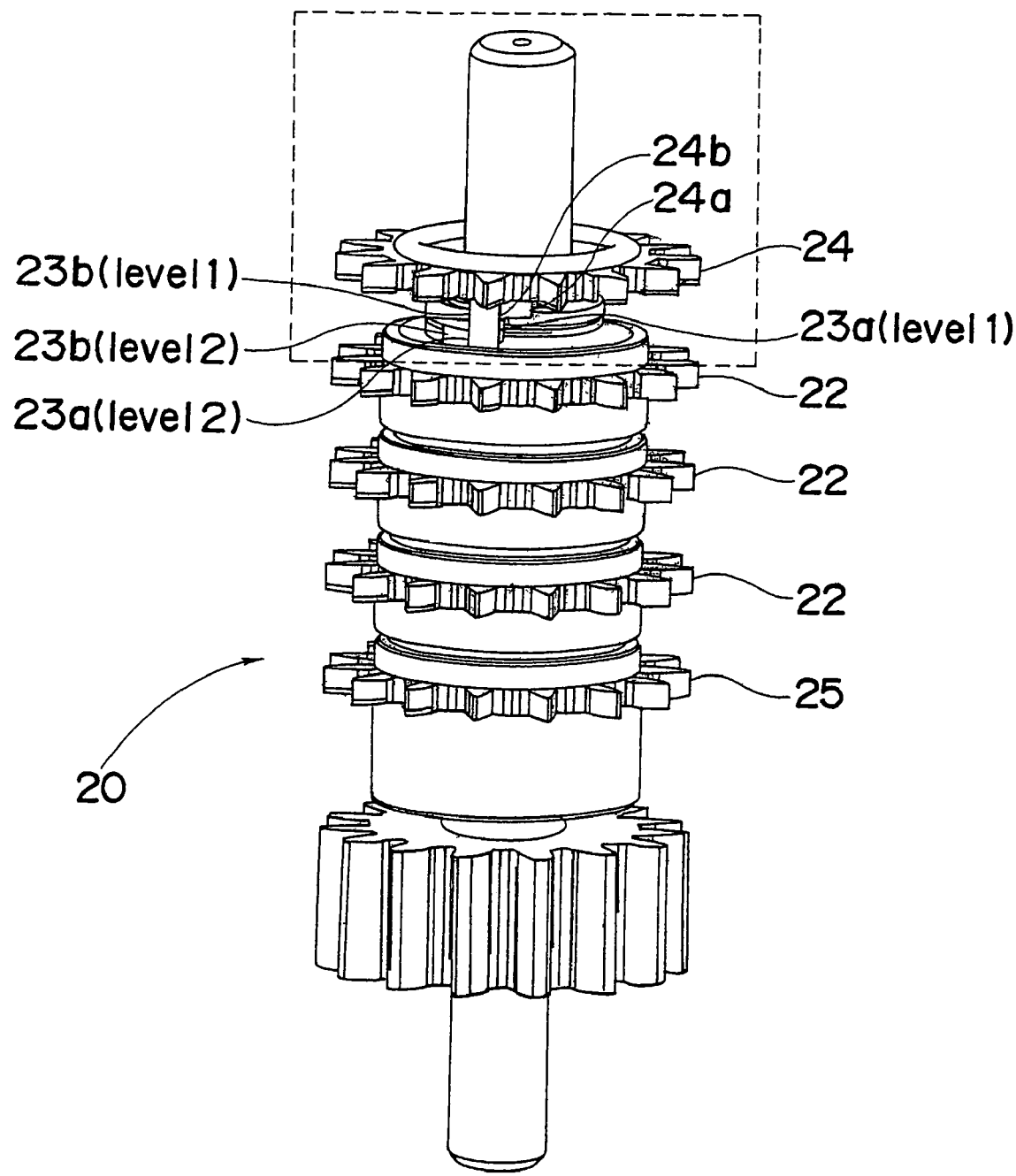
FIG. 13(b) is a perspective view of a complete assembly of the tray driving gear unit.

FIG. 13(a) is an exploded view of the tray driving gear unit 20. The reference numeral 24 denotes a top tray drive gear which drives the upper most tray T1, the reference numeral 22 denotes a tray drive gear which drives trays T (T2-T4) other than the upper most tray T1 and the lower most tray T5, the reference numeral 25 denotes a bottom tray drive gear which drives the lower most tray T5. Further, the reference numeral 23 denotes a plastic ring located between two drive gears adjacent to each other which enables the drive gear 22, 24 or 25 to have a dummy turning, and the reference numeral 21 denotes a shaft gear fixed to a shaft 21s which holds all drive gears 22, 24, 25 and the plastic rings 23. Top drive gear 24 is fitted to the shaft 21s in a tight fitting condition and rotates as one solid body with it. FIG. 13(b) shows a complete assembly of the tray driving gear unit 20. As seen from FIG. 13(b), the plastic ring 23 is provided with stopper ribs 23a, 23b, the top tray drive gear 24 is provided with stopper ribs 24a, 24b.

Figure 14:
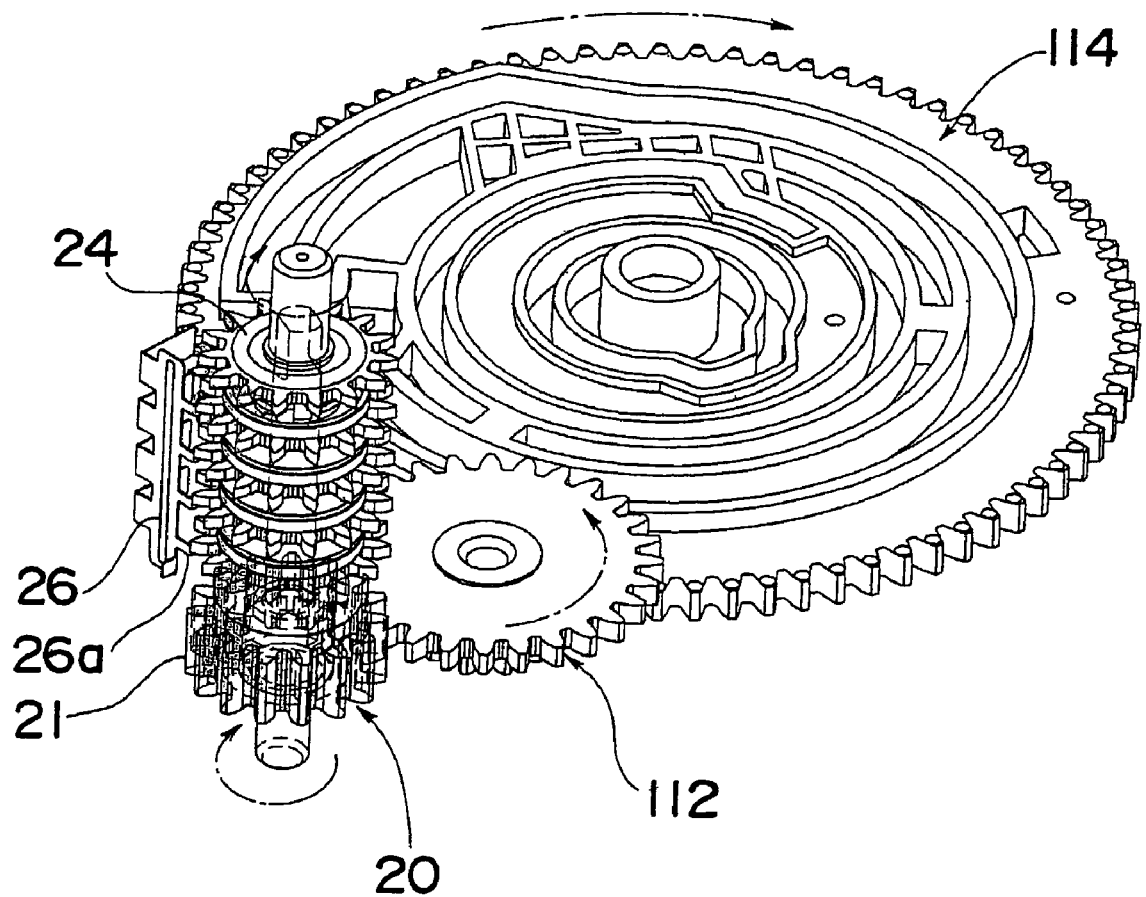
FIG. 14 is a perspective view of the tray driving gear unit and a gear mechanism for driving it.

FIG. 14 is a perspective view of the tray driving gear unit 20 and a gear mechanism for driving it. As shown in FIG. 14, the shaft gear 21 of the tray driving gear unit 20 is engaged with a tray relay gear 112 which is driven by the cam gear 114. When cam gear 114 rotates in a clockwise direction, the shaft gear 21 is driven to rotate in the same direction. The top driving gear 24 also rotates in the same direction.

It is to be noted that a metal spring 26 having protrusions 26a is provided at a vicinity of tray driving gear unit 20. And, the protrusions 26a of the metal spring 26 are touching to side portions of tray drive gears 22 and 25, thereby friction force is provided to the tray drive gears 22 and 25 so that they are held in position before they are driven by actual force from a electric motor 116 (described in more detail below with reference to FIG. 21).

Figure 15A:
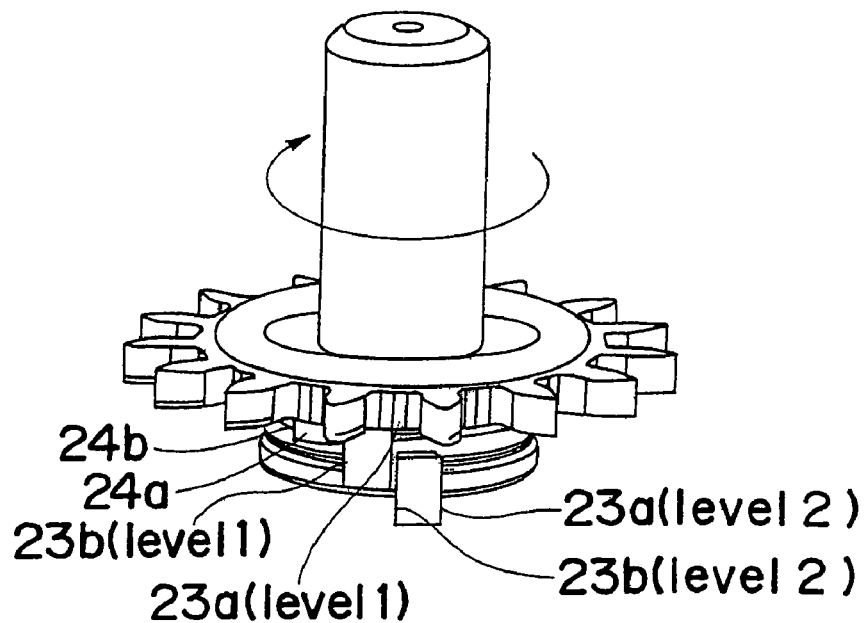
FIGS. 15(a) to 15(h) are explanatory drawings showing a sequence of "RESET" the tray driving gear unit.
Figure 15B:
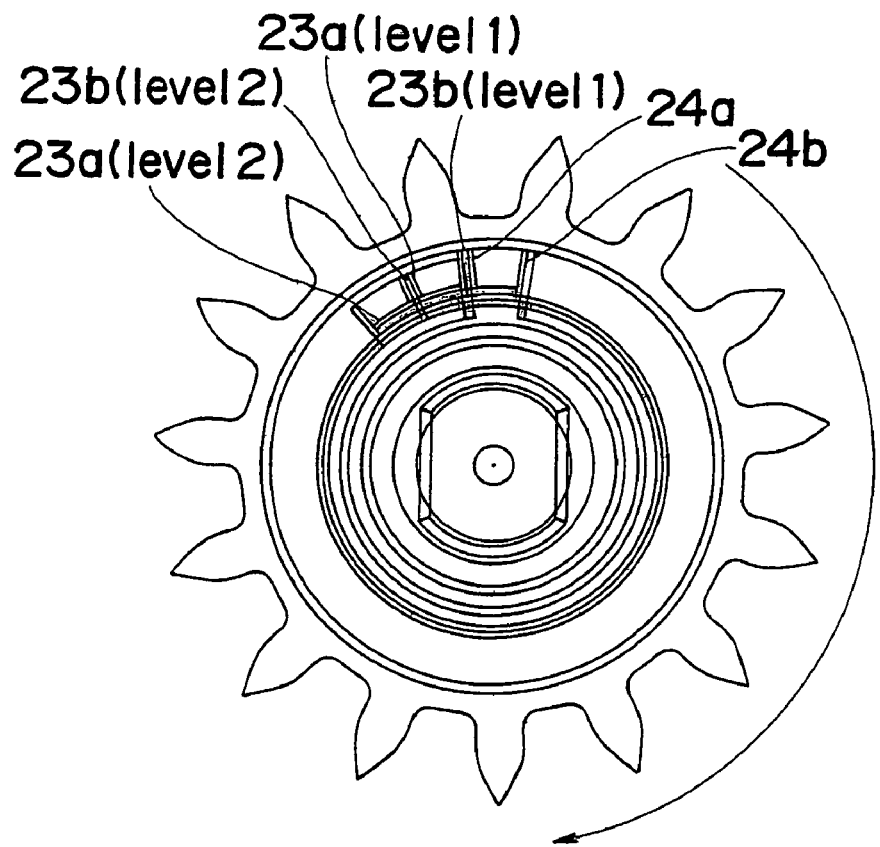
Figure 15C:
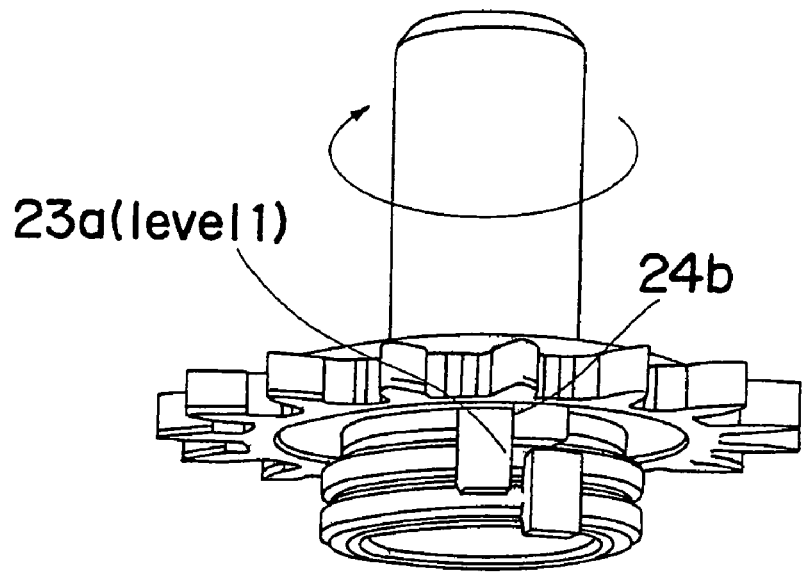
Figure 15D:
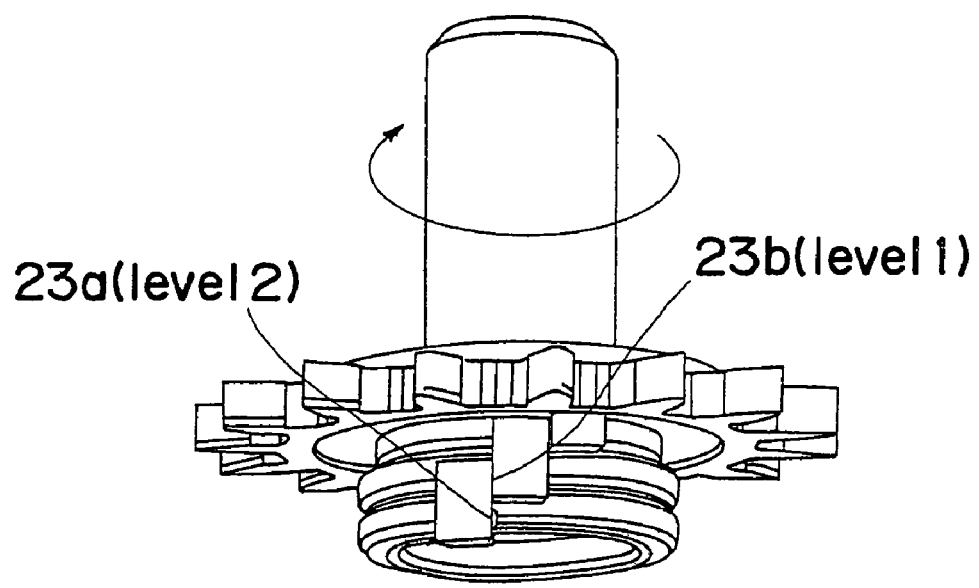
Figure 15:
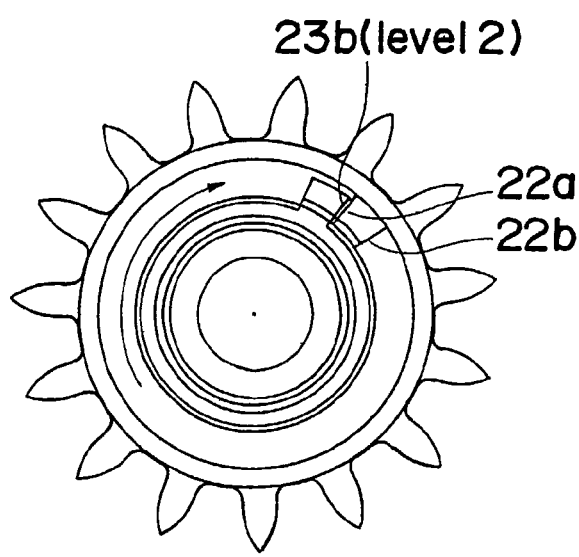
Figure 15:
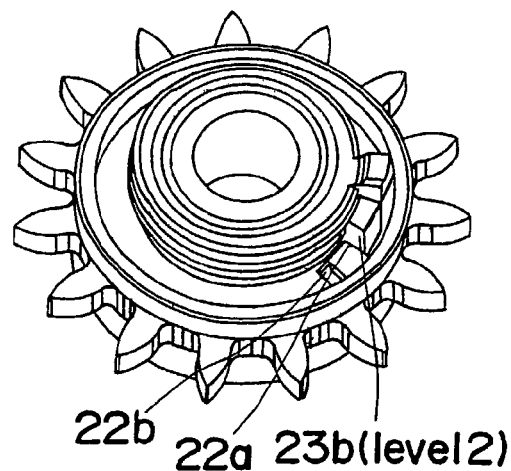
Figure 15:
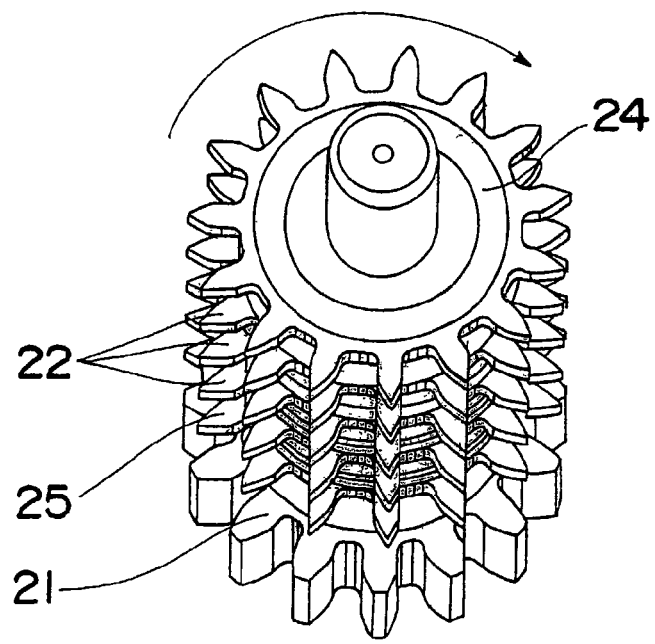
Figure 16:
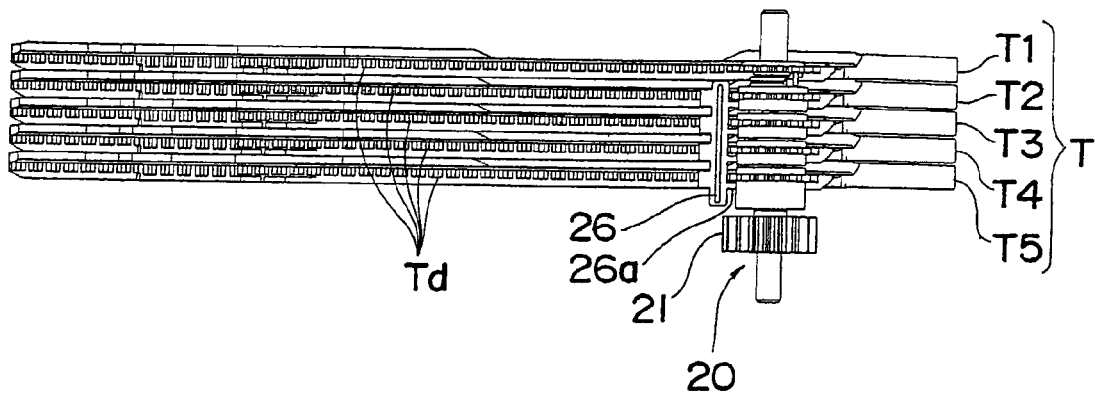
FIG. 16 is a side view of the tray driving gear unit with trays at the standby position.
Figure 17:
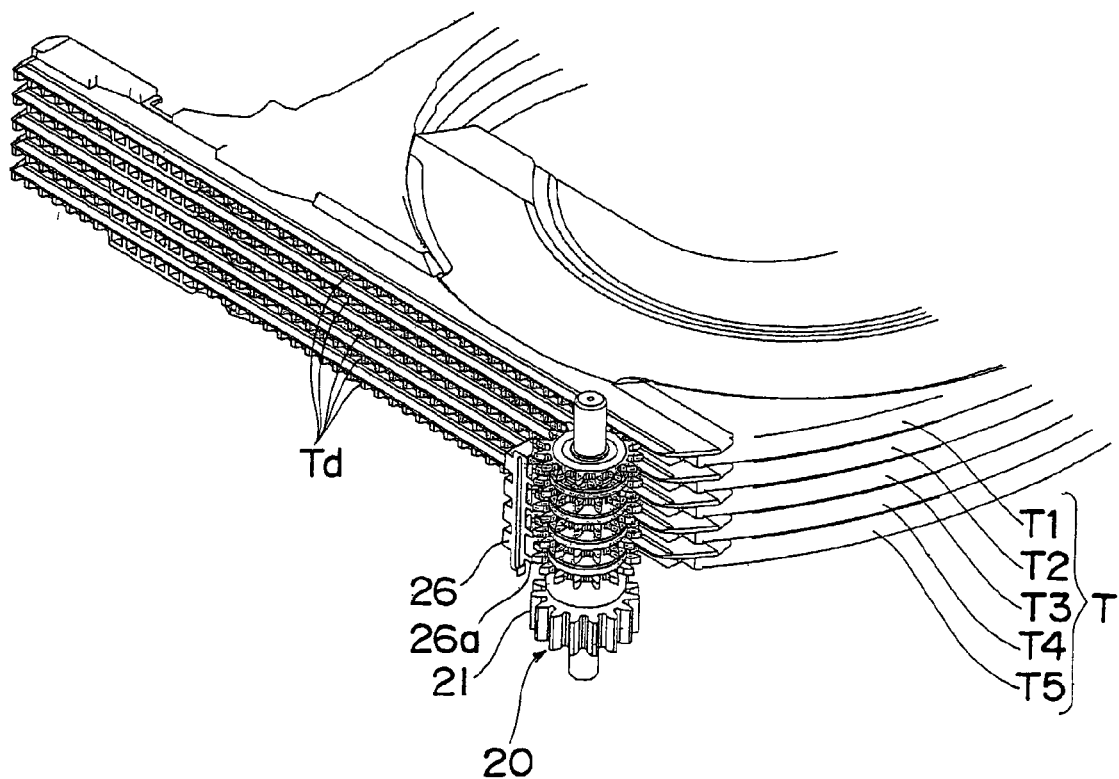
FIG. 17 is an enlarged perspective view of the tray driving gear unit with trays at the standby position.
Figure 18A:
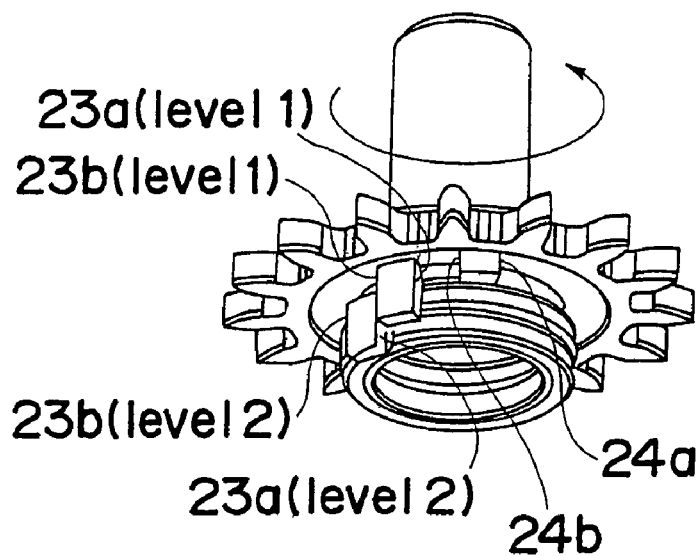
FIGS. 18(a) to 18(d) are explanatory drawings showing a sequence of the tray driving gear unit for driving trays one by one from top to bottom.
Figure 18B:
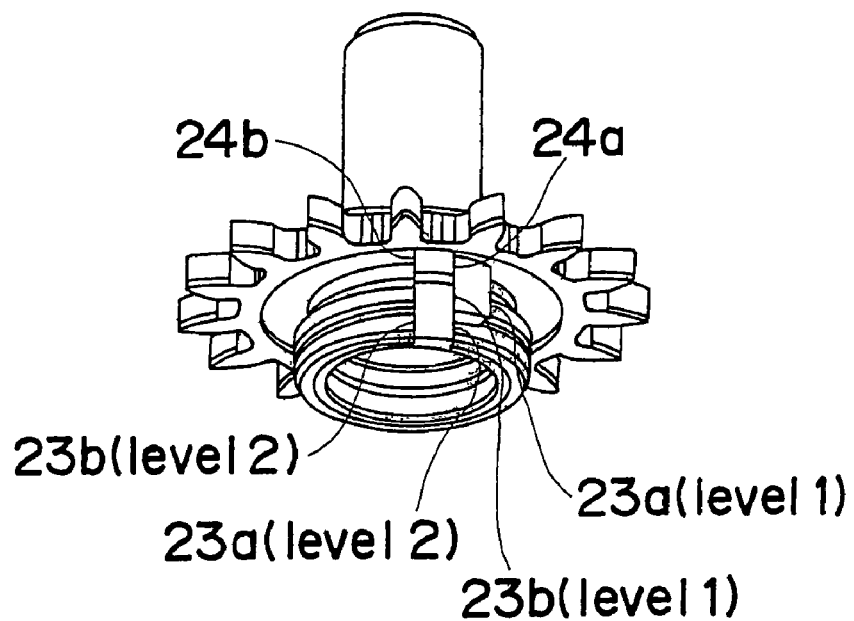
Figure 18C:
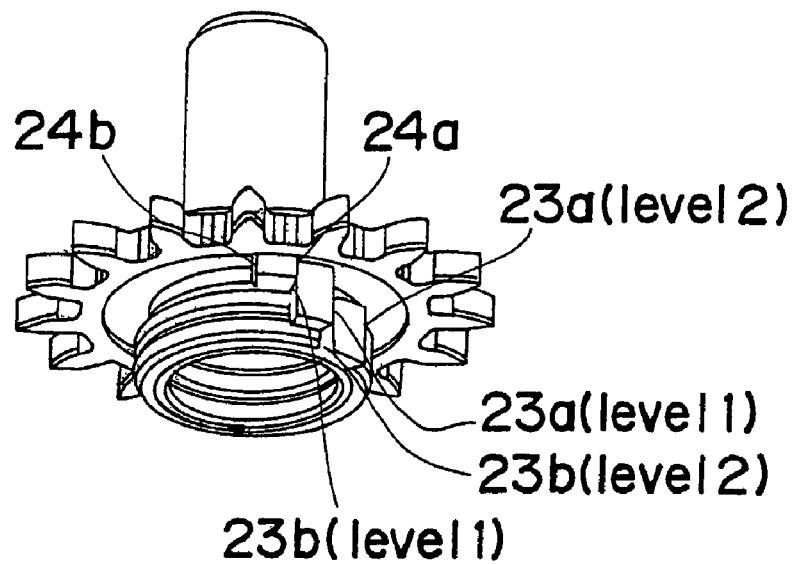
Figure 18D:
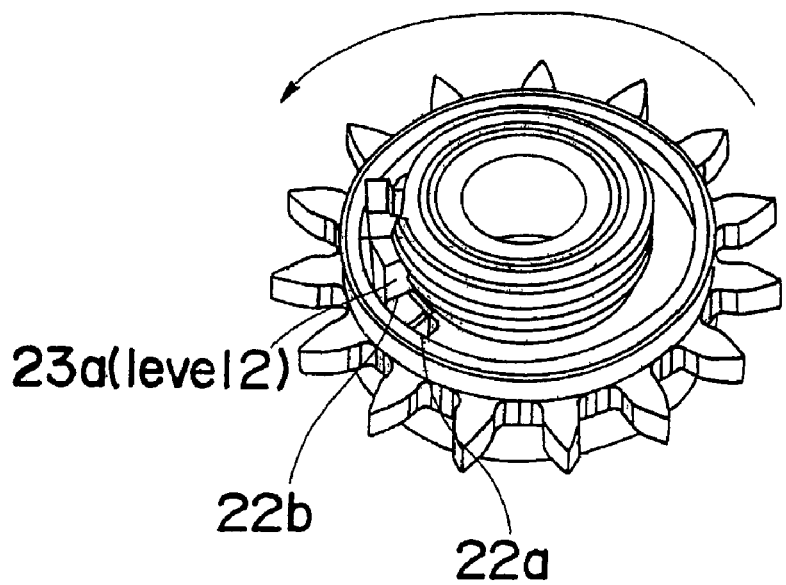

FIGS. 15(a) to 15(g) show a "RESET" operation of the tray driving gear unit 20. The "RESET" is to rotate all tray drive gears 22, 24 and 25 with the same rotational speed, as if they were one solid gear which has a plurality of layers of drive gears 22, 24 and 25 capable of engaging a plurality of trays T. In this explanation, only the top tray drive gear 24 and the adjacent lower level tray drive gear 23 are explained because the "RESET" sequence for the following tray drive gears is the same. FIGS. 16 and 17 show the tray driving gear unit 20 after driving all trays T to the standby position Y.

In order to drive the trays T to the disc exchange position X, the tray driving gear unit 20 needs to rotate in a clockwise direction in the drawings. A tray relay gear 112 which is driven by the cam gear 114 rotates to turn the shaft gear 21. Referring to FIGS. 14 and 15(a), as the top tray drive gear 24 rotates together with the shaft 21s in the clockwise direction, a side surface of the stopper rib 24b on the top tray drive gear 24 will contact a side surface of the stopper rib 23a (level 1) on the adjacent lower level plastic ring 23 after about 1 round of rotation. Top tray drive gear 24 and the plastic ring 23 rotate together and continue the second rotation, until a side surface of the stopper rib 23b (level 1) of the plastic ring 23 contacts to a side surface of the stopper rib 23a (level 2) which is located 2 levels lower than top tray drive gear 24.

FIGS. 15(e) and 15(f) are the top and isometric views of the tray driving gear unit 20 without the top tray drive gear 24. When a stopper rib 23a of the second level plastic ring 23 rotates, it touches the stopper rib 22b on the next tray drive gear 22. This tray drive gear 22 now will rotate in the same direction and speed with top drive gear 24. The rotation continues until the bottom tray drive gear 25 starts to rotate, at this time the tray driving gear unit 20 is completely "RESET" as shown in FIG. 15(g). In this condition, all gear teeth are aligned with each other and rotate as one solid body gear.

FIG. 16 is a side view of tray driving gear unit 20 with trays T at standby position Y. And, FIG. 17 is an enlarged perspective view of tray driving gear unit 20 with trays T at standby position Y. As explained above, the metal spring 26 having protrusions 26a is provided at a vicinity of the tray driving gear unit 20. The protrusions 26a of the metal spring 26 are touching side portions of the tray drive gears 22 and 25, thereby friction force is provided to the tray drive gears 22 and 25 so that they are held in position before they are driven by actual force from the motor 116.

FIGS. 18(a) to 18(d) show the operation of the tray driving gear unit 20 for driving trays T to disc standby position Y, one by one from top to bottom. Top tray drive gear 24 tightly fitted to the shaft 21s at this time also starts to rotate among all tray drive gears.

In order to drive trays T from the disc exchange position X to the standby position Y, the tray driving gear unit 20 needs to rotate in a counterclockwise direction in the drawings. This time, the side surface of the stopper rib 24a after the first rotation will contact the side surface of the stopper rib 23b (level 1) of the plastic ring 23, thereby the tray T is driven from the disc exchange position X to a half-way position between the disc exchange position X and the standby position Y, because number of plastic ring 23 used between the tray drive gears is two. The second rotation continues until the stopper rib 23a (level 1) contacts the stopper rib 23b (level 2). Top tray T1 is now completely driven to the standby position Y. The second tray T2 will start to move when the stopper rib 23a (level 2) rotates and pushes the stopper rib 22b on the lower tray drive gear 22.

Figure 19A:
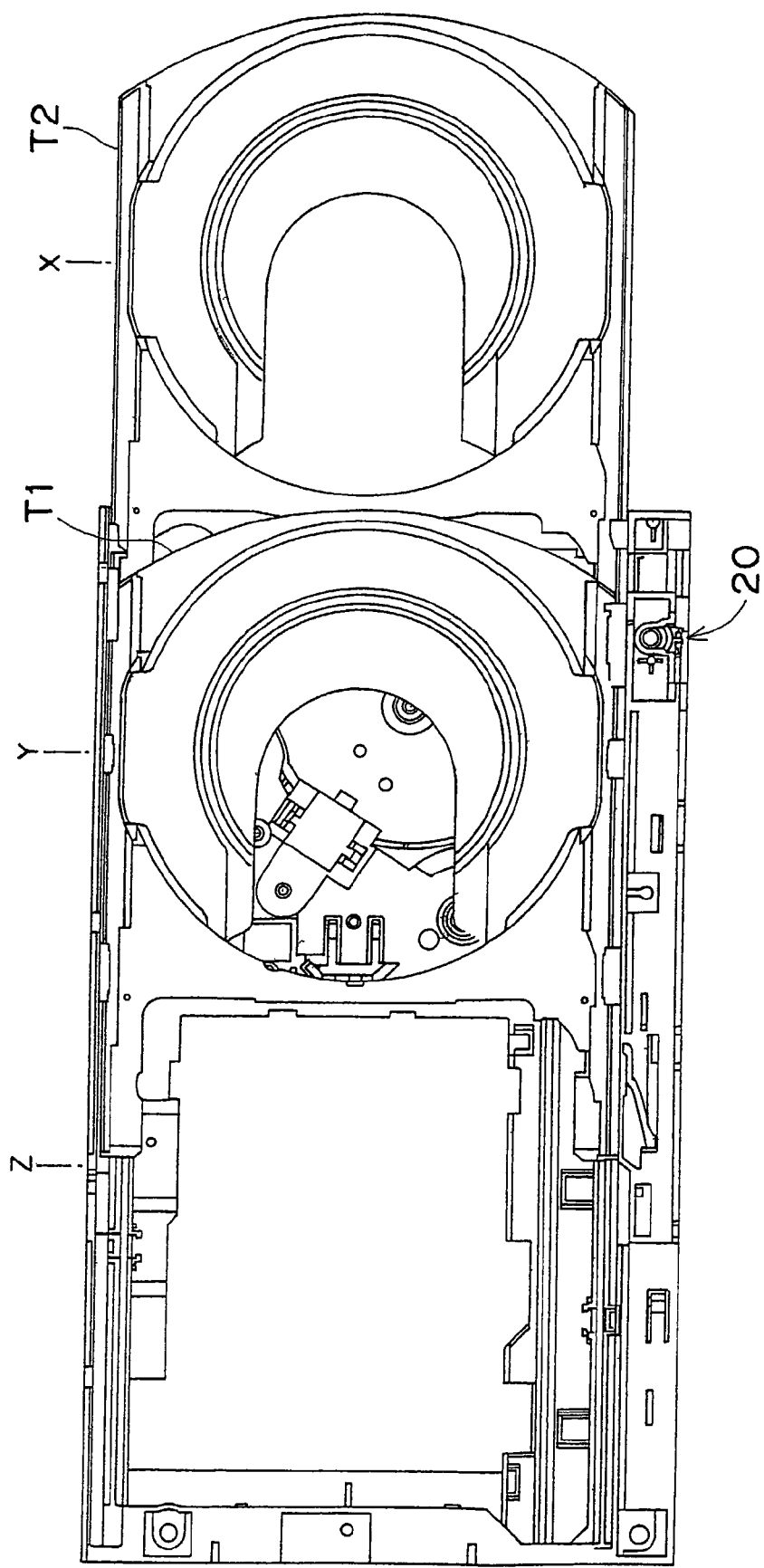
FIG. 19(a) is a top view of the disc changer.
Figure 19B:
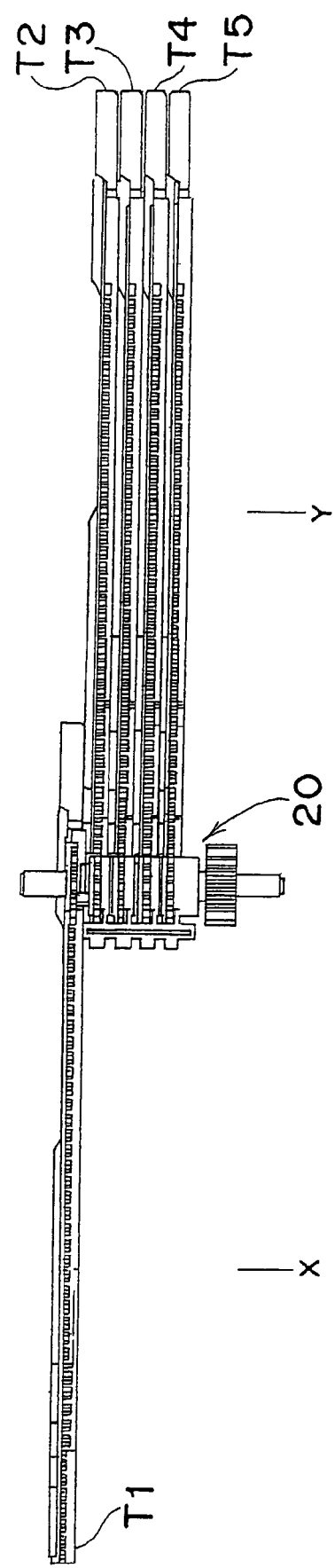
FIG. 19(b) is a side view showing the tray driving gear unit which engages with trays.

FIG. 19(a) is a plan view of the disc changer 1, where the top tray T1 has been driven by the top tray drive gear 24 to the standby position Y and the second tray T2 is waiting for rotation of tray driving gear unit 20 to move from the disc exchange position X to the standby position Y. FIG. 19(b) shows the tray driving gear unit 20 which engages with trays T. Top tray T1 moves to the standby position Y and disengages from the tray drive gear 22 and other lower level trays T are at the disc exchange position X. Closing of trays T will be performed from top to bottom.

Figure 20A:
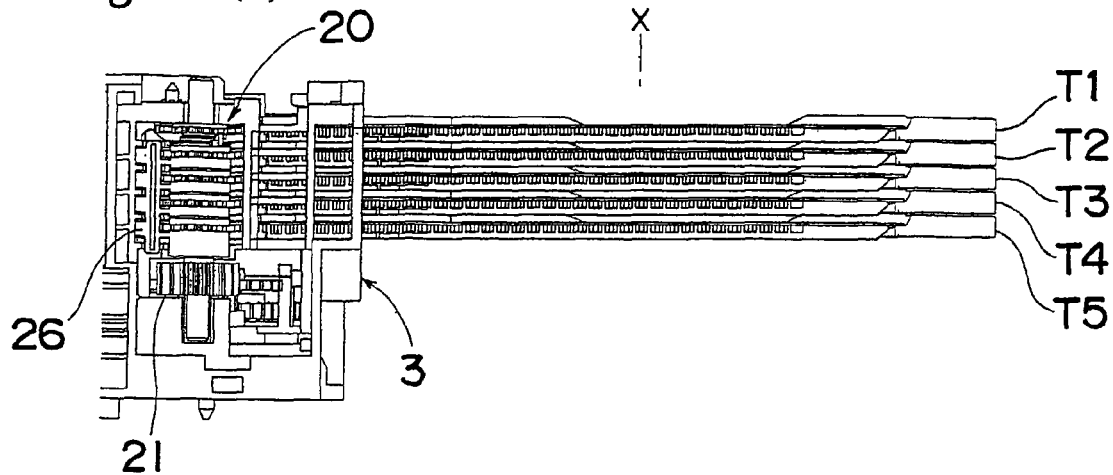
FIGS. 20(a) to 20(c) are side views showing a sequence of closing the top tray from the disc exchange position to the disc standby position.
Figure 20B:
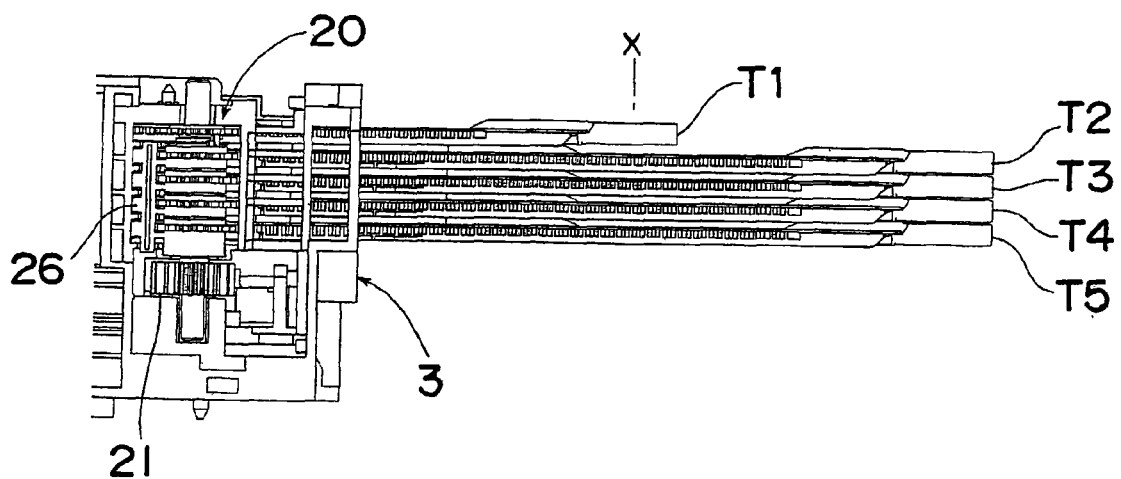
Figure 20C:
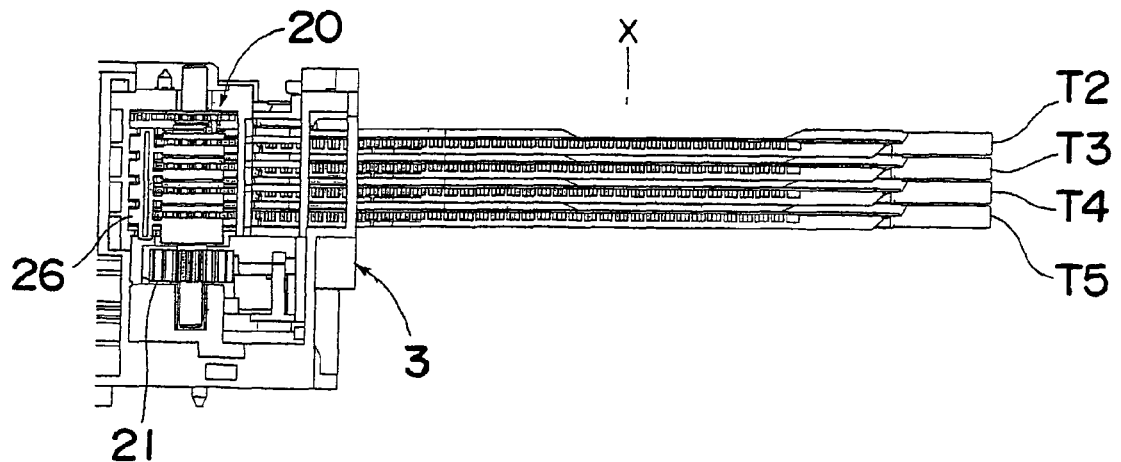

FIGS. 20(a) to 20(c) are side views showing a sequence of closing the top tray T1 from the disc exchange position X to the disc standby position Y. FIG. 20(a) shows a state in which all trays T are positioned at the disc exchange position X. It is to be noted that the tray driving gear unit 20 is to rotate as one body when it drives trays T to the disc exchange position X.

FIG. 20(b) shows a state in which the top tray T1 is closed to half way between the disc exchange position X and the disc standby position Y. It is performed by a first rotation of the tray driving gear unit 20. FIG. 20(c) shows a state in which the top tray T1 is fully closed to the disc standby position Y. It is performed by a second rotation of the tray driving gear unit 20. Thereafter, the second tray T2 will start to move, if the tray driving gear unit 20 continues to rotate.

Figure 15H:
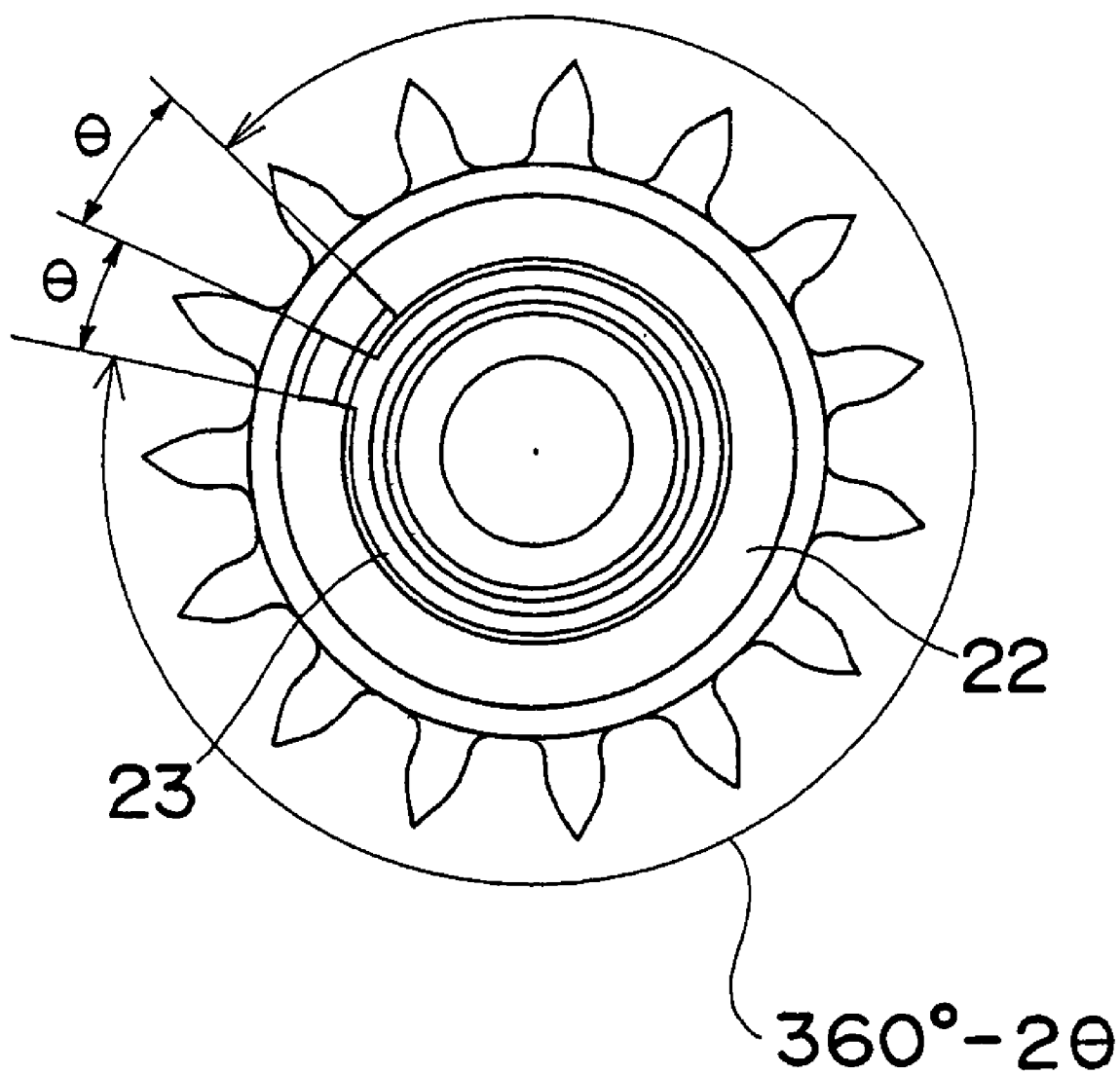

The plastic rings 23 in this design are useful for reducing the size of the tray drive gears 22 by providing dummy rotation to the drive gears. A first tray drive gear will rotate to close a tray T just after the tray T disengages from the first tray drive gear, and a stopper rib of the first tray drive gear will hit a stopper rib of the plastic ring 23, so that a second tray drive gear is rotated. This means that the first tray drive gear will rotate by a degree of (360−2θ) (where angle θ is an angle corresponding to a width of a stopper rib, as shown in FIG. 15(h) to drive the tray to disc standby position before the second tray drive gear starts to rotate to drive a second tray T2.

If there were no plastic rings 23, the PCD (pitch circle diameter) of drive gears of "$D_1$" for a tray ejection stroke of "y" would be given by the formula (1).

$$D_1 = [y/\pi] \times [360/(360-2\theta)] \tag{1}$$

Since plastic rings 23 are used, the PCD (pitch circle diameter) of drive gears of "$D_2$" for a tray ejection stroke of "y" will be given by the following formula (2). In this case, a tray ejection stroke of "y" will consist of a stroke achieved by a tray drive gear 22 and a stroke achieved by a plastic ring 23.

$$y = \pi D_2[(360-2\theta)/360] + D_2[(360-2\theta)/360] = 2\pi D_2[(360-2\theta)/360]$$

$$D_2 = [1/2] \times [y/\pi] \times [360/(360-2)]$$

$$D_2 = [1/2]D_1 \tag{2}$$

Therefore, by using plastic rings 23 (dummy rings), the PCD of tray drive gear 22 can be reduced by ½.

If "n" pieces of plastic rings 23 were used (as they might be in other embodiments of the invention), the PCD (pitch circle diameter) of drive gears of "Dn" for a tray ejection stroke of "y" would be given by the following formula (3).

$$y = \pi D_2[(360-2\theta)/360] + n\{\pi D_2[(360-2\theta)/360]\} = (1+n)\pi D_2[(360-2\theta)/360]$$

$$Dn = [1/(1+n)] \times [y/\pi] \times [360/(360-2\theta)]$$

$$Dn = [1/(1+n)]D_1 \quad (3)$$

With more plastic rings 23, the diameter of tray drive gear 22 can be reduced more.

Next, a driving mechanism of the disc changer 1 will be explained.

Figure 21:
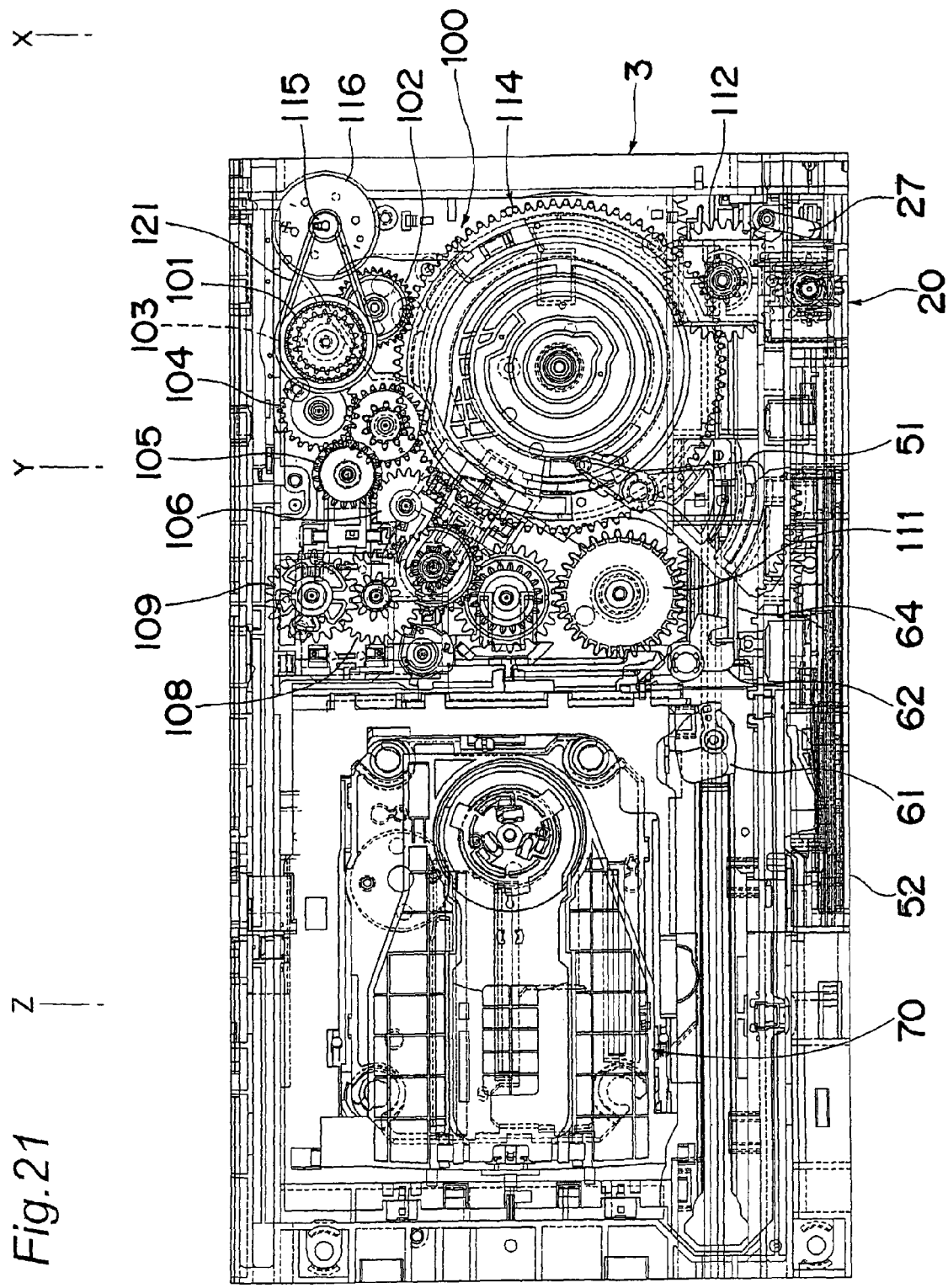
FIG. 21 is a plan view showing a total layout of a driving (gear) mechanism in the disc changer according to the embodiment.
Figure 22:
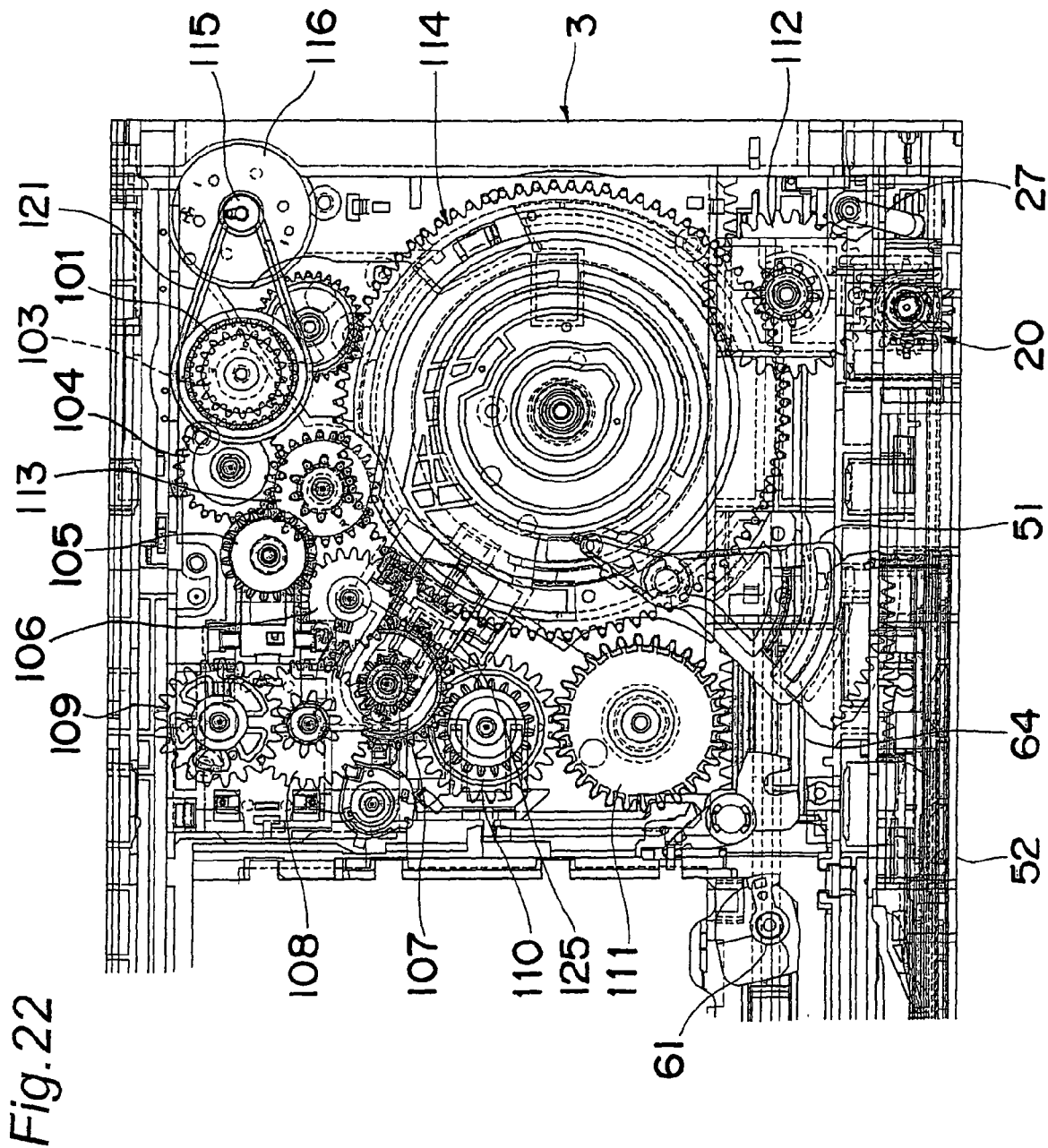
FIG. 22 is a plan view showing the details of a main part of FIG. 21.

FIG. 21 is a plan view showing a total layout of a driving (gear) mechanism 100 in the disc changer 1 according to the embodiment. FIG. 22 is a plan view showing the details of a main part of FIG. 21.

In FIGS. 21 and 22, a reference character Z denotes a disc recording/reproducing position, a reference character Y denotes a disc standby position and a reference character X denotes the disc exchange position. Also, a reference numeral 100 denotes a gear mechanism of the disc changer 1 located at the disc standby position Y.

Figure 23:
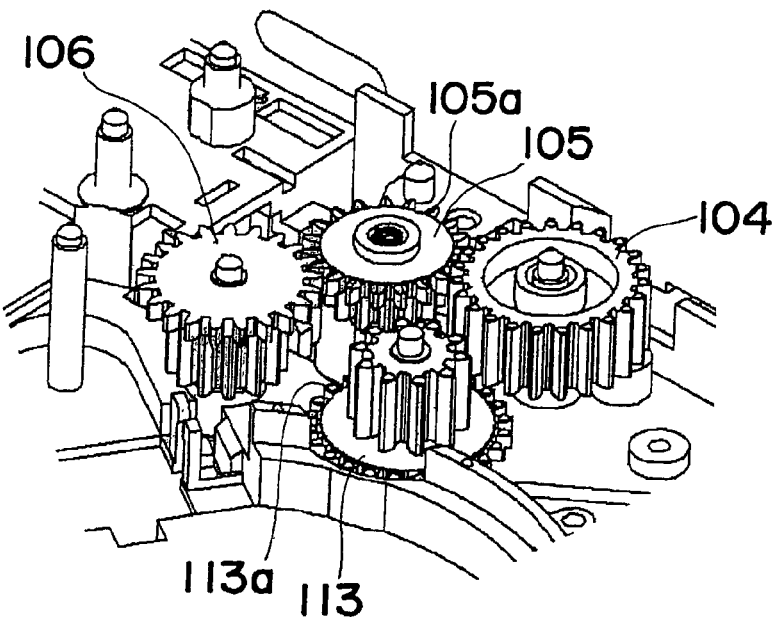
FIG. 23 is a perspective view showing a gear engagement around a switching gear.

In FIGS. 21, 22 and 23, a reference numeral 116 denotes an electric motor which provides driving power to the gear mechanism. The driving mechanism 100 includes a motor pulley 115, a belt 121, a pulley gear 101, a first relay gear 102, a second relay gear 103 and a third relay gear 104. The second relay gear 103 is provided on a back side of the pulley gear 101. The driving mechanism 100 also includes a switching gear 105, a long gear 106, a function gear 107, a first UD gear 108, a second UD gear 109, a first play gear 110 and a second play gear 111. Further, the driving mechanism 100 includes a main drive gear 113, a cam gear 114 and a tray relay gear 112. All the drive gears are located inside the mechanical chassis 3.

FIG. 23 is a perspective view showing a gear engagement around a switching gear 105. Switching gear 105 always engages to the third relay gear 104 and an up/down movement of the switching gear 105 is performed by sliding along the third relay gear 104. Each switching gear tooth 105a has a taper surface for easy engagement to a long gear 106 and a main drive gear 113. The main drive gear 113 has a coining profile 113a on each gear tooth for easy engagement to the switching gear 105.

Figure 24:
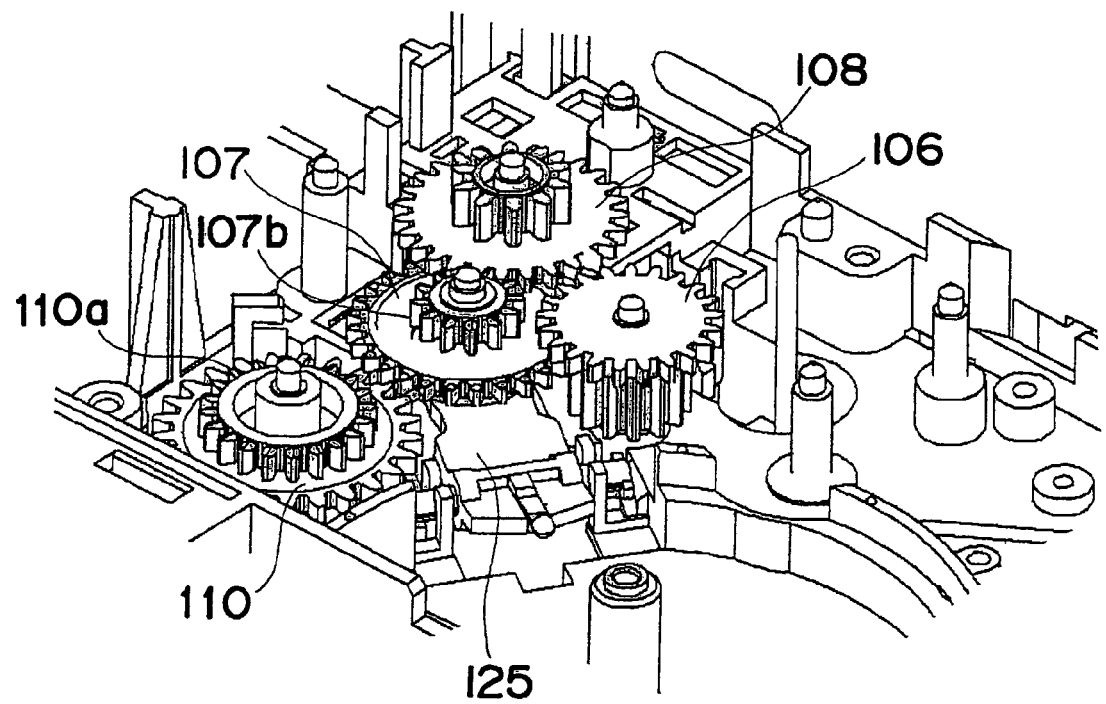
FIG. 24 is a perspective view showing a gear engagement around a function gear.

FIG. 24 is a perspective view showing a gear engagement around a function gear 107. Function gear 107 always engages to the long gear 106 and an up/down movement of the function gear 107 is performed by sliding along the long gear 106. Each function gear tooth 107b has a taper surface for easy engagement to a first UD gear 108 and a first play gear 110. The first play gear has a coining profile 110a on each gear tooth for easy engagement to the function gear 107.

FIGS. 25(*a*) and 25(*b*) are schematic side views showing a first gear train changing system by a switching gear 105. As shown in FIG. 25(*a*), the switching gear 105 is supported by a plunger lever 126. When an electric current is applied to a plunger unit 117, the plunger unit 17 pulls the plunger lever 126 by using a moving core 118, and in this way the switching gear 105 will be lifted up to engage with the long gear 106. On the other hand, when no electric current is supplied to the plunger unit 117, the switching gear 105 will be pushed down by a coil spring 119 and engaged with the main drive gear 113, as shown in FIG. 25(*b*).

The operation of the driving mechanism 100 when the switching gear 105 is at the lower position is to drive the functions of a tray open/close system or selection system (play/stock driving/elevation driving). On the other hand, the operation of the driving mechanism 100 when the switching gear 105 is at the upper position is to drive the functions of a tray play/stock system or an elevation system.

Figure 26A:
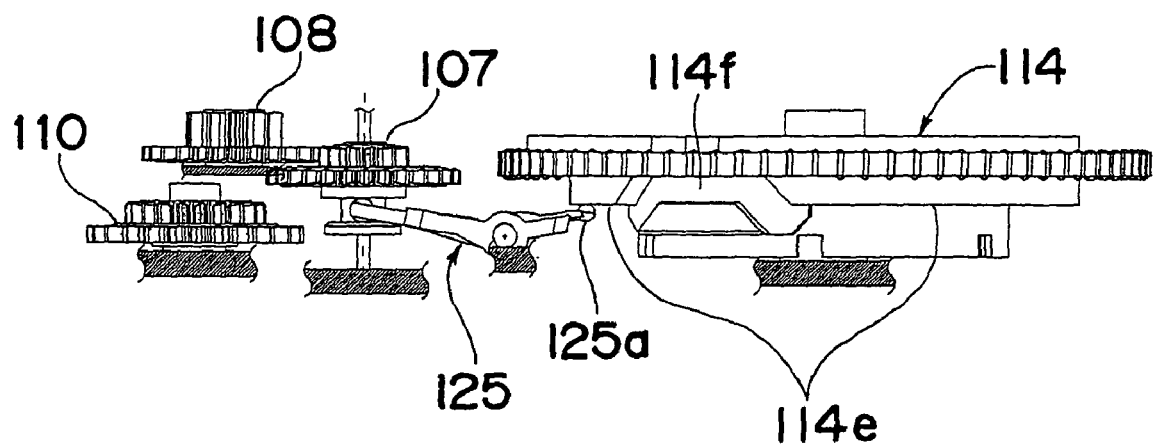
FIGS. 26(a) and 26(b) are schematic side views showing the second gear train changing system by a function gear.
Figure 26B:
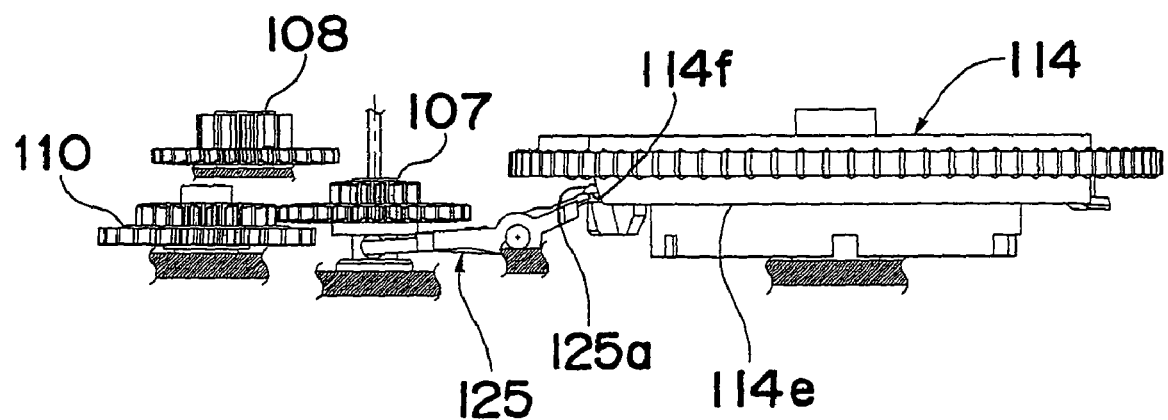

FIGS. 26(*a*) and 26(*b*) are schematic side views showing the second gear train changing system by a function gear 107. As shown in these drawings, the function gear 107 is supported by a function lever 125. The round end portion 125a of the function lever 125 moves following to the outer profiles 114e and 114f at the lower side of the cam gear 114. When cam gear 114 rotates and plan profile 114e is touching the round end portion 125a of the function gear 107, the function gear 107 is lifted up by the function lever 125. At this time, the function gear 107 is engaged with the first UD gear 108 which will drive the elevation system. FIG. 26(*b*) shows a flat surface 114f of the cam gear 114 touching the round end portion 125a. In this state, the function gear 107 is pushed down by the function lever 125, and the function gear 107 is engaged with the first play gear 110 which will drive the tray play/stock system.

Figure 27:
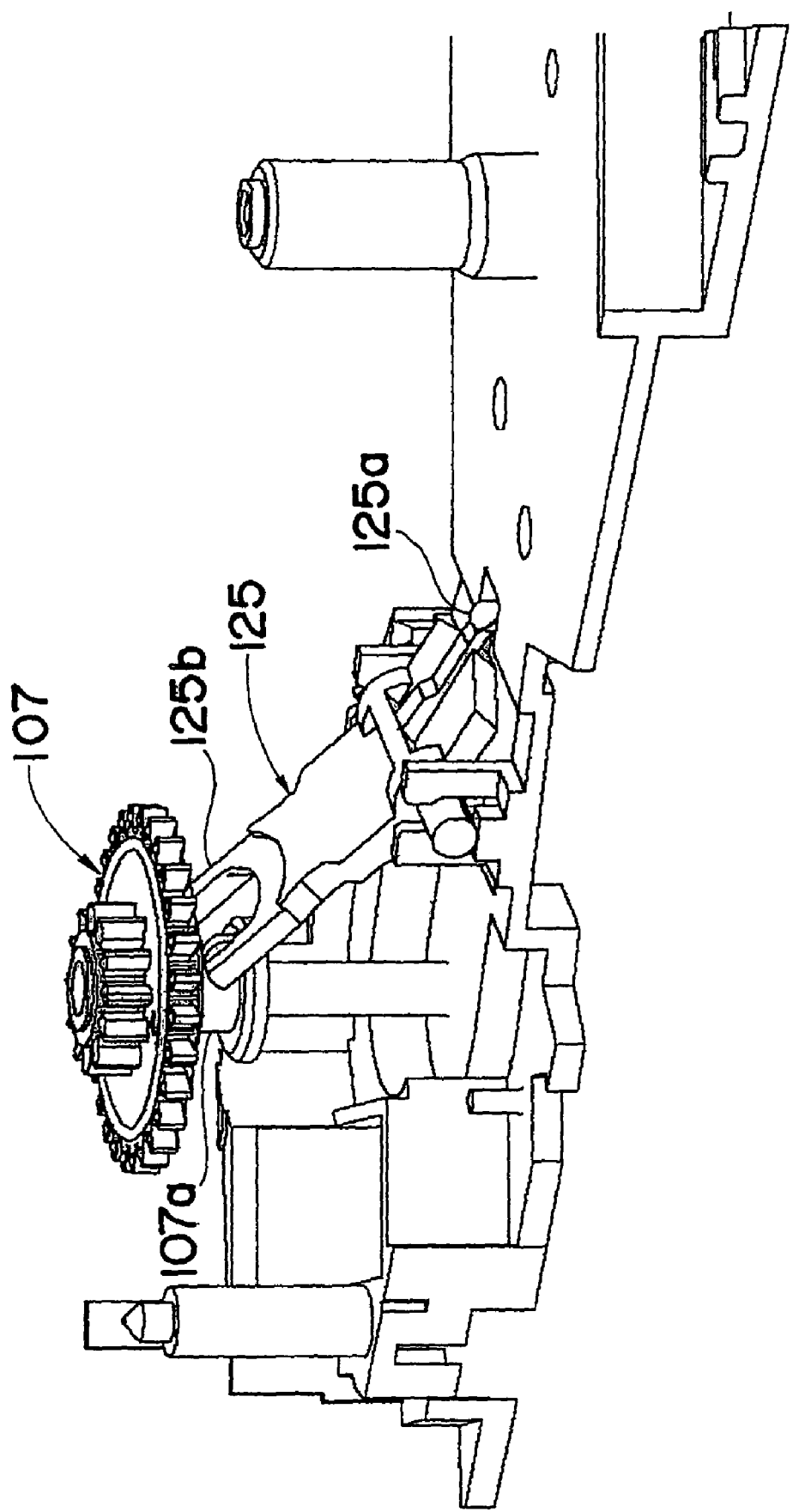
FIG. 27 is a perspective view of a function lever and a function gear in an assembly condition.

FIG. 27 is a perspective view of a function lever 125 and a function gear 107 of the disc changer 1 in an assembly condition. Function lever 125 has a hook portion 125b which holds a gear body 107a of the function gear 107. With the configuration, function lever 125 can always hold the function gear 107, and the function gear 107 can move in a vertical direction by a motion of the function lever 125.

FIG. 28(*a*) is a plan view showing a cam gear 114. And FIG. 28(*b*) is a perspective view showing the outer profiles 114e and 114f at the lower side of the cam gear 114. As shown in FIG. 28(*a*), the gear teeth 114a of the cam gear 114 are engaged with the main drive gear 113 and the tray relay gear 112. The cam gear 114 has cam grooves 114b, 114c and 114d to create the rotational movements of the trigger gear 51, the first lock lever 93 and the second lock lever 94.

The outer profile 114e and 114f at the lower side of the cam gear 114 is used to change the state of function lever 125. The flat surface profile 114e allows the function gear 107 to engage to perform an elevation driving function and the flat surface profile 114f allows the function gear 107 to engage to perform a tray play/stock function. The cam gear 114 also has a sensor profile 114g for sensing changes of electronic sensor signal for indicating the tray T condition when opening or closing.

Figure 29:
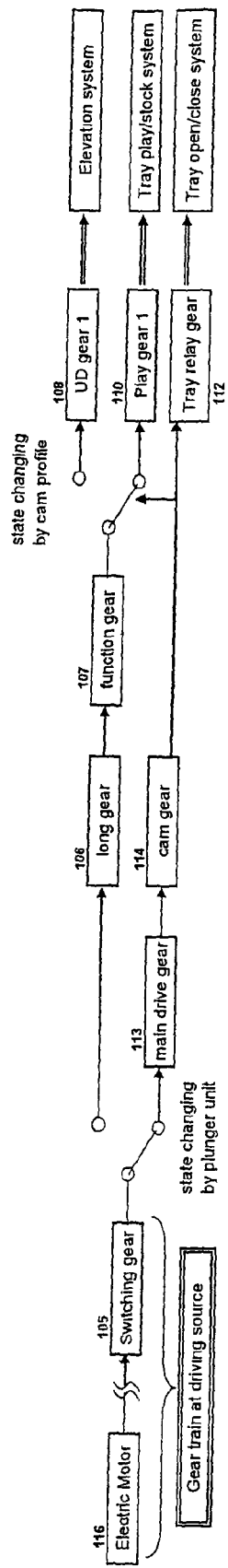
FIG. 29 is a block diagram for explaining a switching mode of the driving mechanism in the disc changer.

In order to achieve single motor driving, the driving mechanism 100 of the disc changer 1 has a switching mode as explained by a block diagram shown in FIG. 29. Power supplied from electric motor 116 is directed to the different gear train systems (an elevation system, a tray play/stock system and a tray open/close system) by using the switching gear 105 and the function gear 107. The level of both gears is changed by using the plunger unit 117 and the flat surface profiles 114e and 114f of the cam gear 114.

Figure 30:
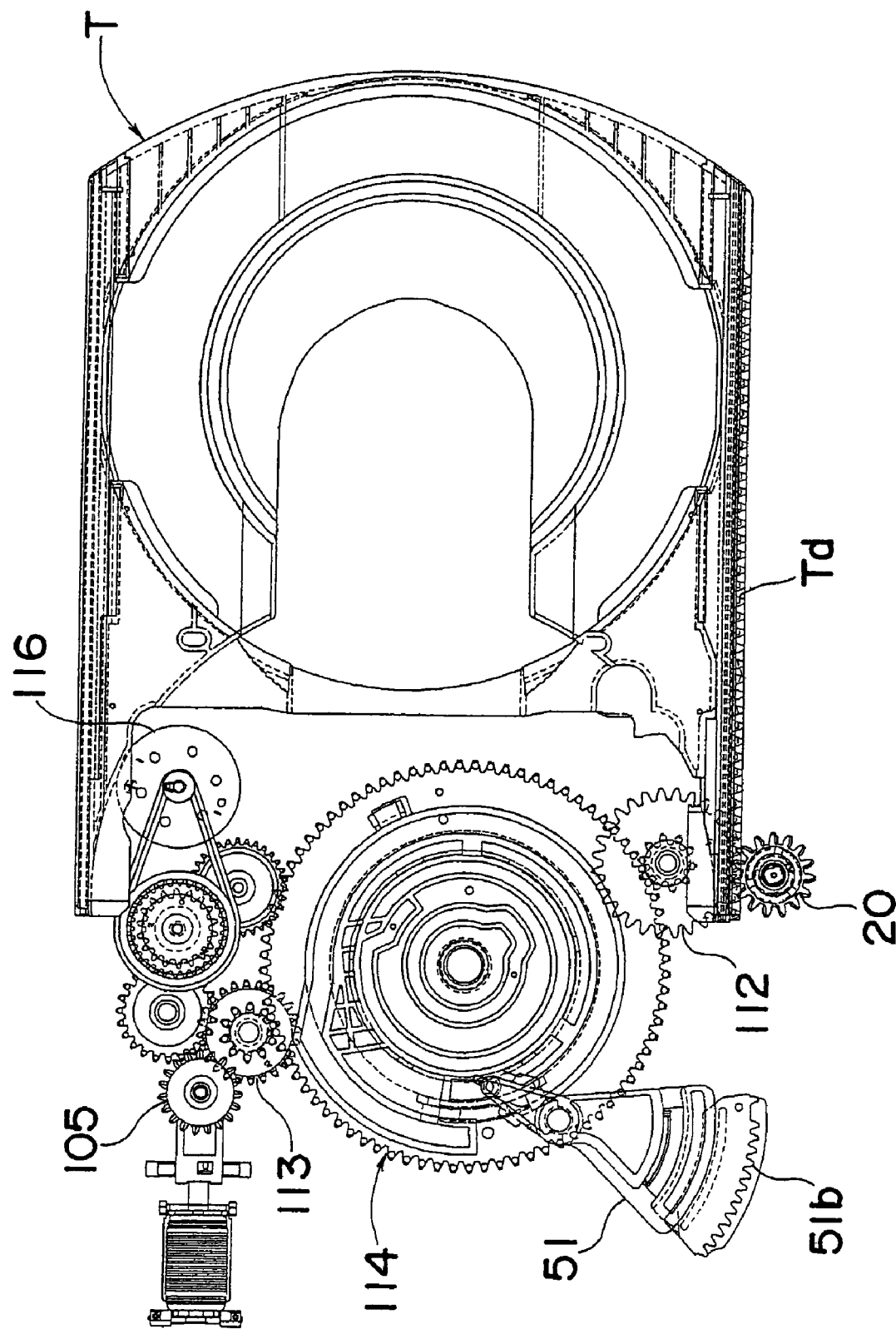
FIG. 30 is a plan view showing a gear train of a tray open/close system in the disc changer.

FIG. 30 is a plan view showing a gear train of a tray open/close system in the disc changer 1. This gear train drives trays T between the disc exchange position X and the disc standby position Y.

When the disc changer 1 operates to drive the gear train of tray open/close system, a driving source gear train will connect to the main drive gear 113. The driving source gear train is to connect the driving source from the electrical motor 116 all the way until the switching gear 105. The gear train is from cam gear 114, tray relay gear 112 and then to tray driving gear unit 20 through a shaft gear 21. The tray driving gear unit 20 is designed such that it can drive all trays T from the standby position Y to disc exchange position X at once.

FIGS. 31(a) to 31(d) are plan views showing the sequence of tray opening operations which are mainly controlled by cam gear 114. The tray open/close system includes the triggering section 50 and tray driving gear unit 20. The triggering section 50 comprises a trigger gear 51, a trigger slide plate 52 and a tray lock lever 53. When the disc changer 1 is operated to drive the tray open/close system, the cam gear 114 rotates in clockwise direction to move a tray T to disc exchange position X (open), or rotates in counter clock-wise to move a tray T to disc standby position Y (close). In the case of opening the trays T, at the time the cam gear 114 rotates, the tray driving gear unit 20 rotates to "RESET" all the drive gears in order to rotate as one body, and the cam profile 114b at the same time pushes the trigger gear 51 to rotate to drive the trigger slide plate 52.

Figure 31A:
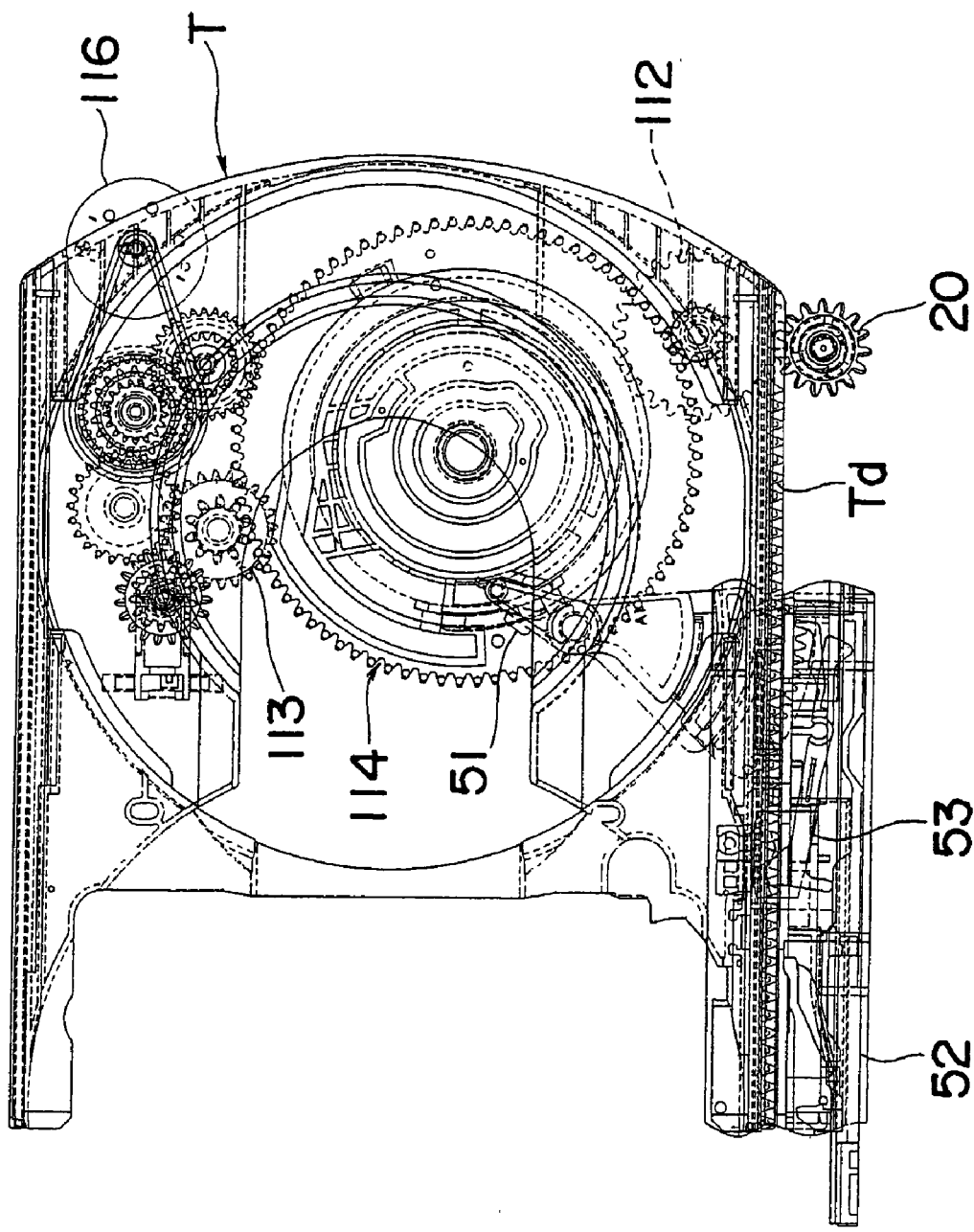

FIG. 31(a) shows the state at the instant that the tray open/close system starts to move. The tray lock lever 53 in this state locks all trays T and tray drive gear unit 20 is not engaged with the trays T. FIGS. 31(b) and 31(c) show states in which the cam gear 114 is being driven by the gear train of tray open/close system and the rotation of the cam gear 114 will move the trigger slide plate 52 through a trigger gear 51. During the movement of the trigger slide plate 52, it unlocks the tray lock lever 53 to release the trays T. FIG. 31(c) shows a state in which the trays T are pushed to engage the tray driving gear unit 20. FIG. 31(d) shows a state in which all trays T are driven to the disc exchange position X by the tray driving gear unit 20. The tray T closing is done by reversing the tray opening operation. Trays T will close one by one from top to bottom.

Figure 32:
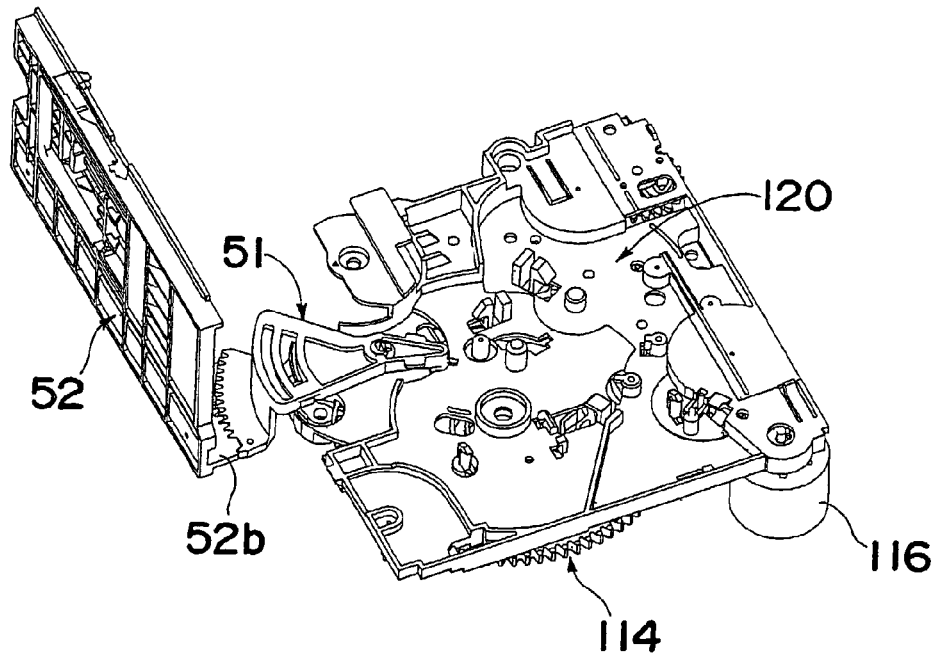
FIGS. 32(a) and 32(b) are perspective views showing a trigger gear and a trigger slide plate.
Figure 32:
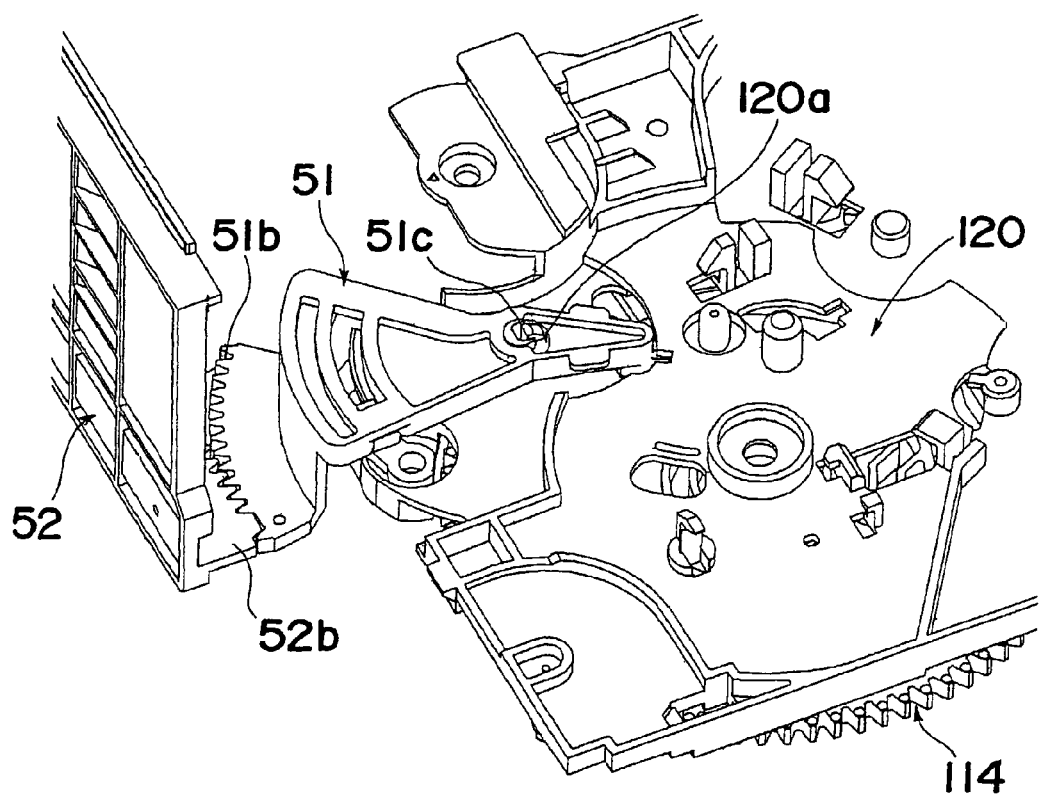

FIGS. 32(a) and 32(b) are perspective views showing the trigger gear 51 and the trigger slide plate 53. In the state shown in FIGS. 32(a) and 32(b), a boss 51a (see FIG. 7) of trigger gear 51 is inserted into a cam groove 114b of cam gear 114 and driven by a profile of the cam groove 114b. The cam groove profile 114b on cam gear 114 is the control path for the trigger gear 51 movement. Gear teeth 51b on trigger gear 51 constantly engage a rack gear 52b of the trigger slide plate 52. The trigger gear 51 rotates around its supporting boss 51c which is held by a boss 120a of a pitch plate 120. A boss 51a of the trigger gear 51 is moved by the cam groove 114b. Thus, when the cam gear 114 rotates, a motion of cam groove 114b is transmitted to the trigger slide plate 52 by trigger gear 51 and allows the trigger slide plate 52 to move in a linear way.

Figure 33:
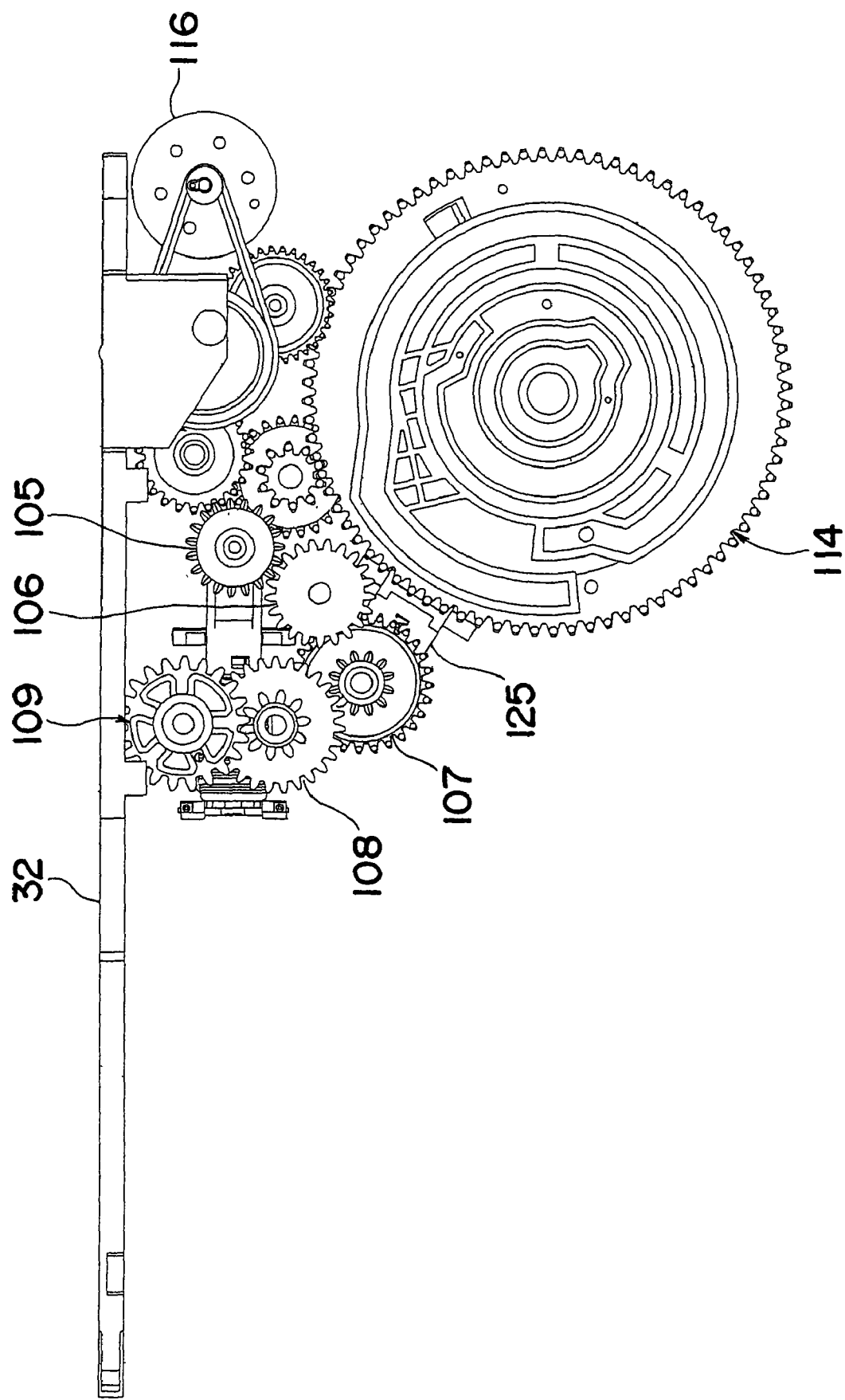
FIG. 33 is a plan view showing a gear train of elevation system in the disc changer.

FIG. 33 is a plan view showing a gear train of an elevation system in the disc changer 1. This gear train operates in order to move the recording/reproducing section 70 in vertical direction and then align it to specific a tray T.

When the disc changer 1 is operated to drive the gear train of the elevation system, the driving source gear train transfers the driving source from electrical motor 116 to a long gear 106, a function gear 107, a first UD gear 108 and a second UD gear 109. The driving source gear train transfers the driving source from electrical motor 116 to all the way until switching gear 105. The gear train of the elevation system then will drive an elevating unit 30 for moving the recording/reproducing section 70 in vertical direction.

Figure 34:
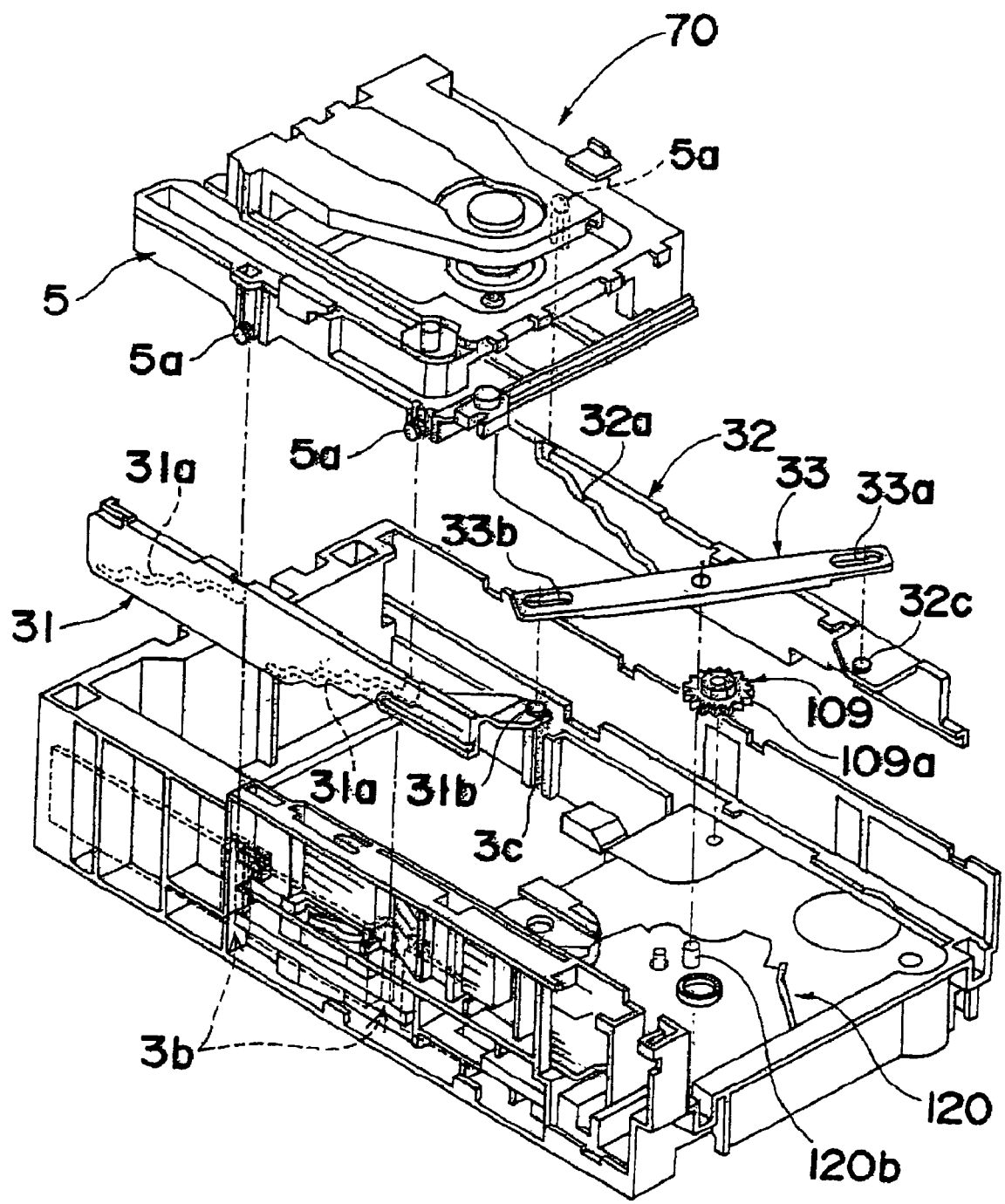
FIG. 34 is a perspective view showing the components of the elevation unit.

FIG. 34 is a perspective view showing the components of the elevation unit. A right side UD rack 32 and a left side UD rack 31 are connected to each other by one connection lever 33. The elevation unit is used to move the recording/reproducing section 70 in a vertical direction by connecting to the gear train of the elevation system. The driving source is transferred by gear teeth 109a of a second UD gear 109 to a gear rack 32b of the right side UD rack 32. There is a step-like cam 32a and 31a on each UD rack 32 and UD rack 31. The step-like cams 32a, 31a have a cam profile similar to steps in a side view.

The cam profiles of the step-like cams 32a and 31a direct the movement of the recording/reproducing section 70. The bosses 5a provided on the side of a UD base 5 sit in the cam profile 32a, 31a of UD racks 32, 31 and they are supported by left guides 3b and a right guide rib 3c of the mechanical chassis 3. When the UD racks 32, 31 are moving linearly forward or backward, the recording/reproducing section 70 moves in vertical direction. UD rack 32 is connected to UD rack 31 to create synchronous movement by means of the connection lever 33. A boss 32c of the right side UD rack 32 is fitted into a slot 33a of the connection lever 33. Also, a boss 31b of the left side UD rack 31 is fitted into a slot 33b of the connection lever 33 on the opposite side.

Figure 35:
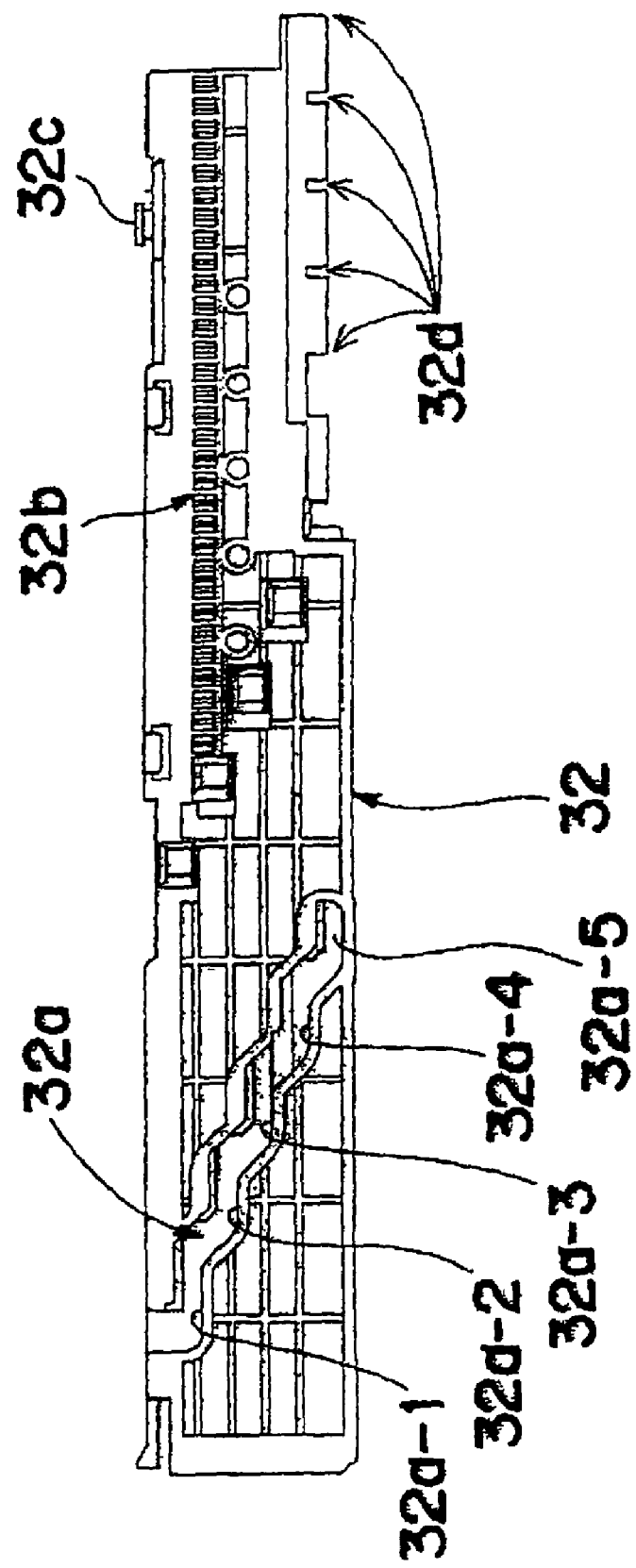
FIG. 35 is a side view showing a step-like cam profile on a right side UD rack.

FIG. 35 is a side view showing the step-like cam profile 32a on the right side UD rack 32. The step-like cam 32a has horizontal portions 32a-1 to 32a-5 which correspond to the positions or levels of the recording/reproducing section 70 that align to tray T. The level of 32a-1 to 32a-5 is determined by an electrical sensor using the sensor profile 32d.

Figure 36A:
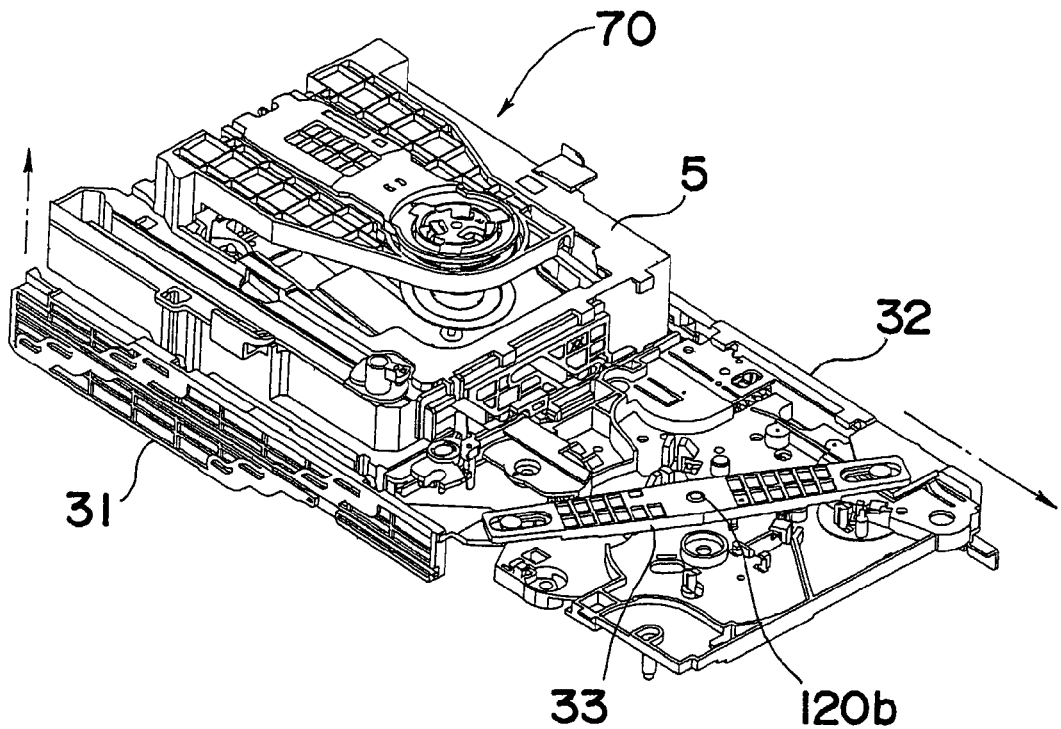
FIGS. 36(a) and 36(b) are perspective views respectively showing the recording/reproducing section at an upper most position and a lower most position.
Figure 36B:
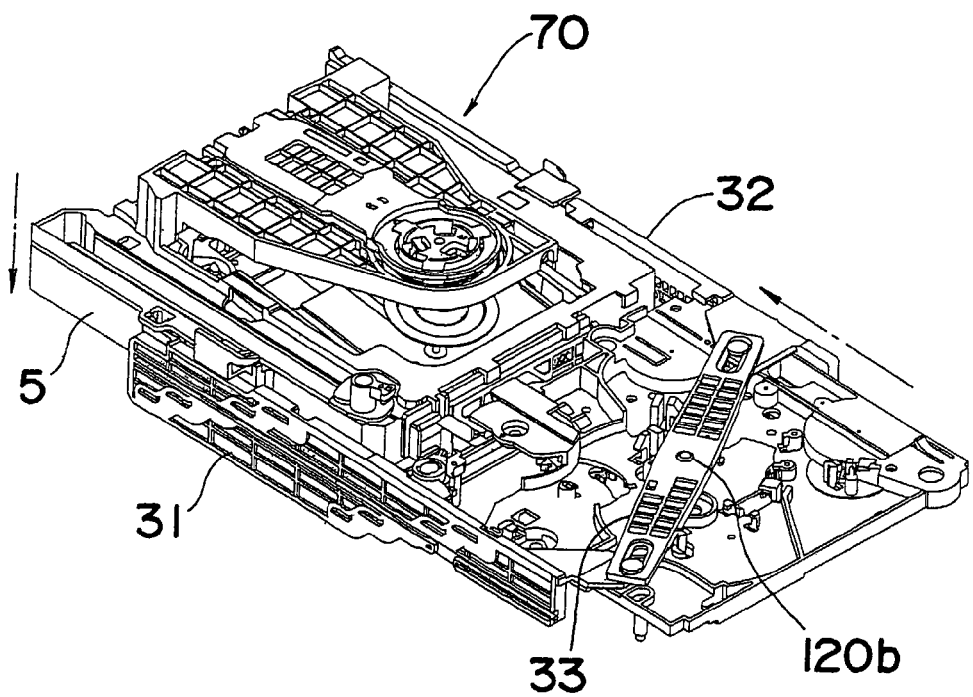

FIGS. 36(a) and 36(b) are perspective views respectively showing the recording/reproducing section 70 at an upper most position (for tray T1) and an lower most position (for tray T5). For elevating the recording/reproducing section 70 to the upper position, the right side UD rack 32 is driven by the gear train of elevation system in the forward direction. This movement will be transferred, by the connection lever 33 supported pivotally by the boss 120b of the pitch plate 120, to the left side UD rack 31. Consequently, the left side UD rack 31 will move in the rear direction. For moving the recording/reproducing section 70 to the lower position, the moving direction of both UD racks 32, 31 are opposite to the above.

Figure 37:
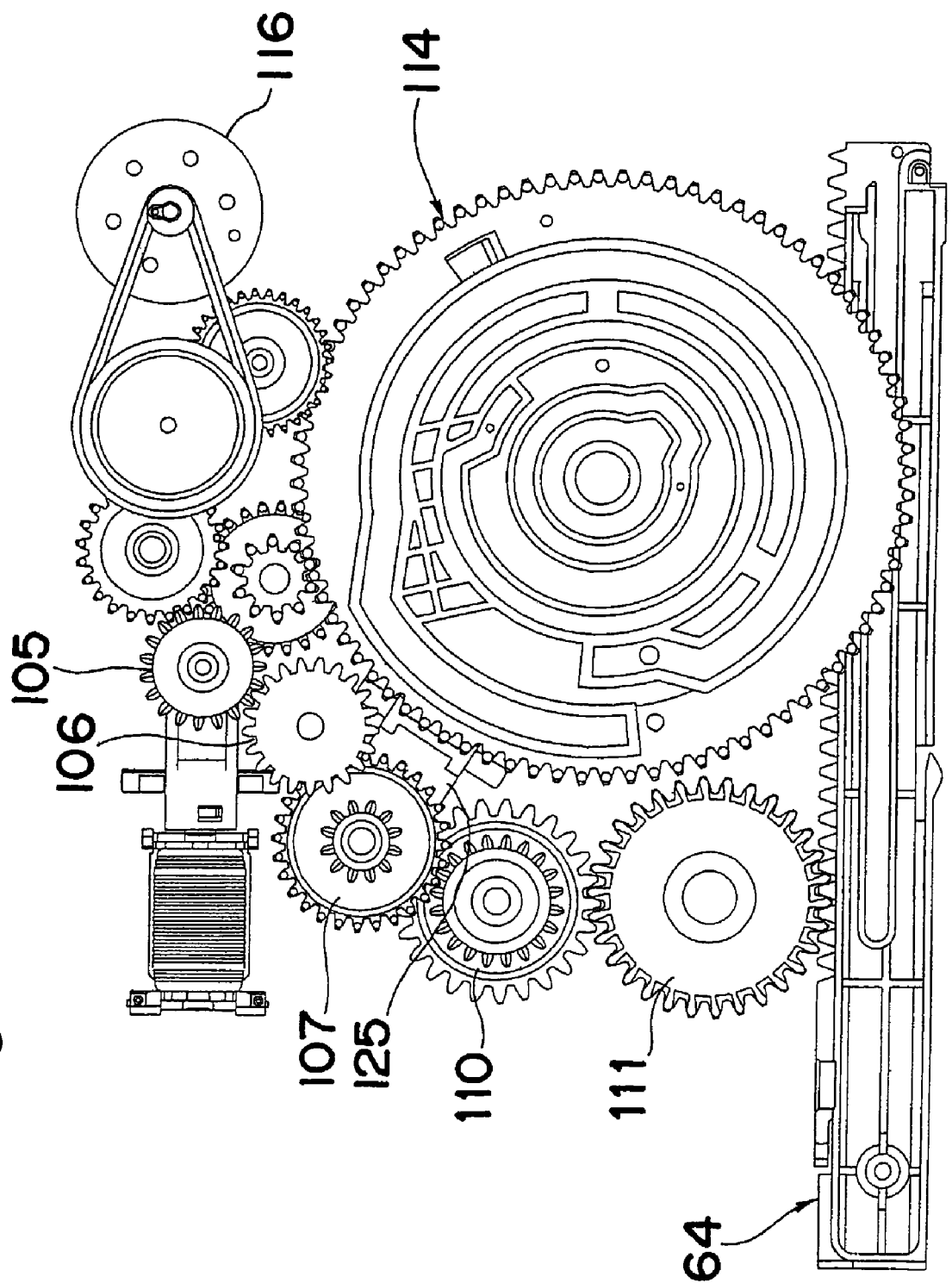
FIG. 37 is a plan view showing a gear train of tray play/stock system in a disc changer.

FIG. 37 is a plan view showing a gear train of the tray play/stock system in a disc changer 1. This gear train drives trays T between the disc recording/reproducing position Z and the disc standby position Y.

When the disc changer 1 operates the drive gear train of the tray play/stock system, the driving source gear train transfers the driving source from electrical motor 116 to a long gear 106, a function gear 107, a first play gear 110 and a second play gear 111. The gear train of the tray play/stock system then will drive a tray driving rack unit 60 which is capable of moving trays T between the recording/reproducing position Z and the disc standby position Y.

Figure 38A:
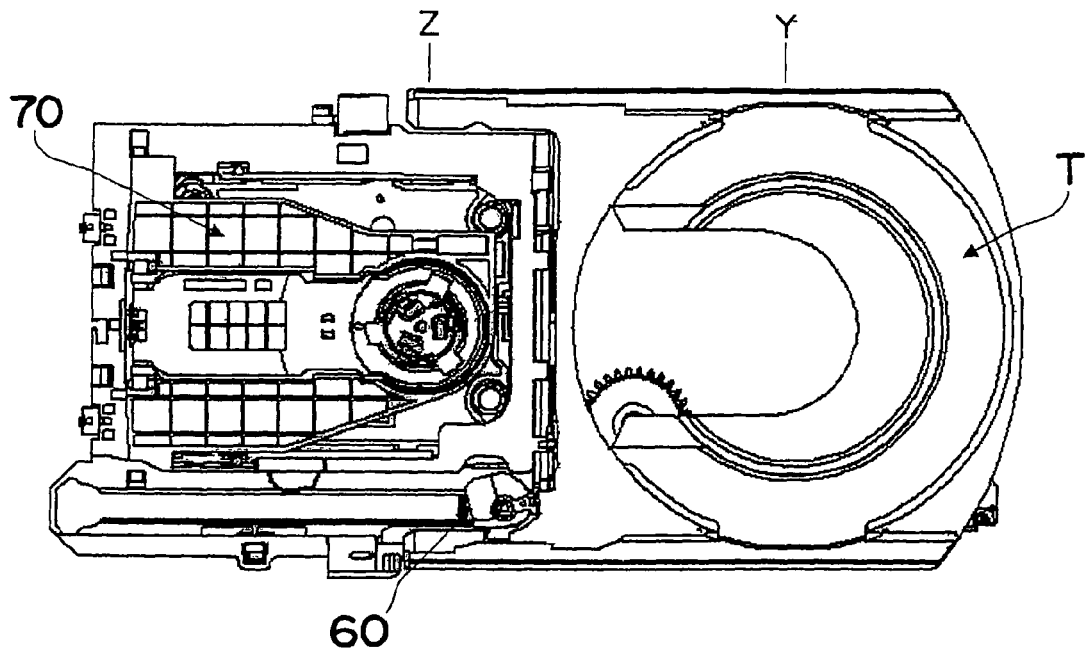
FIGS. 38(a) and 38(b) are plan views showing the movement of driving trays between the disc standby position and the recording/reproducing position.
Figure 38B:
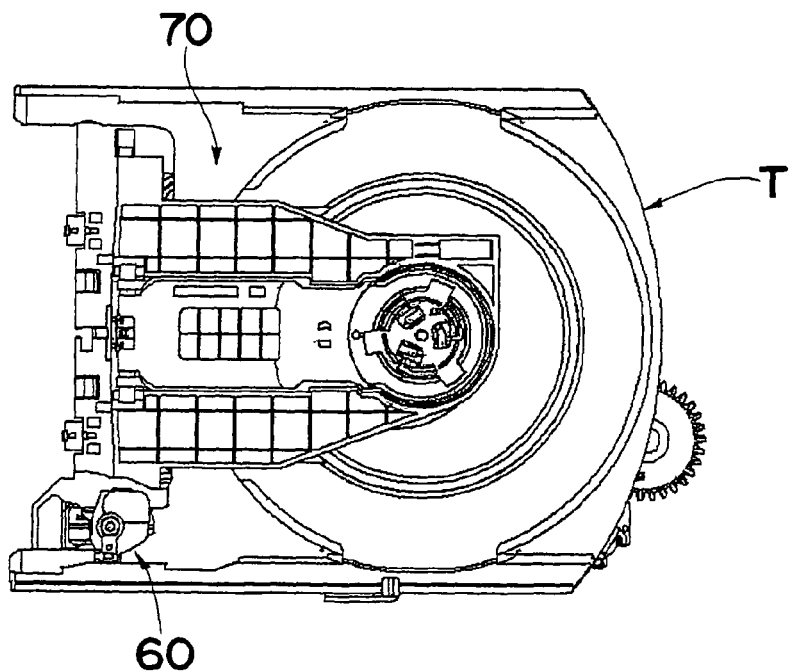

FIGS. 38(a) and 38(b) are plan views showing the movement of driving trays T between the disc standby position Y and the recording/reproducing position Z.

After the recording/reproducing section 70 is aligned to a selected tray T level, the tray T can be driven between the disc recording/reproducing position Z and the disc standby position Y by the tray driving rack unit 60.

Figure 39:
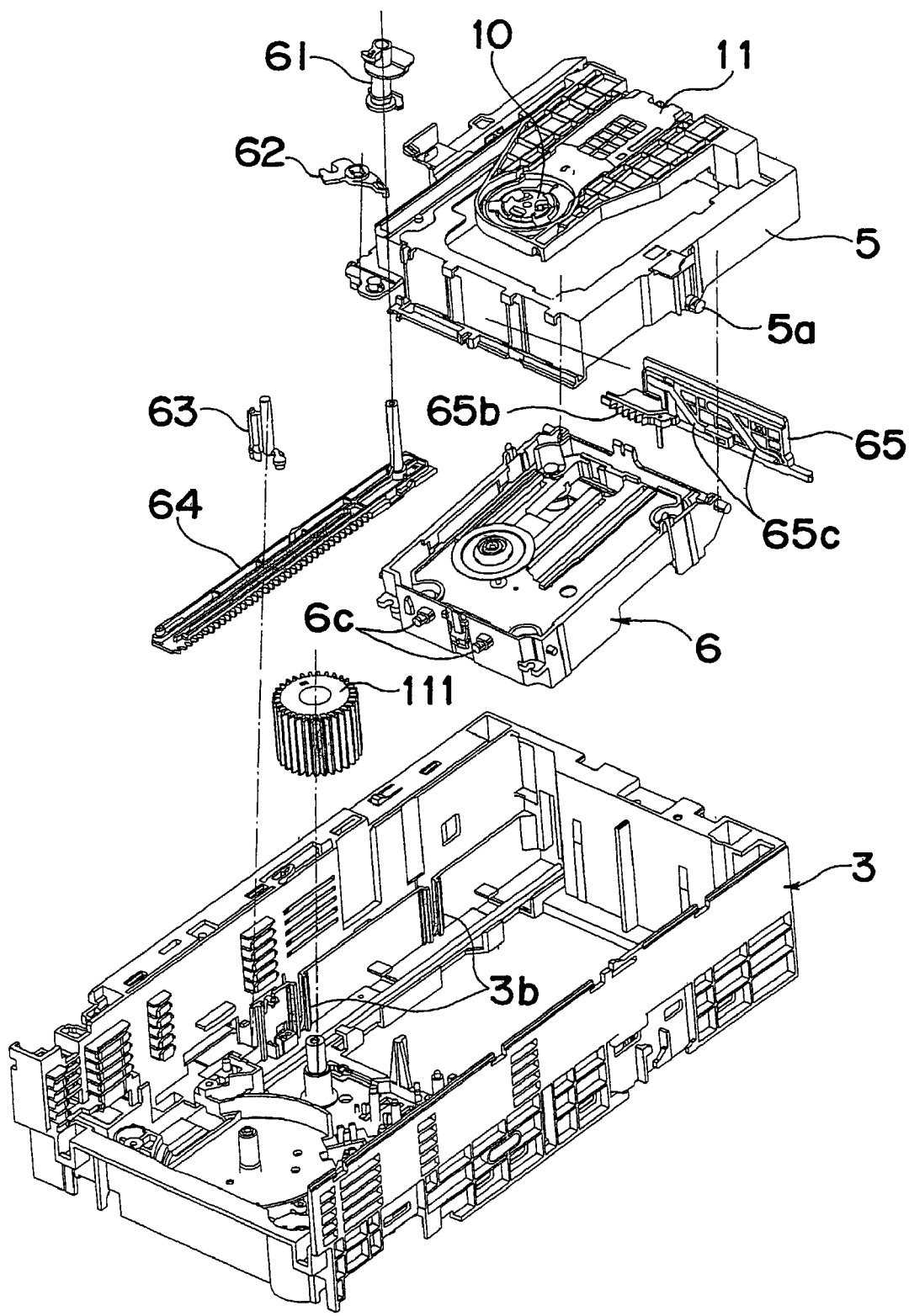
FIG. 39 is a perspective view showing the components of the tray driving rack unit.

FIG. 39 is a perspective view showing the components of the tray driving rack unit 60. The tray driving rack unit 60 has a tray catch lever 61, a first play lever 62, a second play lever 63, a tray drive rack 64 and a transverse slide plate 65. When there are no trays T at the recording/reproducing position Z and all trays T are at the standby position Y, the gear train of tray stock/play system is connected by the second play gear 111 to the tray drive rack 64 through the gear engagement of a rack gear 64a and gear teeth 111a of the second play gear. When the second play gear 111 rotates in the clock-wise direction, tray T is driven to recording/reproducing position Z.

Figure 40A:
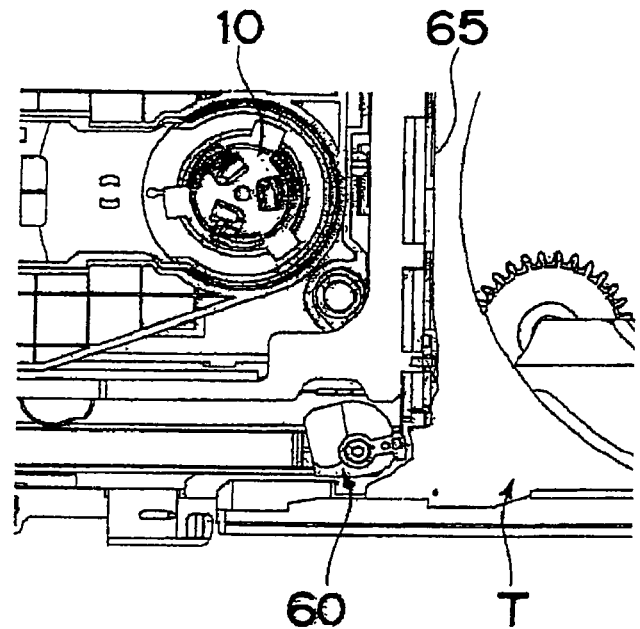
FIGS. 40(a) to 40(d) are enlarged plan views showing a moving sequence of a tray catch lever to drive trays from disc standby position to the recording/reproducing position.

FIGS. 40(a) to 40(d) are enlarged plan views showing a moving sequence of the tray catch lever 61 to drive trays T from the disc standby position Y to the recording/reproducing position Z. FIG. 40(a) shows a state in which the tray catch lever 61 is away from tray T at disc standby position Y. The UD base 5 supports the tray catch lever 61 moving in a vertical direction to align tray T which needs to be driven to the recording/reproducing position Z.

Figure 40B:
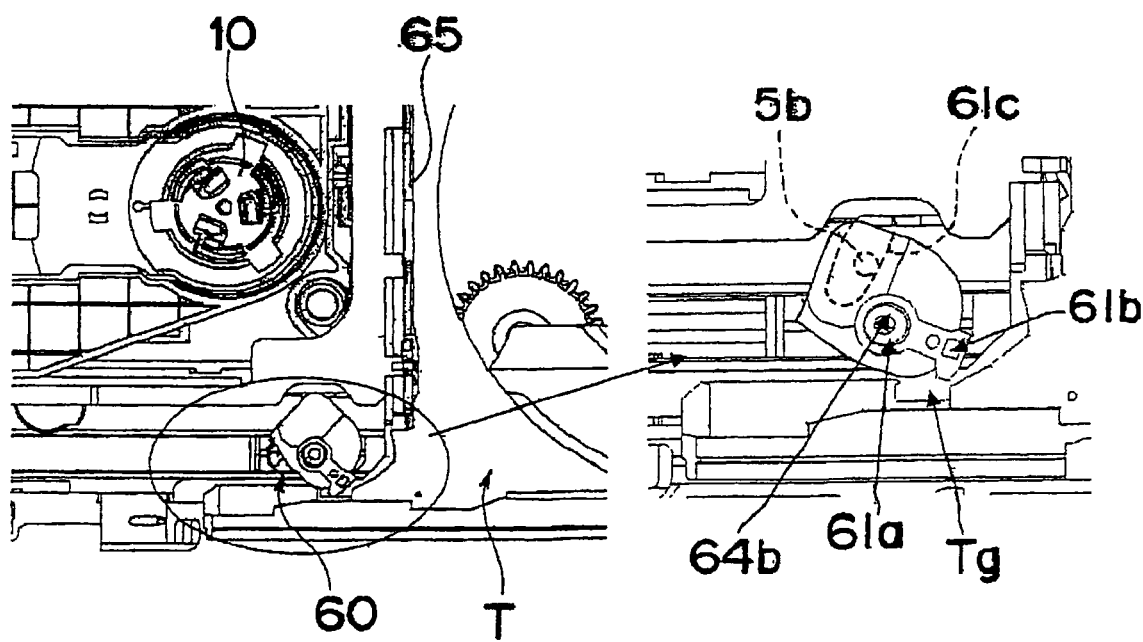
Figure 40C:
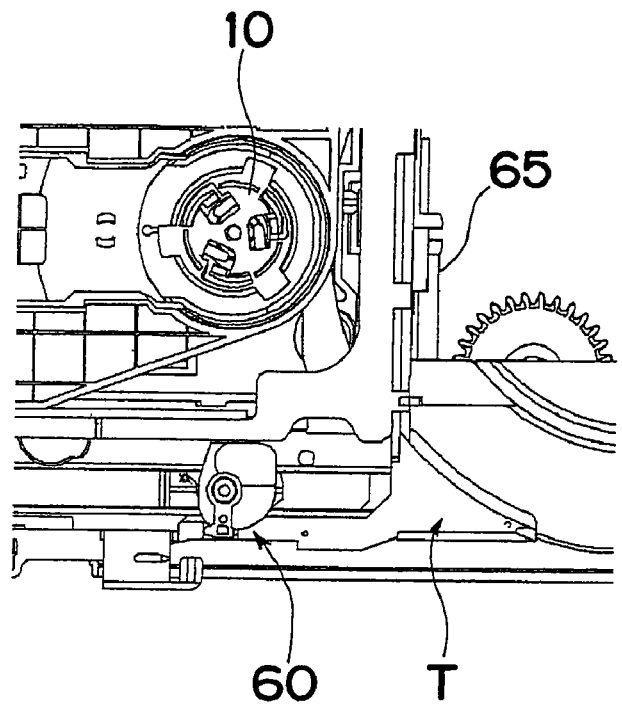
Figure 40D:
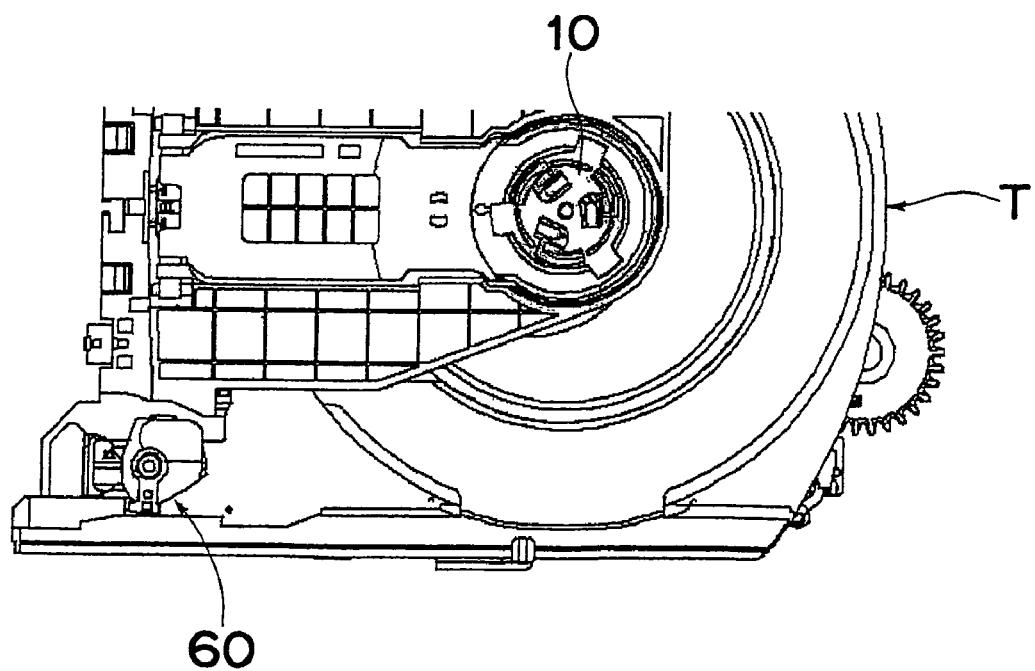

As the tray drive rack 64 moves backward when the second play gear 111 rotates in clock-wise direction as shown in FIGS. 40(b) and 40(c), the boss 64b on tray drive rack 64 pulls the tray catch lever 61 through the hole 61a. As the tray catch lever 61 moves backward, the catch profile (concave portion) 61b rotates to fit into hook profile Tg of the tray T. The rotation of tray catch lever 61 is due to the cam groove 61c on the lower surface of tray catch lever 61 and a small boss 5b on UD base 5. The rotation of tray catch lever 61 is caused by the cam groove 61c fitting against the small boss 5b. Further, tray T will be moved to the disc recording/reproducing position Z by the tray driving rack unit 60 as shown in FIG. 40(d).

Figure 41A:
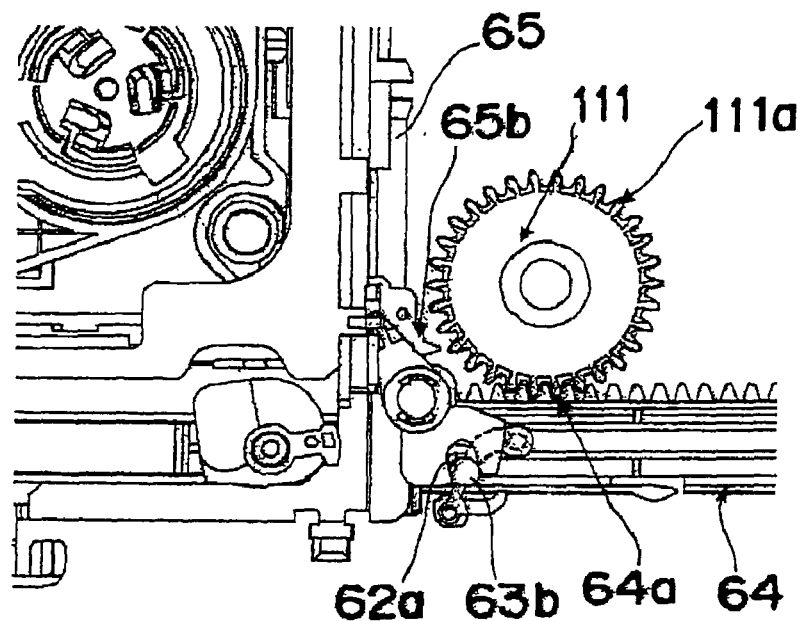
FIGS. 41(a) to 41(d) are enlarged plan views showing a sequence of an operation of tray driving rack unit.
Figure 41B:
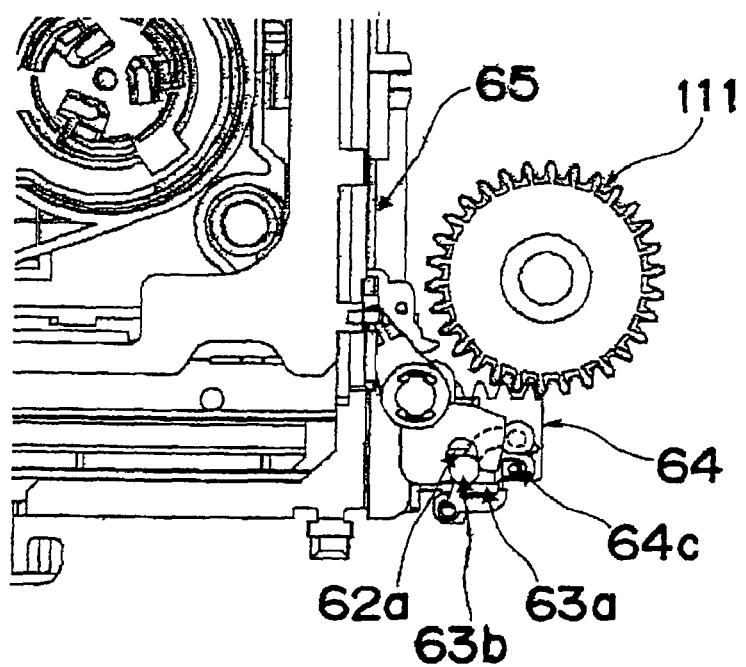

FIGS. 41(a) to 41(d) are enlarged plan views showing a sequence of an operation of the tray driving rack unit 60. FIG. 41(a) shows an initial position when the tray drive rack 64 and the tray catch lever 61 are positioned for driving trays T in the disc standby position Y. In this state, the second play gear 111 engages the rack gear 64a of tray drive rack 64, and the rack gear 65b of transverse slide plate does not engage the second play gear 111. FIG. 41(b) shows a boss 64c of the tray drive rack 64 moved into an opening 63a of the second play lever 63 before the end of movement of tray drive rack 64. When tray drive rack 64 continues to move backward, the second play lever 63 will be pushed by the boss 64c of tray drive rack 64 and rotates, the boss 63b of the second play lever 63 pushes the opening 62a of the first play lever 62.

Figure 41C:
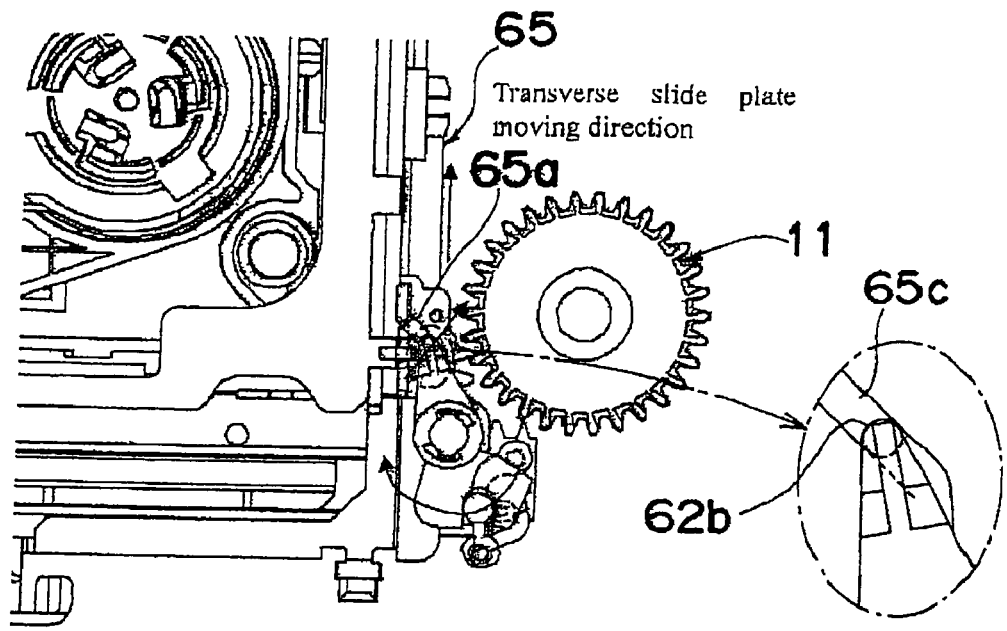
Figure 41D:
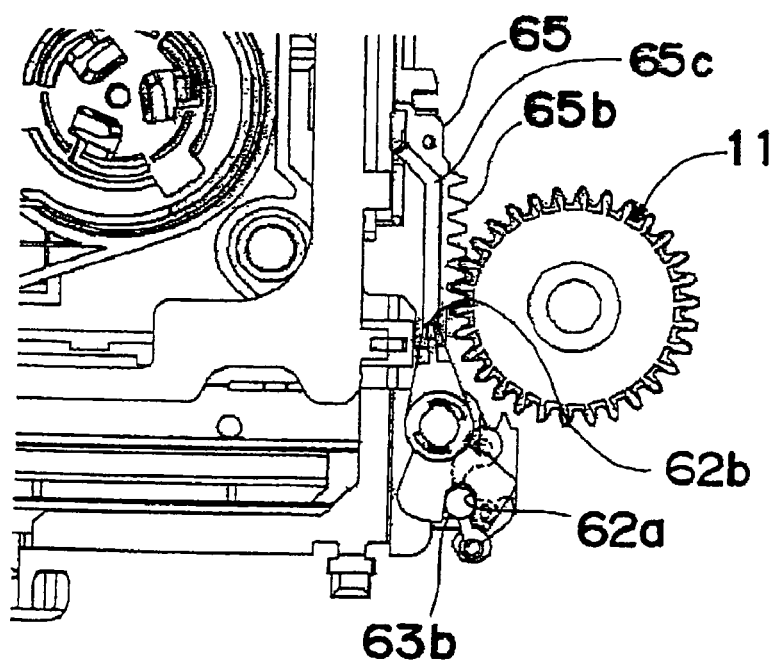

Further, a boss 62b of the first play lever 62 which is inserted into a cam profile 65c of the transverse slide plate 65 rotates and pushes the taper surface of the cam profile 65a. Transverse slide plate 65 is pushed to move to right side and the first gear tooth of the rack gear 65a will engage the gear teeth 111a of the second play gear 111 as shown in FIG. 41(c). The driving source will now be transferred to the transverse slide plate 65, and this slide plate 65 is driven to right side until it detects a switch that marks the completion of disc clamping operation as shown in FIG. 41(d).

For driving a tray from disc recording/reproducing position Z to disc standby position Y, the operation is the reverse of the above. The driving source will be transferred from the second play gear 111 to transverse slide plate 65. The cam profile 65a of the transverse slide plate 65 triggers rotational motion of the first play lever 62, and then the second play lever 63 which will pull the tray drive rack 64 to engage to the second play gear 111. Tray drive rack 64 will pull tray catch lever 61 that hook to tray T. When tray T reaches the disc standby position Y, the tray catch lever 61 will come out from tray profile Tg and rotates in a counter clock-wise direction back to its original position. The rotation is same achieved by cam groove 61c and the boss 5b of the UD base boss 5 as shown in FIG. 40(b)

Figure 42:
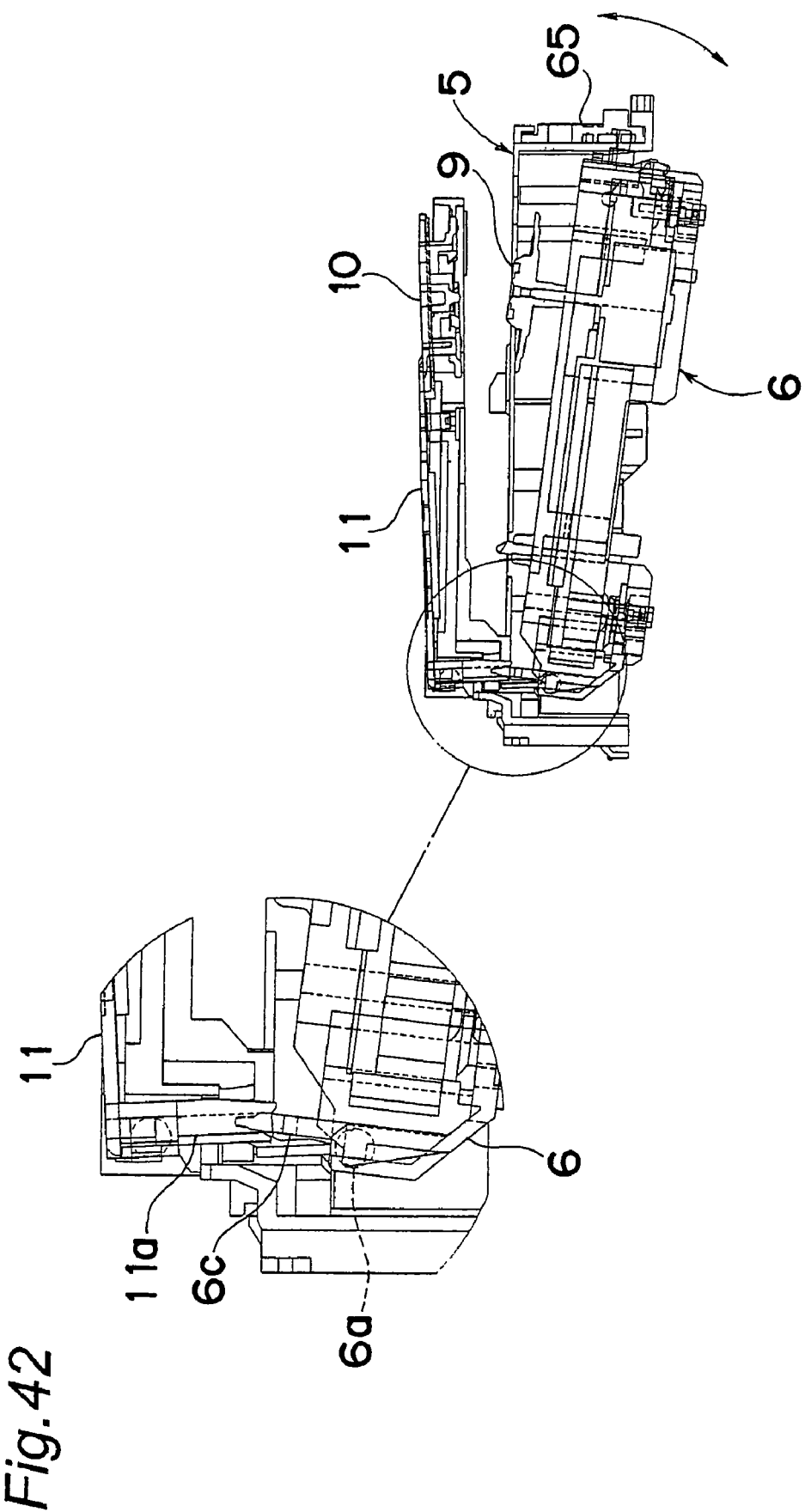
FIG. 42 is a side view showing a clamper unit in an unclamping condition.
Figure 43:
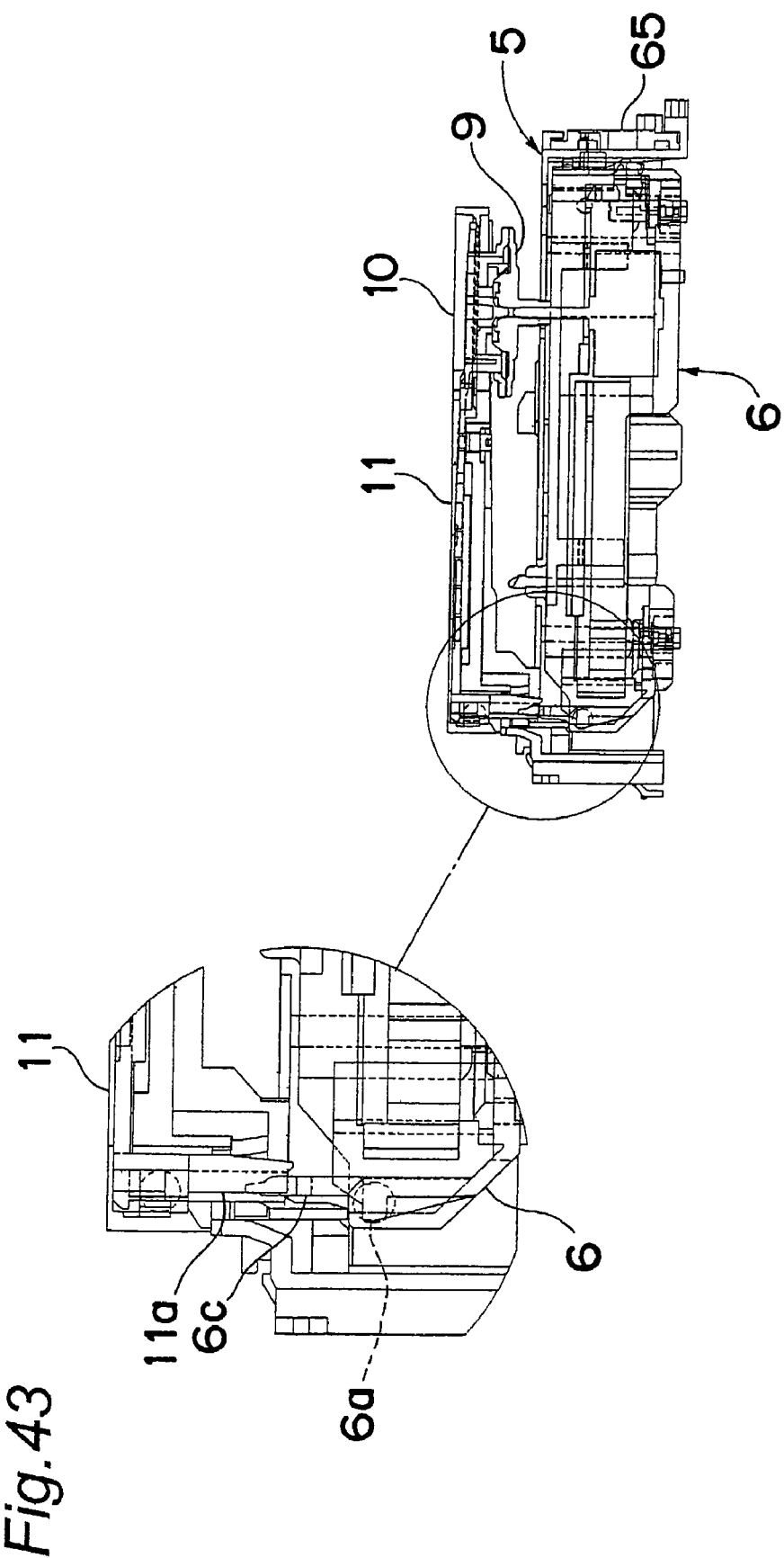
FIG. 43 is a side view showing the clamper unit in a clamping condition.

FIGS. 42 and 43 are side views respectively showing clamper unit 10 in unclamping and clamping conditions. The transverse unit 6 in the disc recording/reproducing unit section 70 is supported by UD base 5 and transverse slide plate 65. Two of the side bosses 6a at the rear side of the transverse unit 6 are mounted to hook profiles. And bosses 6b at the front side of the transverse unit 6 (refer to FIG. 39) are mounted into the cam profile 65c of transverse slide plate 65 (refer to FIG. 39). With the pivot at rear side, the transverse unit 6 will rotate to a clamping position when the transverse side plate 65 moves from the left side to the right side, and to a unclamping position when transverse side plate 65 moves from the right side to the left side.

At the time of clamping, a clamper support plate 11 is pushed downward to a turn table 9 in order to place the clamper unit 10 to the turn table 9. With the lifting of clamper unit 10 by clamper support plate 11 at the time of unclamping, tray T can have more gap when it moves to recording/reproducing position Z. The movement of clamper support plate 11 is controlled by the movement of bosses 6b of the transverse unit 6.

In the unclamping condition, a rib 6c of the transverse unit 6 touches a rib 11a of the clamper support plate 11. The clamper support plate 11 is lifted away from the turn table 9 and clamper unit 10 is at its upper position. In the clamping condition, the other side of the rib 6c of the transverse unit 6 touches the other side of the rib 11a of clamper support plate 11. This brings down the clamper support plate 11 and also clamper unit 10. The clamper unit 10 now is sitting on turn table 9 and able to rotate freely with the turn table 9.

Figure 44:
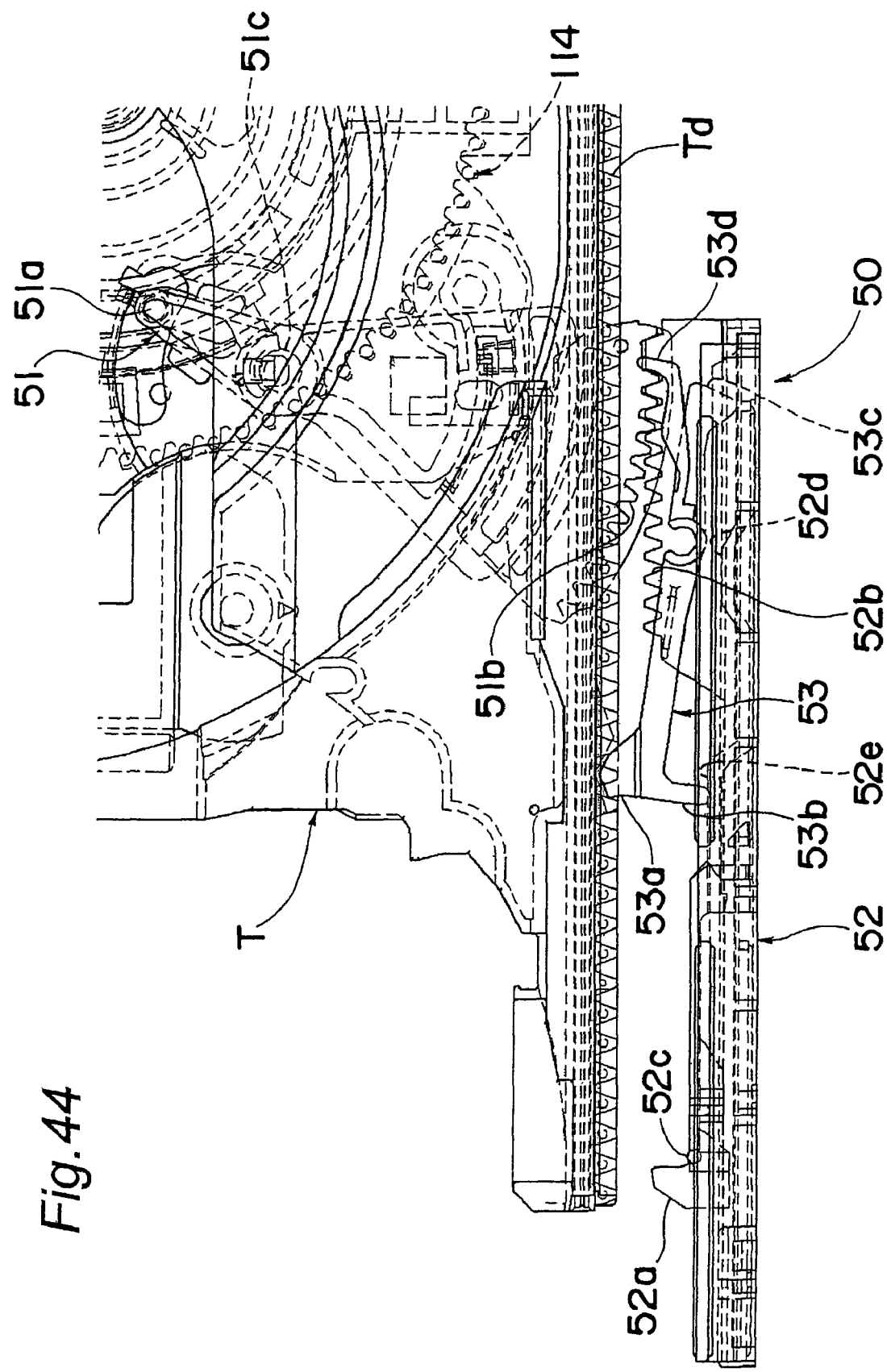
FIG. 44 is an enlarged plan view showing a locking system for trays at disc standby position.

FIG. 44 shows a locking system for trays T at the disc standby position Y. The locking system uses a triggering system 50 that consists of a trigger gear 51, a trigger slide plate 52 and tray lock levers 53.

Figure 45:
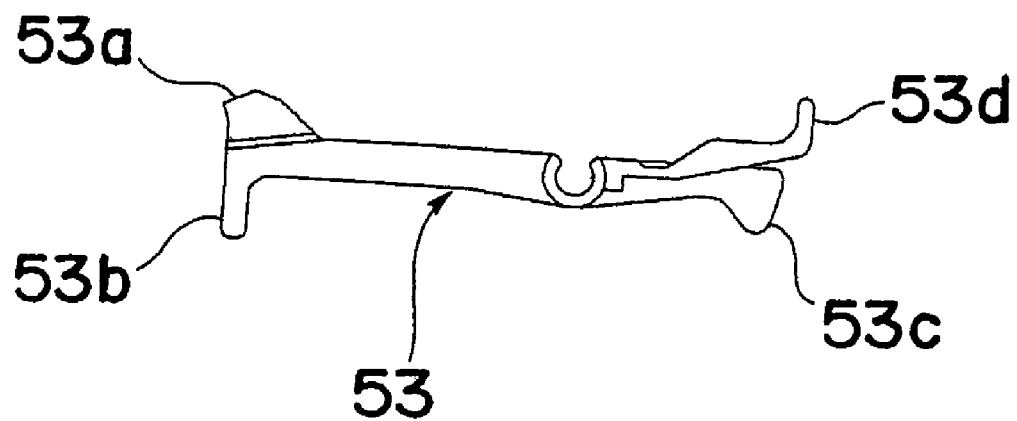
FIG. 45(a) is a plan view of a tray lock lever.
FIG. 45(b) is a perspective view of the tray lock lever.
Figure 45:
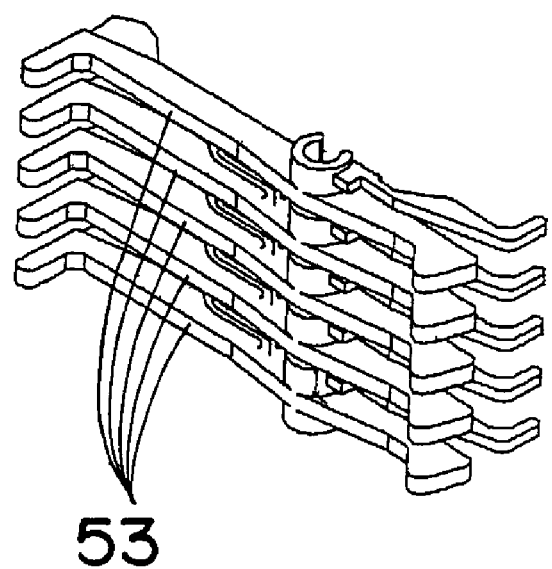

FIGS. 45(a) and 45(b) are respectively a top view and an isometric view of the tray lock levers 53. Each tray lock lever 53 includes a first protrusion 53a, a stopper rib 53b, a second protrusion 53c and a plastic spring 53d. The first protrusion 53a provides an "inter-locking" effect to tray T. The stopper rib 53b is to ensure a stable locking state to tray T. The second protrusion 53c is a profile which is used to unlock the tray T from the tray lock lever 53. The plastic spring 53d is to provide a spring effect to the tray lock lever 53, and to ensure that the position of the first protrusion 53a is correct, in order to create a stable locking effect when the stopper rib 53b is not touching a locking profile of the trigger slide plate 52.

The lock/unlock operation is carried out simultaneously in a tray triggering and opening operation. It can be referred to as part of the operation to drive a tray T to the disc exchange position X.

Figure 46:
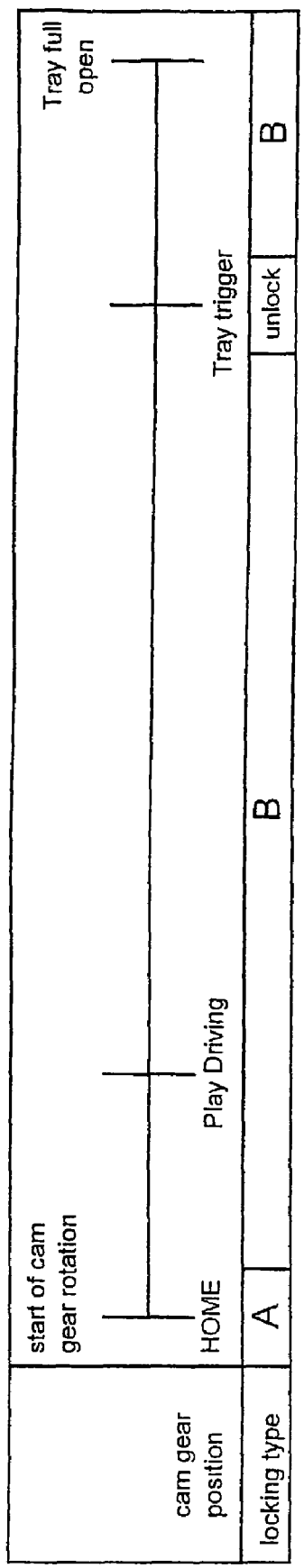
FIG. 46 is a diagram showing a relationship between cam gear positions and locking types of the tray.
Figure 47A:
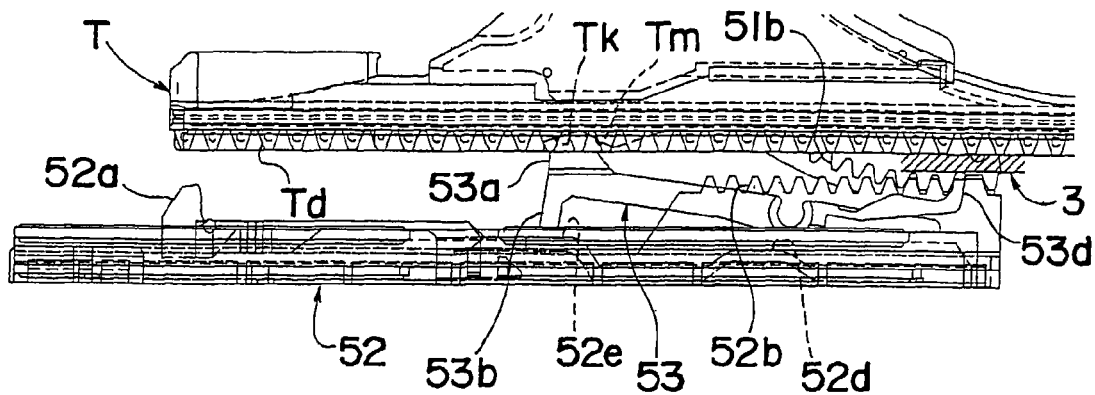
FIGS. 47(a) to 47(c) are enlarged plan views showing tray lock levers in locking trays at standby position.
Figure 47B:
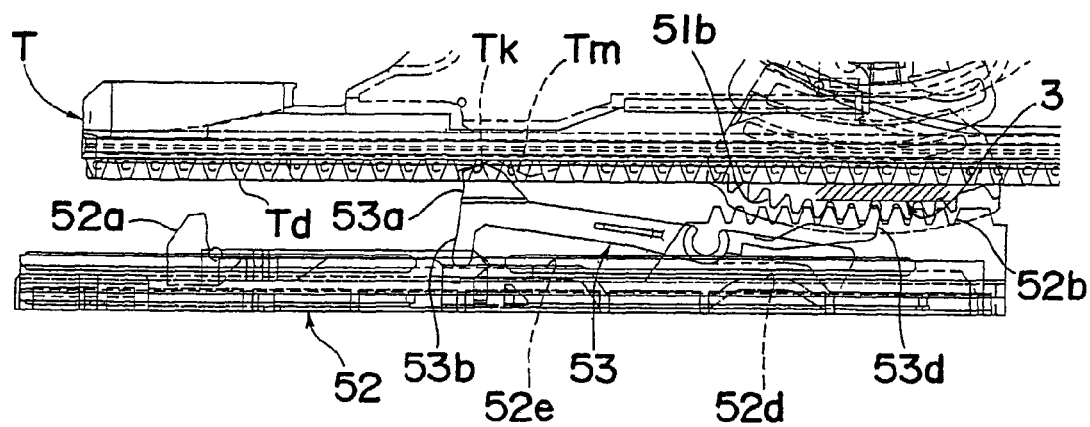
Figure 47C:
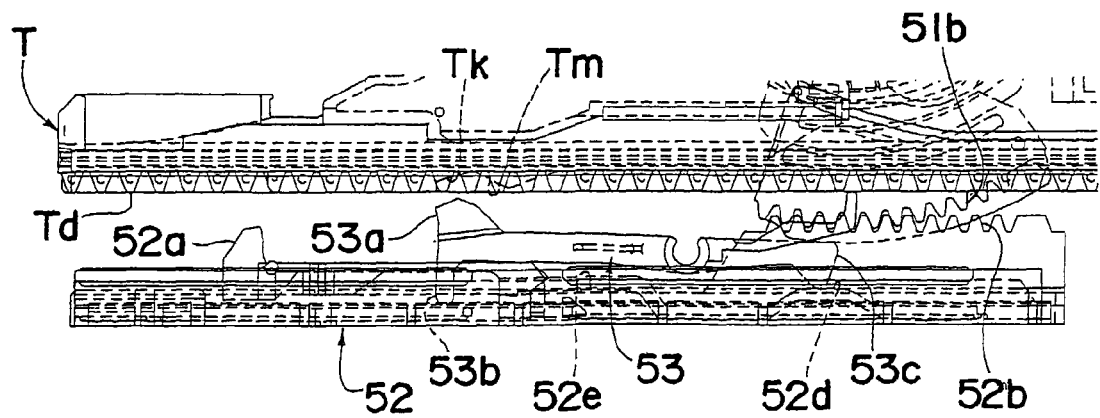
Figure 48:
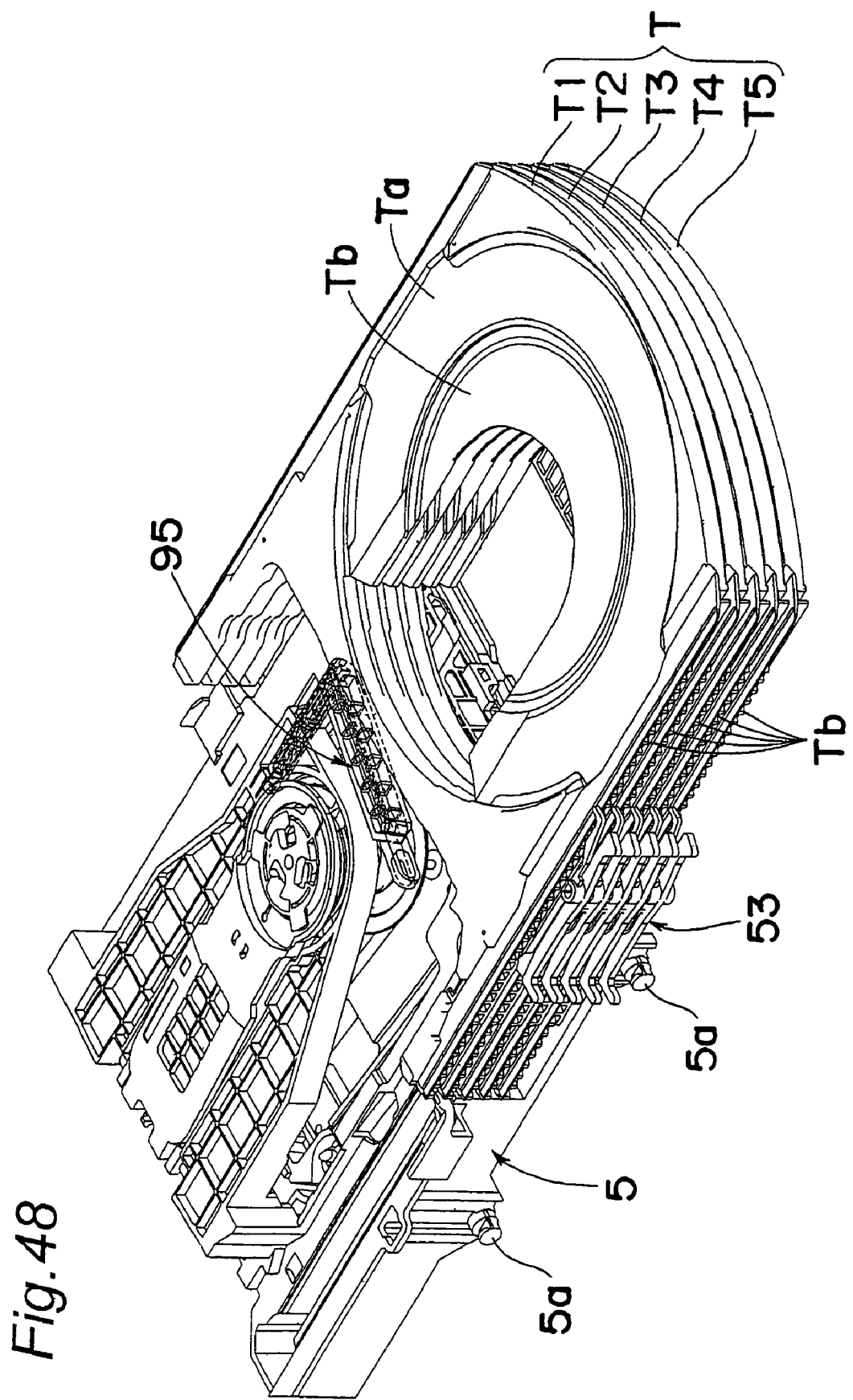
FIG. 48 is a perspective view of the disc changer from front side in a state in which the trays are locked at the standby position.

FIG. 46 (discussed in more detail below) is a diagram showing a relationship between cam gear 114 positions and locking types of the tray T. FIG. 47(a) to 47(c) are enlarged plan views showing tray lock levers 53 in locking trays T at standby position Y. FIG. 48 is a perspective view of the disc changer from the front side in a state in which the trays are locked at the standby position Y. The trays T at the standby position Y are locked by tray lock lever 53 from going to front position (disc exchange position X) at any time of operation except when trays T are driven to the disc exchange position X (open tray operation). This is a shipment locking position where the trays are locked in a permanent manner at the disc standby position Y, and the disc changer 1 at all times carries out operations to lock tray T at the shipment locking position after any operation (such as driving tray T between disc standby position Y and disc recording/reproducing position Z or driving the recording/reproducing unit 70 moving up/down to select tray T).

In other states, the trays T are in held in the locking condition by the "inter-locking" profile of tray T and the tray lock lever 53. FIG. 46 shows a timing chart when the cam gear 114 rotates from "HOME" position to disc exchange position X and types of locking condition of the tray lock lever 53 and trigger slide plate 52. For type A shown in FIG. 47(a), the first protrusion 53a of tray lock lever 53 is being pushed toward the surfaces Tk and Tm of the tray T by the first protrusion 52e of the trigger slide plate 52. This creates a strong stable locking condition in which the trays T cannot move to any position. For type B shown in FIG. 47(b), the trigger slide plate 52 moves toward the front side and the first protrusion 52e of the trigger slide plate 52 is away from the first protrusion 53a of tray lock lever 53, so the locking is only by "inter-locking" between tray T and tray lock lever 53.

The plastic spring 53d is touching a wall of mechanical chassis 3 and tray lock lever 53 is not able to rotate to unlock direction. At this time, the trays T are not able to move to the front side (disc exchange position X) but the tray T which is aligned to the tray catch lever 61 (the selected tray T to be driven to recording/reproducing section 70) can move to the rear side (disc recording/reproducing position Z) if it is pulled by tray driving rack unit 60. Regarding to the other trays T, they are blocked by either tray rear stopper 95 or a wall of UD base wall as shown in FIG. 48. An unlock period only happens before the trays T triggering, when the tray lock lever unlock profile 53c is being pushed by the second protrusion 52d of the trigger side plate 52 and the tray is unlocked for a short period so that it can be pushed by trigger slide plate 52 to engage with the tray driving gear unit 20.

Figure 49:
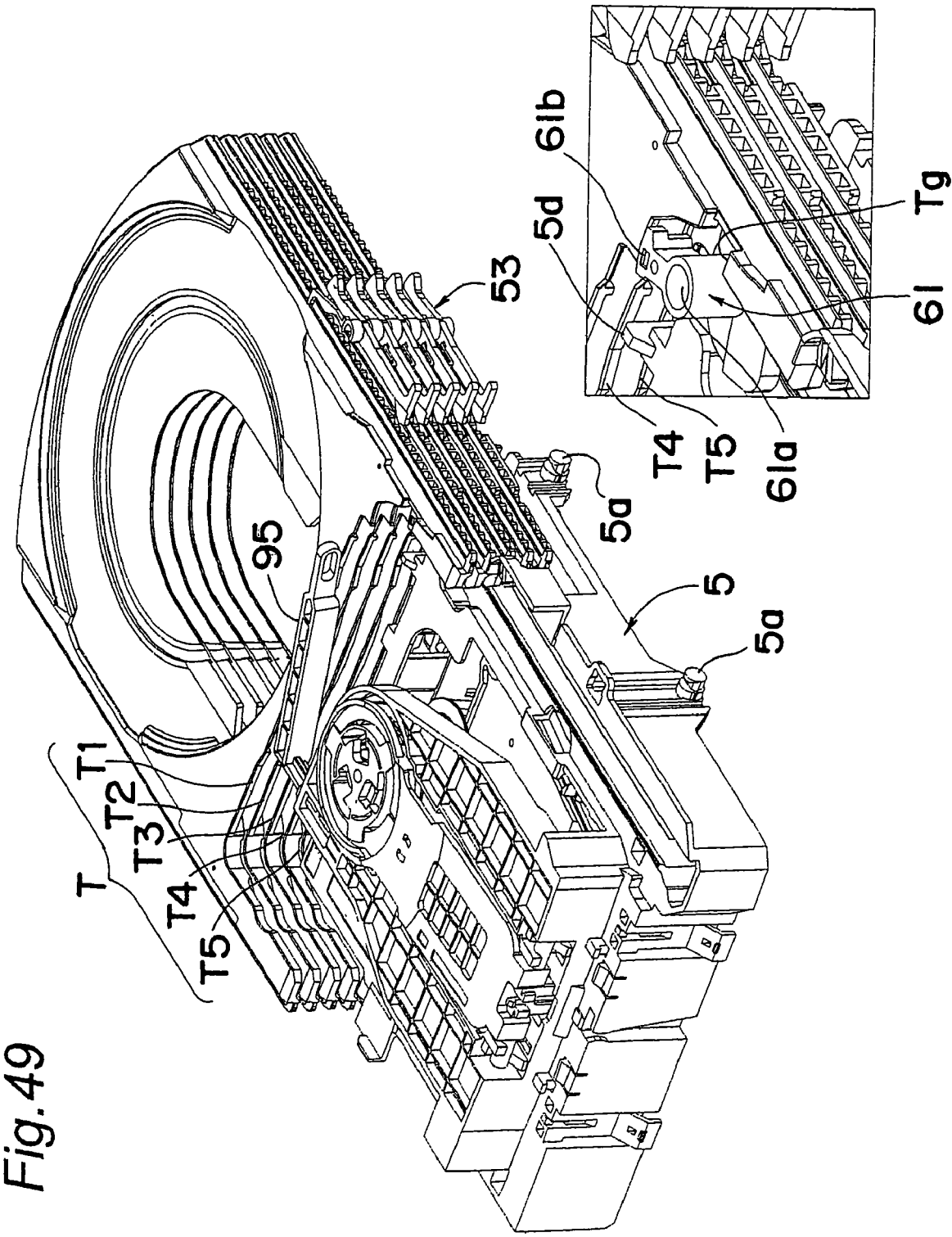
FIG. 49 is a perspective view of the disc changer from rear side in a state in which the trays are locked at standby position.

FIG. 49 is a perspective view of the disc changer 1 from the rear side in a state in which the trays T are locked at the stand by position Y. The recording/reproducing section 70 and tray catch lever 61 are aligned to the tray T3, and in this state the trays T1, T2 are locked in standby position Y by tray lock lever 53 and tray rear stopper 95. Trays T4 and T5 are locked in the standby position Y by tray lock lever 53 and UD base wall and rib 5d. The rear side of selected tray T3 is stopped by a concave portion 61b of the tray catch lever 61. When tray catch lever 61 is rotated and the concave portion 61b goes into tray hook portion Tg, the tray T3 can be driven to the disc recording/reproducing position Z.

Figure 50:
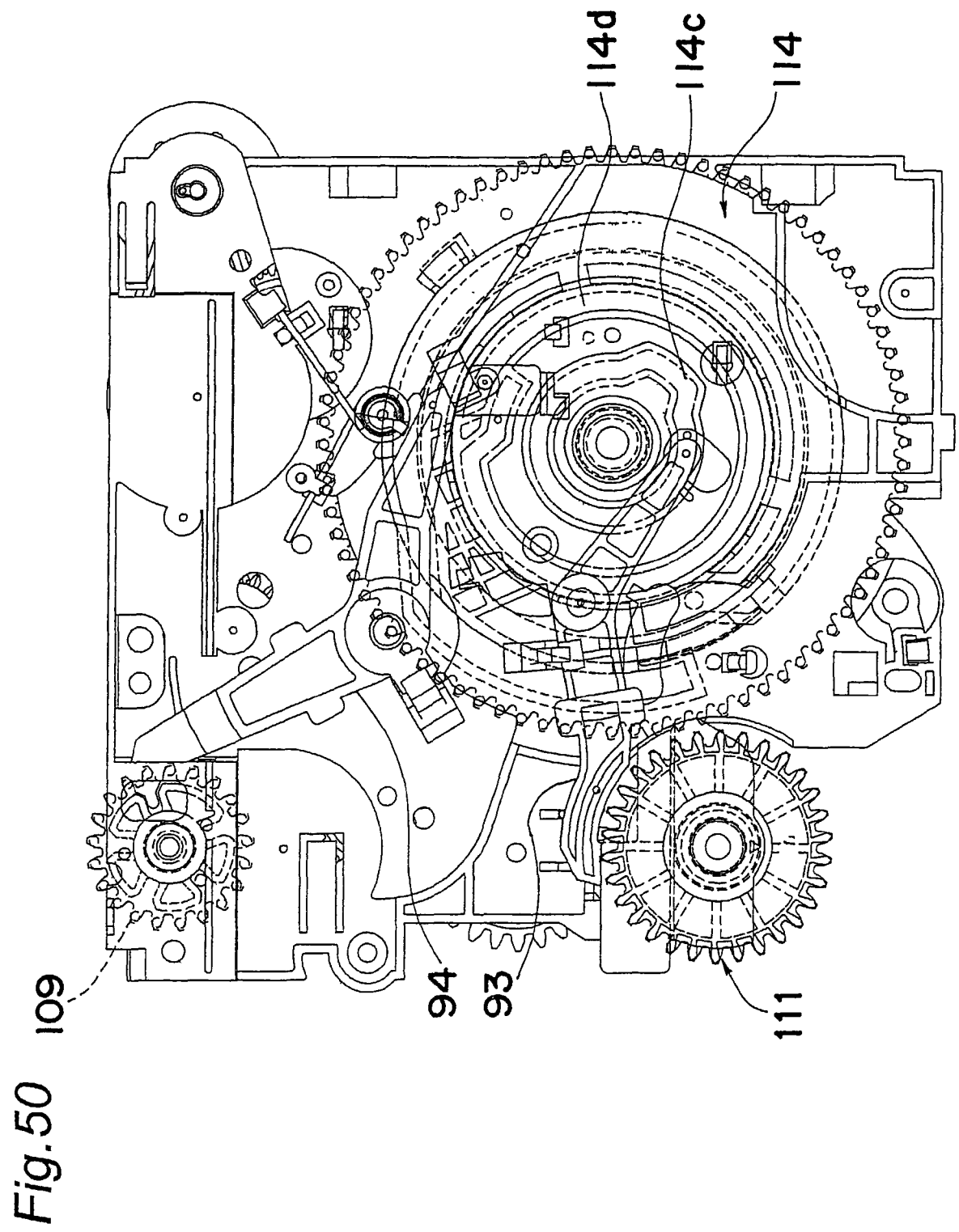
FIG. 50 is a plan view showing a locking mechanism at the recording/reproducing section.

FIG. 50 is a plan view showing the locking system at the recording/reproducing section 70. One portion of the locking system is for the transverse unit 6 and the tray driving rack unit 60, and another portion of the locking system is for the recording/reproducing section 70. The locking system is to ensure that the disc changer 1 can sustain external vibration and impact which can cause the disc changer 1 malfunction while transportation or mishandling. The locking system ensures that there is no position shift and dislocation of parts, by holding each part securely with a locking device. The locking device used to achieve this function is a first lock lever 93 for locating the transverse unit 6 and tray driving rack unit 60, and a second lock lever 94 for locking the whole recording/reproducing section 70.

Both of lock levers 93, 94 are controlled by cam grooves 114c, 114d of the cam gear 114 and pivot on pitch plate boss. One end of both lock levers 93, 94 have bosses that insert into the cam grooves 114c, 114d and the other end have special locking protrusions that create maximum locking effect when they engage the profile on a second play gear 111 and a second UD gear 109.

Figure 51A:
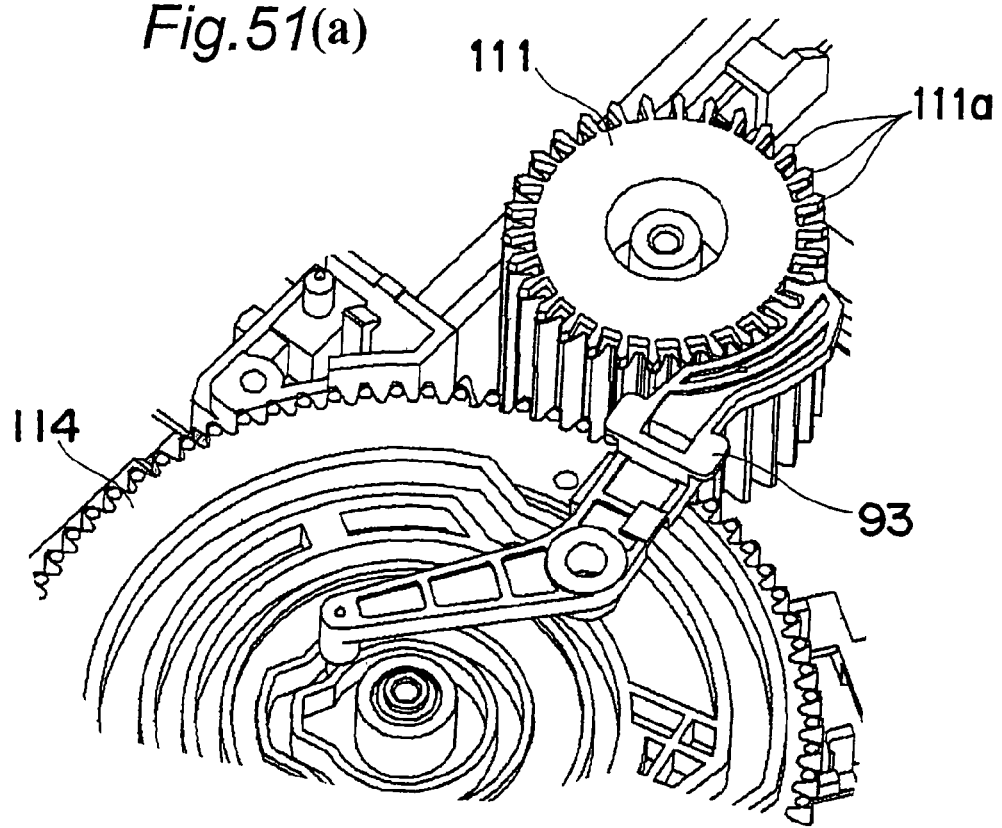
FIGS. 51(a) and 51(b) are perspective views showing a first lock lever and a second play gear in a lock condition.
Figure 51B:
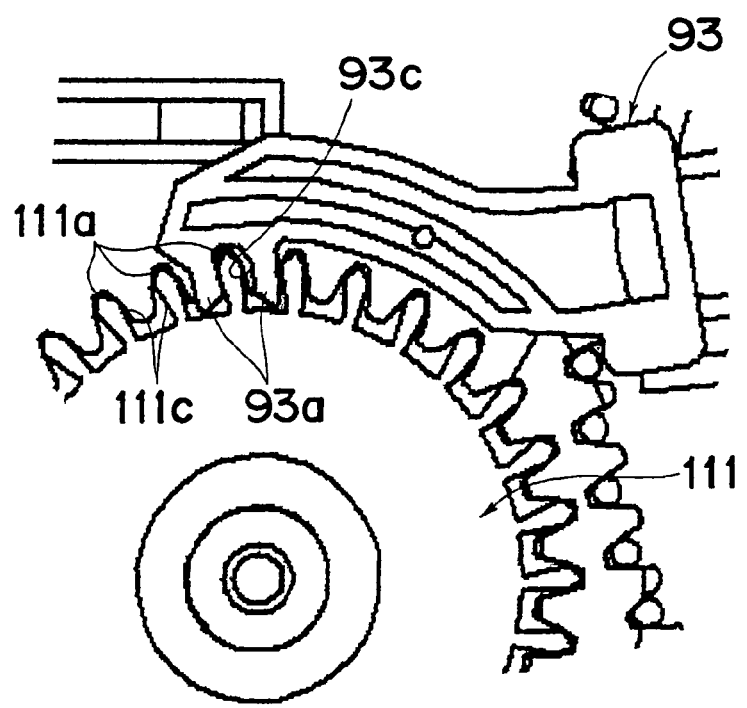

FIGS. 51(a) and 51(b) are perspective views showing a first lock lever 93 and a second play gear 111 in a locking condition. A hook portion 93a of the first lock lever 93 engages with a gear tooth 111a of the second play gear 111 to lock the tray play/stock gear train. A taper profile 93c on the hook portion 93a of the first lock lever 93 and a taper profile 111c on the gear tooth 111a of the second play gear 111 create an interlocking effect. These configurations provide a strong locking condition to the tray play/stock system gear train.

Figure 52A:
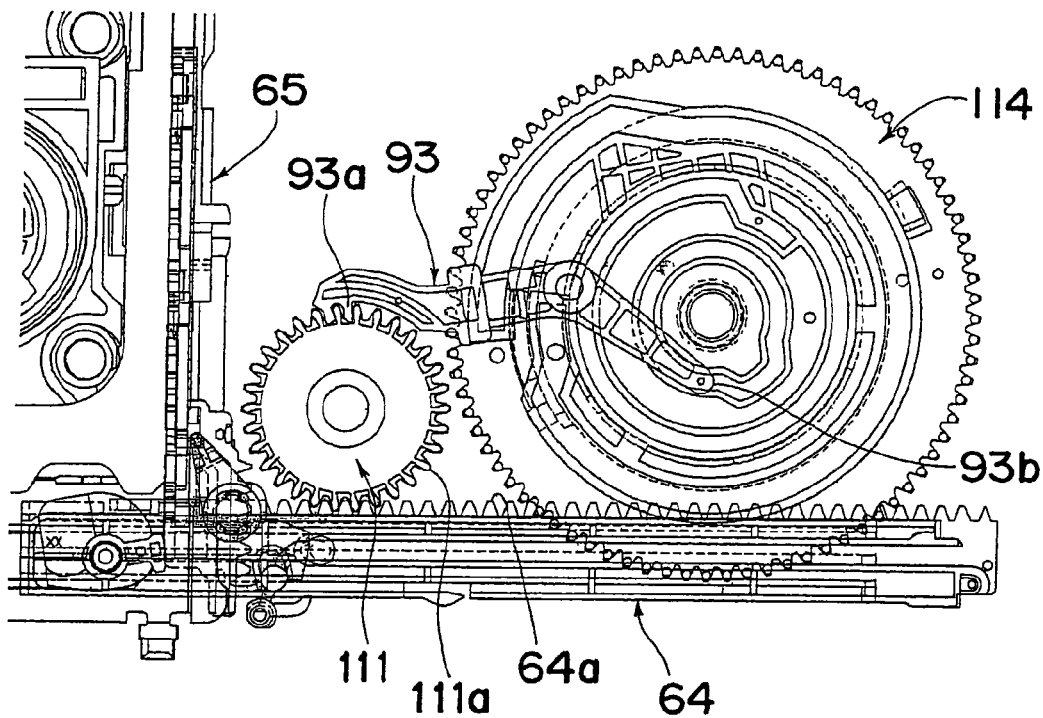
FIGS. 52(a) and 52(b) are a plan view and a perspective view showing a first lock lever 93 as a locking device.
Figure 52B:
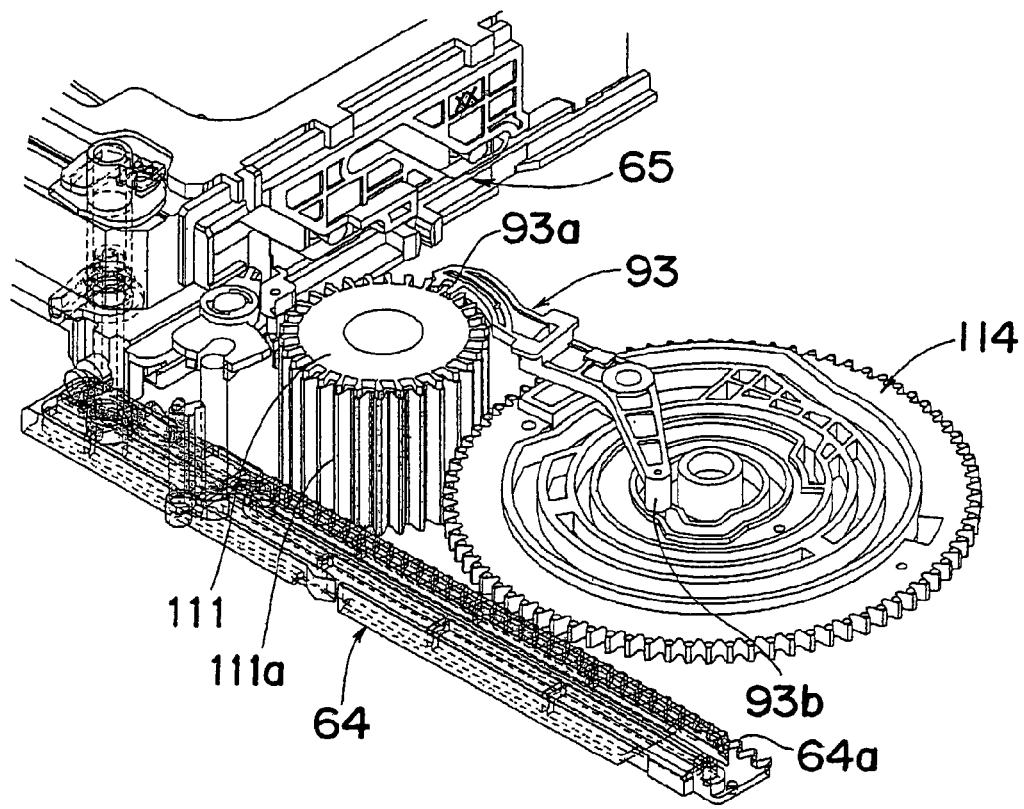

FIGS. 52(a) and 52(b) are a plan view and a perspective view showing the first lock lever 93 as a locking device of the disc changer 1 in two conditions. These drawings show the first lock lever 93 in a state where a hook portion 93a of the first lock lever 93 engages with a gear tooth 111a of a second play gear 111, thereby locking the second play gear 111. At this time, gear teeth 111a are engaged with a rack gear 64a of a tray drive rack 64. This condition will happen when the tray drive rack 64 is at standby position Y and no trays T are at disc recording/reproducing position Z.

Figure 53A:
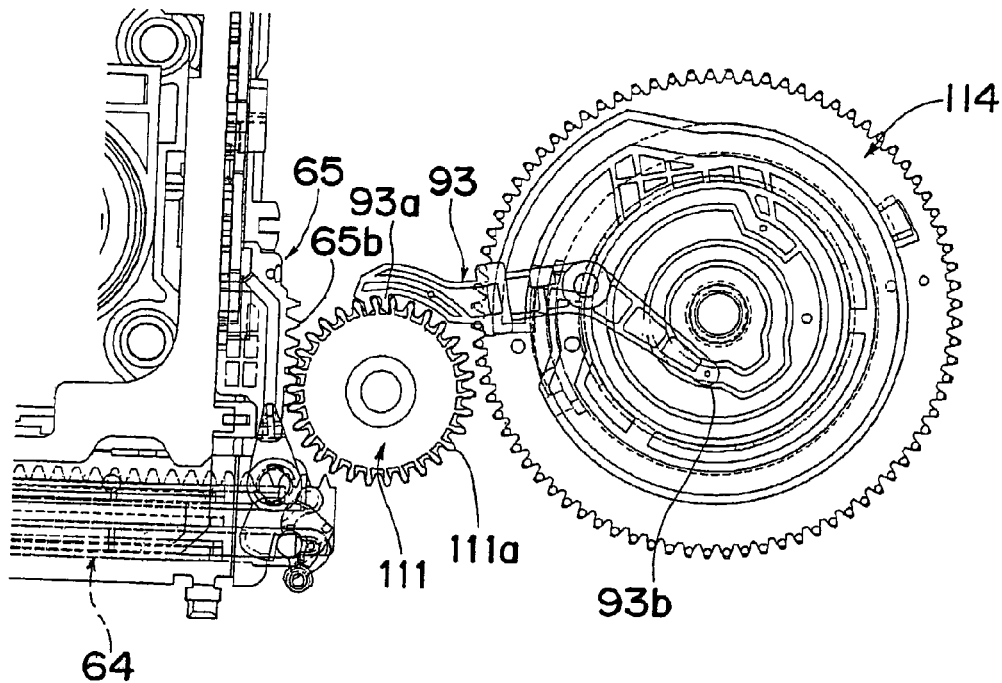
FIGS. 53(a) and 53(b) are a plan view and a perspective view showing the first lock lever.
Figure 53B:
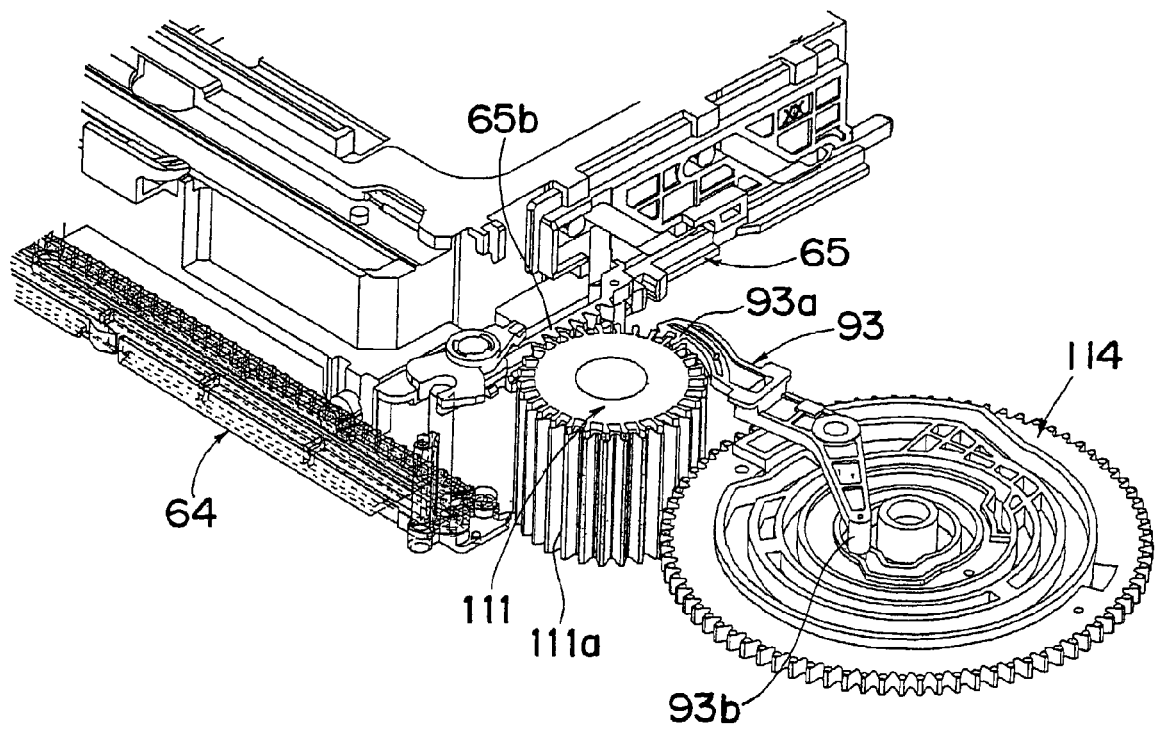

FIGS. 53(a) and 53(b) are a plan view and a perspective view showing the first lock lever 93. These drawings also show the first lock lever 93 in a state where a hook portion 93a of the first lock lever 93 engages with a gear tooth 111a of the second play gear 111, thereby locking the second play gear 111. At this time, gear teeth 111a engage a rack gear 65a of a transverse slide plate 65. This condition will happen when the tray drive rack 64 drives a tray T to the disc recording/reproducing position Z and the transverse slide plate 65 moves to clamp the disc to conduct disc recording/reproducing.

Figure 54A:
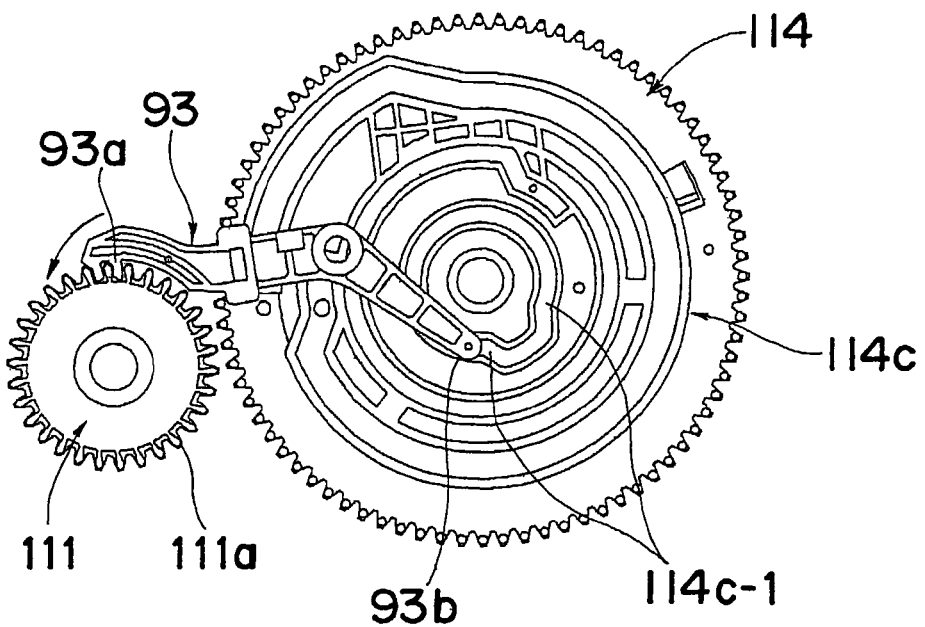
FIG. 54(a) is a plan view showing a locking condition of the first lock lever.
Figure 54B:
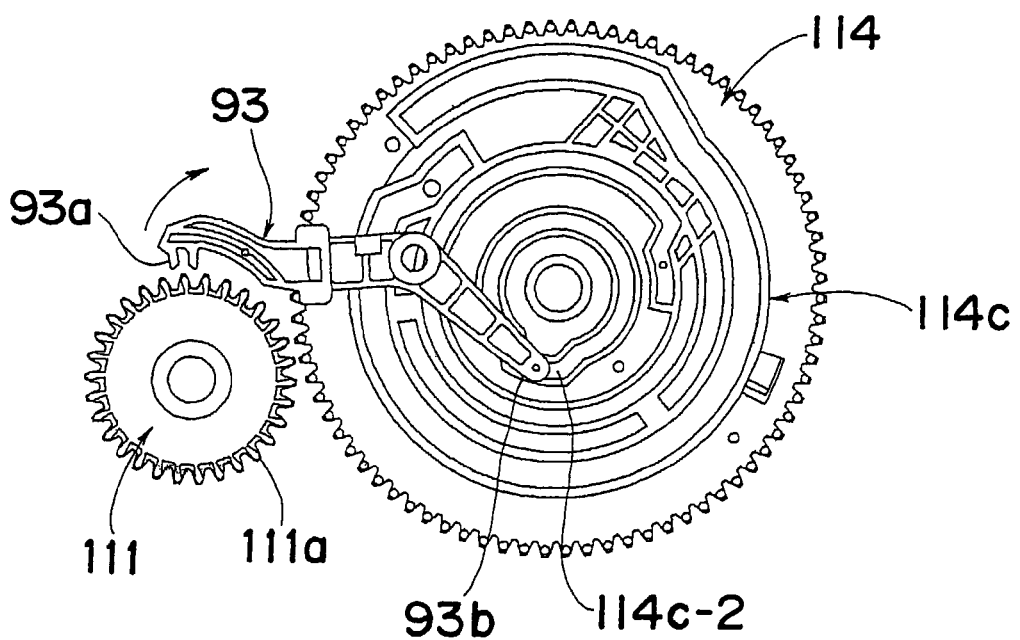
FIG. 54(b) is a plan view showing an unlocking condition of the first lock lever.

FIG. 54(a) is a plan view showing a locking state of the first lock lever 93. In this condition, a boss 93b of the first lock lever 93 fits into a cam gear groove 114c located in a first range 114c-1 of the cam gear groove 114c where the first lock lever 93 is directed to rotate in a lock direction. FIG. 54(b) is a plan view showing an unlocking condition of the first lock lever 93. In this condition, the boss 93b is located at a second position 114c-2 of the cam gear groove 114c where the first lock lever 93 is directed to rotate in an unlock direction. There is only one portion 114c-2 on cam gear groove 114c, where the same position is used to change the state of function lever 125.

Figure 55:
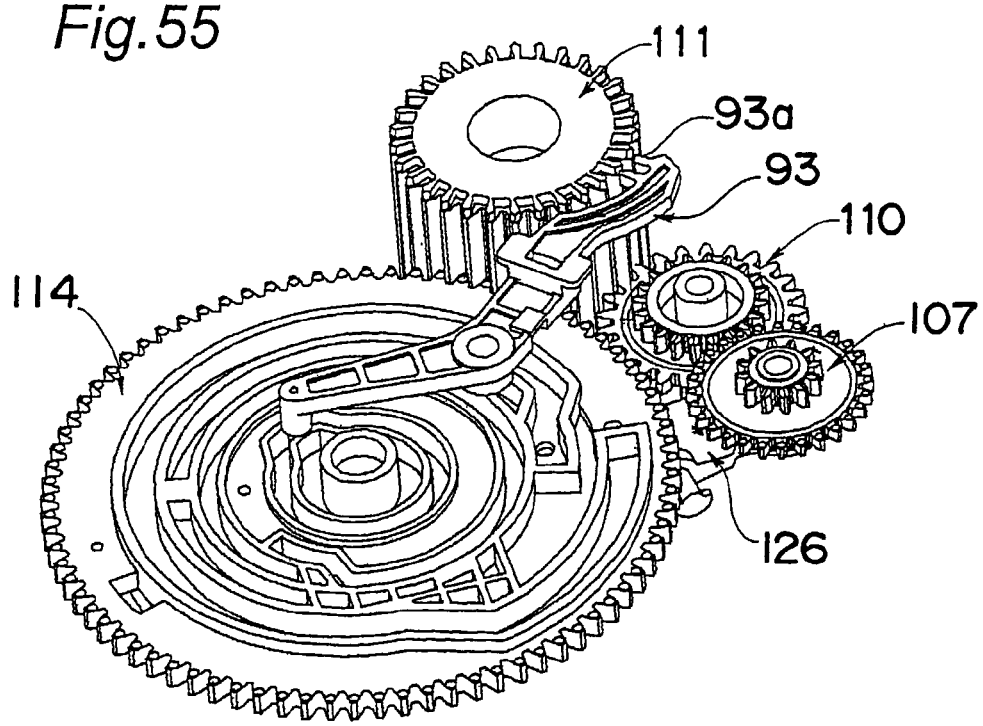
FIG. 55 is a perspective view showing a condition where the cam gear rotates to a position for unlocking the first lock lever.

FIG. 55 is a perspective view showing a state of the locking system in which the cam gear 114 rotates to a position for unlocking the first lock lever 93. In this state, the position of a function lever 125 is changed in order to drive a gear train of a tray play/stock system (a tray driving rack unit).

Figure 56:
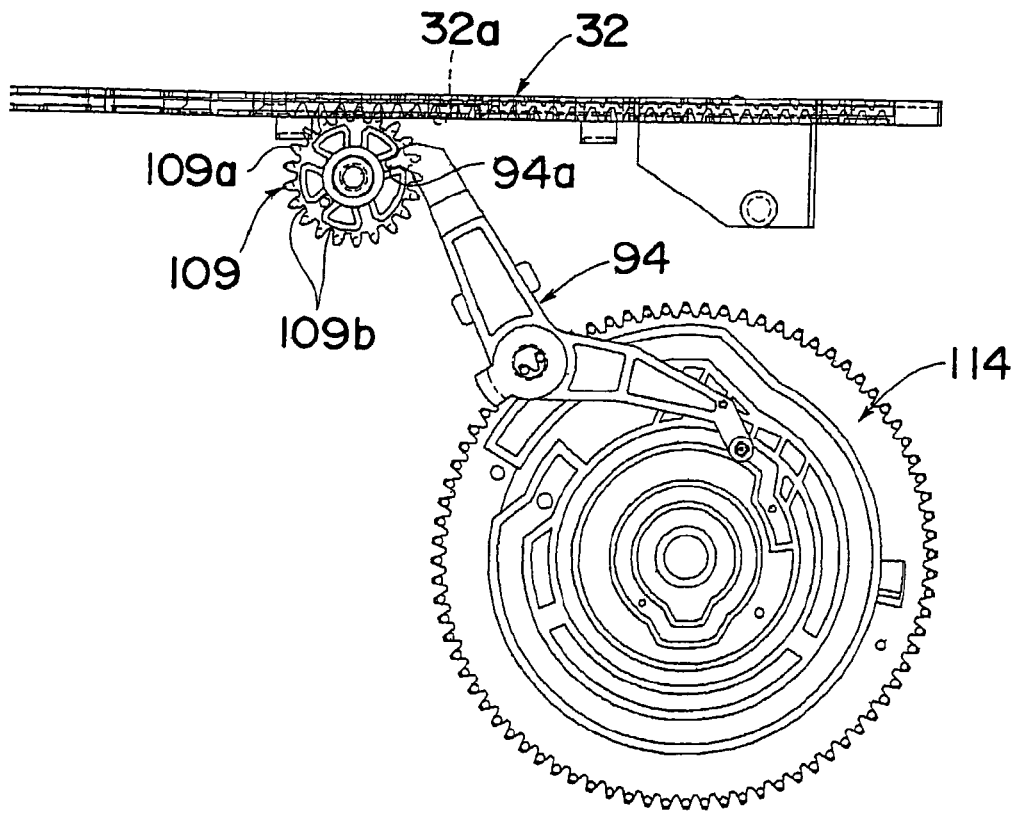
FIG. 56 is a plan view showing a second lock lever as a locking device in the changer mechanism.

FIG. 56 is a plan view showing a second lock lever 94 as a locking device in the disc changer 1. In the state shown in FIG. 56, a protruded portion 94a of the second lock lever 94 engages a locking profile 109b of a second UD gear and locks the second UD gear 109. At this time, gear teeth 109a engage a rack gear 32b of UD rack 32. This condition will happen after the recording/reproducing section 70 complete the up/down movement to select a tray T for driving to the recording/reproducing position Z.

Figure 57:
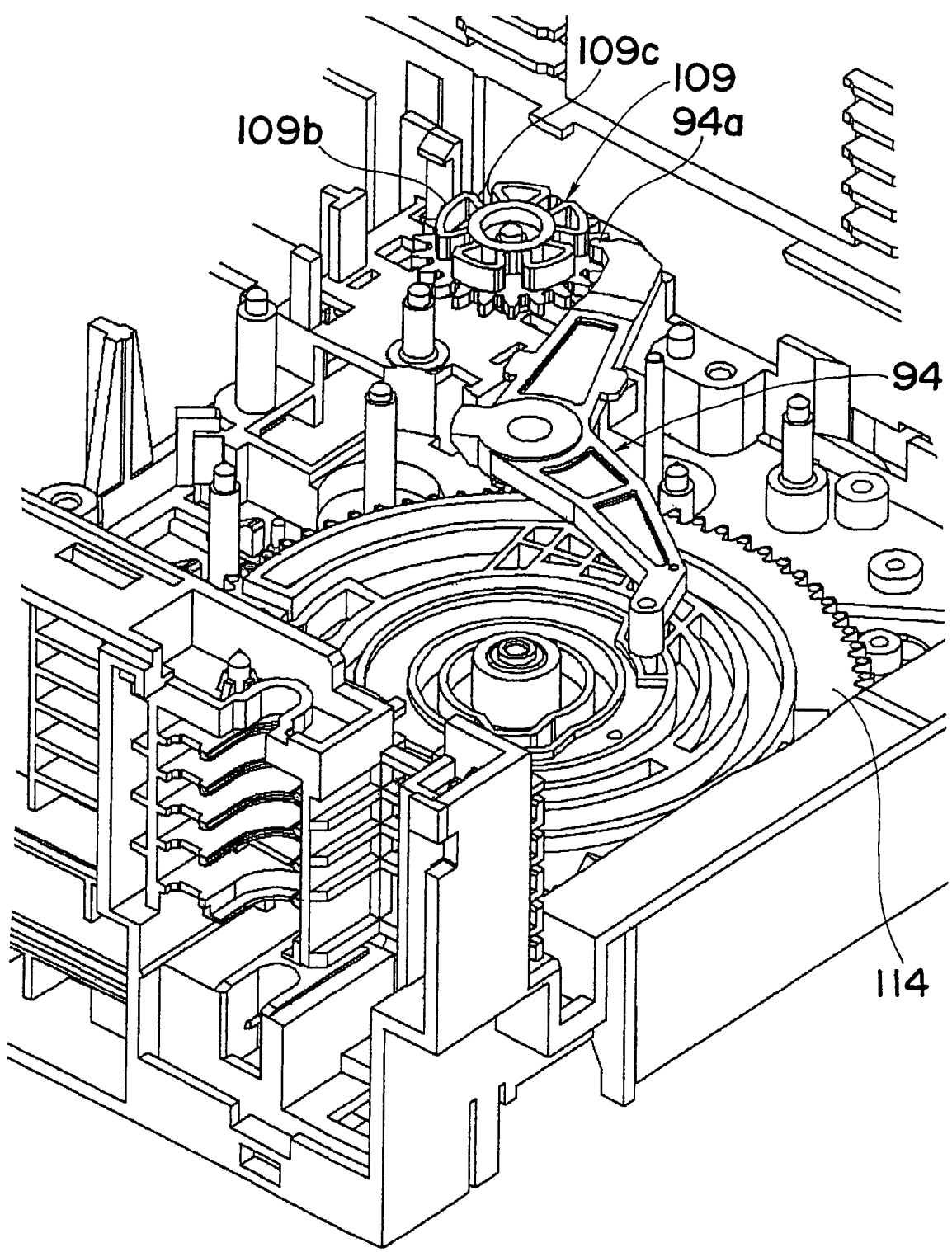
FIG. 57 is a perspective view showing a second lock lever and a second UD gear in an unlock condition.

FIG. 57 is a perspective view showing the second lock lever 94 and the second UD gear 109 in an unlocked condition. A protruded portion 94a of the second lock lever 94 enters into a locking profile 109b of the second UD gear 109 to lock the elevation gear train. The second UD gear 109 has a taper portion 109c for reliable engagement with the protruded portion 94a of the second lock lever 94 and alignment of the second UD gear 109.

FIG. 58(a) is a plan view showing a locking state of the second lock lever 94. In this state, a boss 94b of the second lock lever 94 fits into a cam gear groove 114d located at a first range 114d-1 of the cam gear groove 114d where the second lock lever 94 is directed to rotate in a lock direction. FIG. 58(b) is a plan view showing an unlocking state of the second lock lever 94. In this state, the boss 94b is located at a second position 114d-2 of the cam gear groove 114d where the second lock lever 94 is directed to rotate in an unlock direction. There is only one portion 114d-2 on cam gear groove 114d, where the same position is used to change the state of function lever 125.

Figure 59:
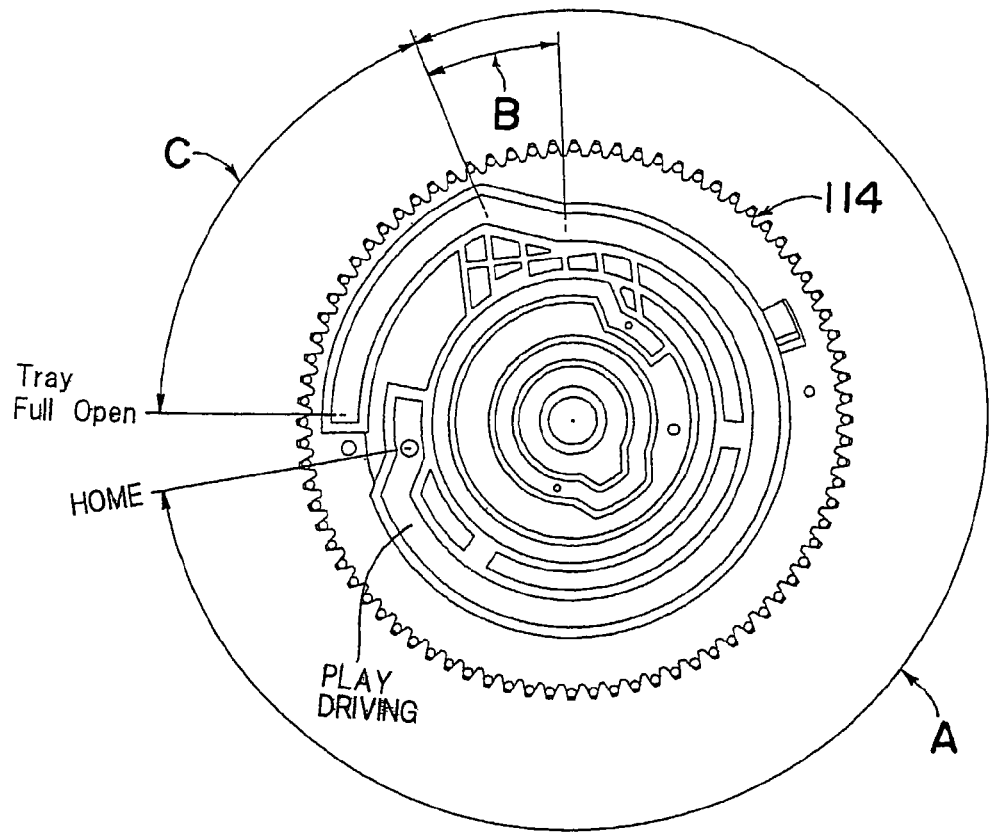
FIG. 59 is a plan view of a cam gear explaining an operation thereof when it rotates in a clockwise and a counter-clockwise direction.

FIG. 59 is a plan view of a cam gear 114 explaining an operation thereof when it rotates in a clockwise and a counterclockwise direction. Rotational motion of the cam gear 114 starts from a HOME position, and the cam gear 114 will rotate in a clock-wise direction to RESET the tray driving gear unit 20 in position A. The trays T do not move during this operation. From the HOME position, the cam gear 114 rotates in the clockwise direction to a PLAY DRIVING position to change the level of function lever 126 from a level for engaging to a first UD gear 108 to a level for engaging a first PLAY gear 110. From the PLAY DRIVING position to the HOME position, the operation is reversed. In a range of positions B, the trigger slide plate 52 triggers the trays T to engage to the tray driving gear unit 20. And in a range of positions C, trays T are driven to the disc exchange position X. When the cam gear 114 rotates in a counter-clockwisedirection, the tray T1 is first driven to the disc standby position Y in the range of positions C, and it will be followed by trays T2 to T5 in order.

Figure 60:
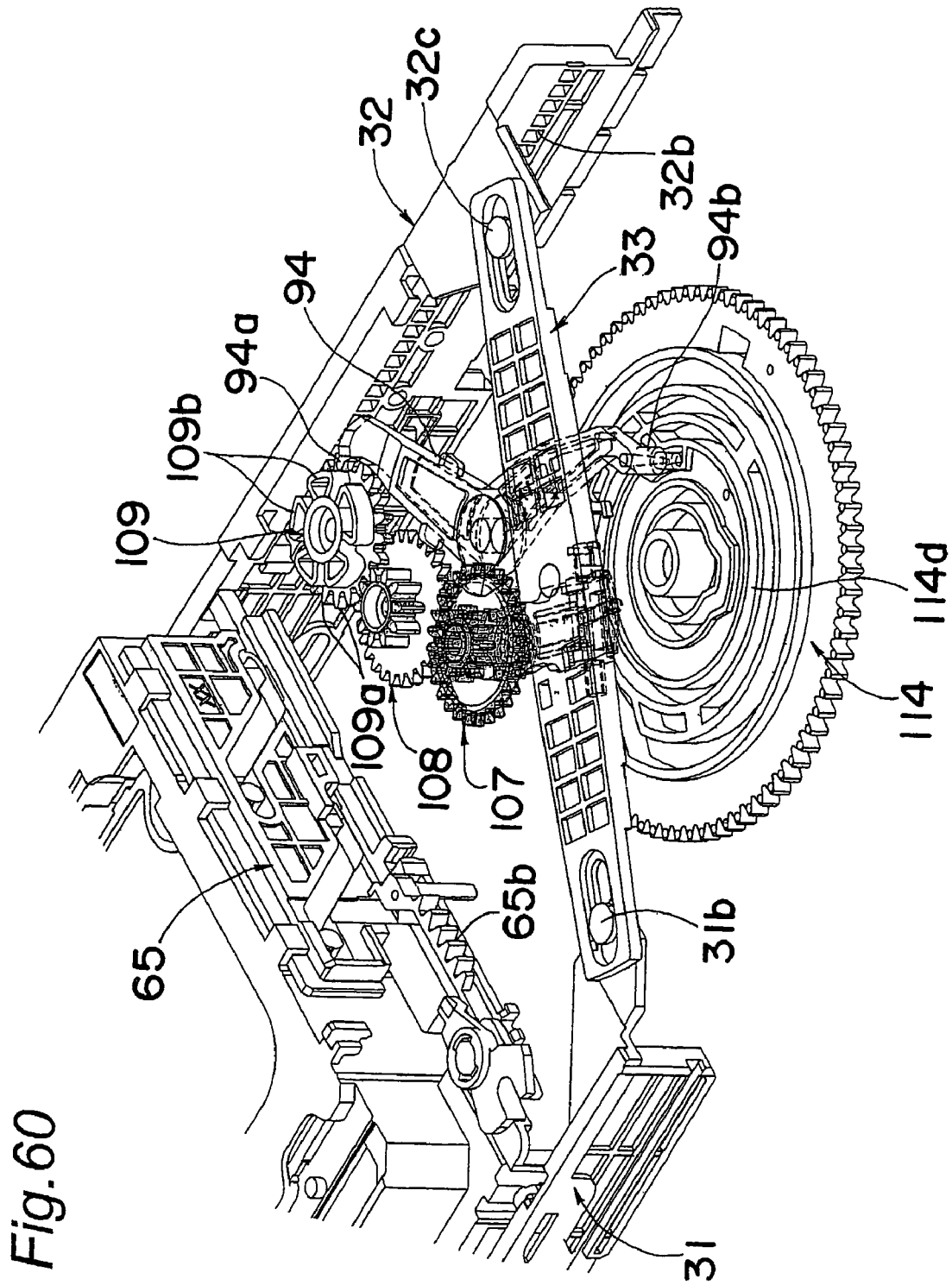
FIG. 60 is a perspective view show a condition where the cam gear is rotated to a position for unlocking the second lock lever.

FIG. 60 is a perspective view showing a state in which the cam gear 114 is rotated to a position for unlocking the second lock lever 94. In this state, a position of the function lever 126 is changed in order to drive the gear train of elevation system (elevation unit).

Figure 61:
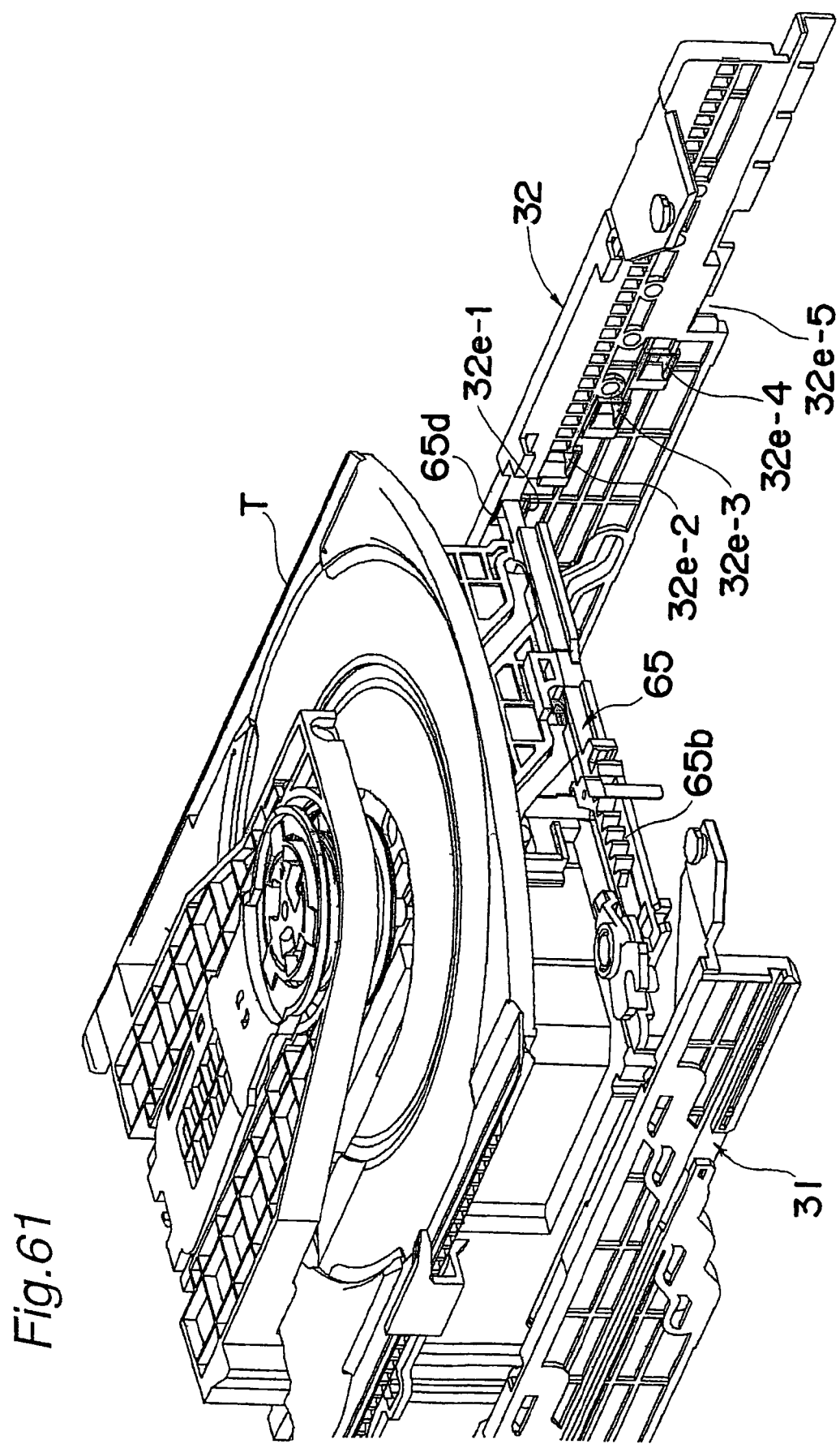
FIG. 61 is a perspective view showing another locking system that prevents a movement of the recording/reproducing section when one of the tray is at the recording/reproducing position.

FIG. 61 is a perspective view showing another locking system that prevents a movement of the recording/reproducing section 70 when one of the trays T is at the recording/reproducing position Z. The locking system can protect the disc changer 1 from external shock and vibration if there is an illegal power off during a recording/reproducing operation. At the right side of transverse slide plate 65, there is provided a pin 65d which is capable of going into any of holes 32e-1 to 32e-5 of the UD rack 32. The holes 32e-1 to 32e-5 correspond respectively to the recording/reproducing positions that align tray T1 to tray T5. With this configuration, recording/reproducing is locked at a current recording/reproducing tray T position.

FIG. 62 is a locking system summary table for the recording/reproducing section 70. At all times, there is a lock system that is activated to lock the recording/reproducing section 70.

According to the configuration of the preferred embodiment of the invention, the tray driving gear unit 20 is capable of driving the trays T from the standby position Y to the disc exchange position X with an all-at-once operation. At this time all tray driving gears of the tray driving gear unit 20 rotate in a tray opening direction as one solid gear for driving the plurality of trays T. Further, when the tray driving gear unit 20 rotates in an opposite direction the trays T are driven one by one from the top tray to the bottom tray. Thus, it is possible to eject all trays T at once, and exchange all discs D from the top tray to the bottom tray. This simplifies the operation of exchanging all discs D in the disc changer 1. While all the trays T are protruding, all the discs D can be checked, and exchanged if necessary. The same tray driving gear unit 20 is commonly used for both shuttling the trays T between the standby position Y and the disc exchange position X and disc checking function, thereby it is possible to simplify the design of the tray driving gear unit 20, simplify the disc changer operation, shorten the changing time and reduce the possibility of tray jams.

Further, according to the embodiment, the tray driving gear unit 20 is capable of driving all trays T other than a tray T1 above the recording/reproducing unit 70 from the standby position Y to the disc exchange position X with an all-at-once operation. At this time all tray driving gears of the tray driving gear unit 20 rotate in a tray opening direction as one solid gear for driving all trays T except the tray at the recording/reproduction position since that tray is not triggered by the trigger slide plate. Further, when the tray driving unit 20 rotates in an opposite direction the trays T are driven one by one from the top tray to the bottom tray. Thus, it is possible to eject all trays T other than a tray T above the recording/reproducing unit 70 at once, and exchange all discs D other than the disc D on the tray T above the recording/reproducing unit 70 from top tray to bottom tray. This simplifies the sequence for exchanging all discs D other than this tray T above the recording/reproducing unit 70 in the disc changer 1. While all but one of the trays T are protruding, all the discs D on those trays T can be checked. The same tray driving gear unit 20 can be commonly used for both shuttling the trays T between the standby position Y and the disc exchange position X and disc checking function, thereby it is possible to simplify the design of the tray driving gear unit 20, simplify the disc changer 1 operation, shorten the changing time and reduce the possibility of tray jams.

Furthermore, according to the embodiment, the tray driving gear unit 20 has a series of tray drive gears and can rotate to the RESET condition, and the trays T at the standby position Y are engage with the tray driving gear unit 20 by the tray triggering unit 50 after the tray driving gear unit 20 rotates to RESET condition. Thus, for each exchange of the disc D, the trays T protrude to the disc exchange position X and return to the standby position Y one by one from top to bottom. This simplifies the operation of exchanging all discs D, since it is possible to put a disc D onto any of the empty tray T without opening the trays one by one.

Still further, according to the embodiment, the tray drive gears (including top tray drive gear 24, tray drive gear 22 and bottom tray drive gear 25) are separated from the shaft gear body (made up of the shaft gear 21 and the shaft 21s), therefore the tray driving gear unit 20 can be manufactured much more easily in comparison with a prior art body construction.

Still further, according to the embodiment, the tray drive gears are separate from the shaft gear body, therefore the tray driving gear unit can be manufactured much more easily in comparison with one body construction. Further, a top level tray drive gear fixed to the shaft gear body rotates as one body therewith at all times, and the rotational movement of the top level tray drive gear is transferred to the lower level drive gear through the stopper ribs thereof. Thus, all tray drive gears are driven to rotate one by one through the stopper ribs.

Still further, according to the embodiment, the additional rotation is provided to each tray drive gear by at least one spacer ring 23 placed between two tray drive gears adjacent to each other. The spacer ring 23 can acts as a dummy gear in the rotational movement of the tray driving gear unit 20, and can reduce the size of the tray drive gear, because, in a case that the tray driving gear unit 20 does not have a spacer ring 23, the drive gear pitch diameter needs to provide a total circumference equivalent to a total stroke for one complete rotation, and this increases the diameter of the tray drive gear.

Still further, according to the embodiment, an upper level tray drive gear's stopper rib pushes a lower level tray drive gear's stopper rib, through the spacer ring's stopper ribs, in a rotational direction of the upper level tray drive gear, and the lower level tray drive gear is forced to rotate in the rotational direction of the upper level tray drive gear. Thus, the rotational movement of the top level tray drive gear is transferred to the lower level drive gear through the stopper ribs, and all tray drive gears are driven to rotate one by one through the stopper ribs. Specifically, the size in a rotational direction of the stopper ribs is designed to equivalent to a multiple of gear teeth pitching angle, therefore the stopper ribs can contact to each other in a more stable way.

Still further, according to the embodiment, it is possible to provide the tray driving gear unit 20 with a dummy turn which is equivalent to the total stroke for moving a tray from the disc exchange position to the standby position, thereby the size of the tray drive gear can be reduced.

Still further, according to the embodiment, the first gear tooth of the tray's gear rack has a shape profile for easy engagement of trays T to tray driving gear unit 20 after triggered by the tray triggering unit 50.

Still further, according to the embodiment, owing to the shape profile of the first gear tooth of the tray's gear rack, the tray's gear rack can be easily engaged with the tray driving gear unit 20 after it is triggered by the tray triggering unit 50. Thereby, the tray T can start to move smoothly by the tray driving gear unit 20.

Furthermore, according to the preferred embodiment, the triggering slide plate 52 in the disc changer is controlled and activated by the cam slot of the cam gear 114, where the cam gear 114 is also used for driving trays. The triggering slide plate 52 pushes against tray lock lever 53 and provides a strong stable lock to all the trays T at standby position Y. When the cam gear 114 rotates in a tray T opening direction, the triggering slide plate 52 moves and the lock/unlock profile on the plate will push against the tray lock lever 53 in the unlock direction, at the same time trigger profiles on the plate bend follow the slot on mechanical chassis 3 to push trays T move forward. Thus, it is possible to common use a triggering slide plate 52 to open and lock trays T. The time for tray T unlocking is short as the triggering slide plate 53 unlocks trays T just before pushing the trays to engage the tray driving gears. This minimizes the tray T unlocking period before each tray T is driven.

As the triggering slide plate 50 is being moved forward, the trigger profile on the flexible ribs of triggering slide plate 50 will overlap with the trays trigger rib, and push the trays toward the disc exchange position X. This creates an advantage that the trays T are largely separated in the standby position Y, not linked to any other part than the housing and the locking profile. This prevents any problem if the positions of the trays T are slightly shifted at the shipment position. Upon, being triggered and pushed, the trays T can engaged with the tray driving gears for further transfer of trays T to the disc exchange position X or there can be a purely pushing action by triggering slide plate 52 itself if the stroke allows for the trays T to move from standby position Y to disc exchange position X. This creates another advantage for the flexibility in creating various options of tray driving system.

Further, according to the embodiment, the triggering slide plate's trigger profile bend follows the cam profile on mechanical chassis 3. The profile changes while it moves from rear to front of the disc changer 1. The profile contacts the trigger rib on trays T at the trays trigger zone, trays T then being pushed forward to engage the tray driving gear unit 20. The trigger profile is formed on the triggering slide plate 52 as one body to reduce cost, and the trigger profile is more flexible to be bent and to withstand the trays triggering force. Pitching between the tray trigger rib and the triggering slide plate trigger lever profile can be controlled accurately.

In the embodiment, the guide slots on the mechanical chassis 3 can be arranged to have various heights and slopes. As the triggering slide plate 52 is being moved from standby position Y or shipment position to the front, before the disc exchange position X, the cam profile on triggering slide plate 52 is moved to the front and away from the tray lock lever's flexible ribs. The tray lock lever's lock profile will provide an interlock effect with the trays T. Triggering slide plate lock/unlock profile pushes against the lock lever profile to get a better locking effect at shipment condition. The plastic spring on the lock lever pushes against mechanical chassis 3 wall to provide a temporary locking effect to trays T while the trays T are entering from disc exchange position X to standby position Y.

Further, tray unlock period is minimized and the lock is immediate after each tray T is moved to standby position Y. The interlocking effect of trays T can achieve the most effective locking result. When the tray T moves in the forward direction, the tray lock lever 53 rotates in the locking direction and creates more locking force. In the shipment lock condition, the tray lock lever 53 is not able to move as the triggering slide plate lock profile minimizes the free play gap for tray lock lever 53. So this only allows the trays T to move backwards into disc recording/reproducing position Z and prevents them from moving in the forward direction unless by means of pushing by the triggering slide plate 52.

Furthermore, the tray lock lever 53 is linked by plastic linkage to create a joining part that can rotate by itself without interfering with the other levers while tray T passes over the lever to the stocking position. Tray lock lever 53 with plastic linkage joins the separate levers into one part for cost reduction and simplifies the mounting process. Tray lock lever 53 can act as separate 5 parts where the rotation of each lever does not affect the other lever.

Industrial Applicability

The present invention is applicable to a disc changer, particularly to a disc changer that stores a plurality of discs therein, transports a disc selected from a plurality of discs, and performs recording and/or reproducing information signal on the disc.

The invention claimed is:

1. A disc changer for storing a plurality of discs, transporting a disc selected from the plurality of discs, and performing recording/reproducing of an information signal on the disc, the disc changer comprising:
    a plurality of trays which respectively can be loaded with discs, can be moved substantially in a horizontal direction parallel to main surfaces of the discs, and are stacked substantially in a vertical direction perpendicular to the main surfaces of the discs;
    a tray driving gear unit which has a plurality of driving gears capable of respectively engaging with a rack provided on each tray, such that the tray driving gear unit is capable of shuttling the trays between a standby position in which the trays are stored in a mechanical chassis as a housing of the disc changer and a disc exchange position in which the trays are protruded outward from the mechanical chassis such that the discs can be put on the trays and removed from the trays;
    a gear driving mechanism driven by an electrical motor to generate a driving force for driving the tray driving gear unit;
    a tray triggering unit capable of locking/unlocking the trays in the standby position, the tray triggering unit being capable of pushing all trays at a same time so as to engage the rack provided on each tray with a respective driving gear of the tray driving gear unit after unlocking the trays;
    a recording/reproducing unit for recording and/or reproducing an information signal on a disc placed on a turntable; and
    an elevation unit capable of moving the recording/reproducing unit with the turntable in the vertical direction to align the recording/reproducing unit to a tray and place a disc on the tray onto the turntable,
    wherein the tray driving gear unit is configured such that, in a tray opening operation, the rack provided on each tray is engaged with a respective driving gear as the trays are pushed by the tray triggering unit, and all driving gears are driven at a same time as one body such that the tray driving gear unit moves all trays to protrude outward from the mechanical chassis to the disc exchange position at a same time, and wherein the tray driving gear unit is configured to, in a tray closing operation, individually and sequentially move the driving gears engaged with the respective racks from top to bottom, such that the tray driving gear unit is capable of individually and sequentially driving the trays from the disc exchange position to the standby position from top to bottom in the tray closing operation, whereby each disc on a topmost tray exists at the disc exchange position in the tray closing operation such that the disc on the topmost tray can be checked until the topmost tray is closed.

2. A disc changer for storing a plurality of discs, transporting a disc selected from the plurality of discs, and performing recording/reproducing of an information signal on the disc, the disc changer comprising:

a plurality of trays which respectively can be loaded with discs, can be moved substantially in a horizontal direction parallel to main surfaces of the discs, and are stacked substantially in a vertical direction perpendicular to the main surfaces of the discs;

a tray driving gear unit which has a plurality of driving gears capable of respectively engaging with a rack provided on each tray, such that the tray driving gear unit is capable of shuttling the trays between a standby position in which the trays are stored in a mechanical chassis as a housing of the disc changer and a disc exchange position in which the trays are protruded outward from the mechanical chassis such that the discs can be put on the trays and removed from the trays;

a gear driving mechanism driven by an electrical motor to generate a driving force for driving the tray driving gear unit;

a tray triggering unit capable of locking/unlocking the trays in the standby position, the tray triggering unit being capable of pushing all trays at a same time so as to engage the rack provided on each tray with a respective driving gear of the tray driving gear unit after unlocking the trays;

a recording/reproducing unit for recording and/or reproducing an information signal on a disc placed on a turntable; and an elevation unit capable of moving the recording/reproducing unit with the turntable in the vertical direction to align the recording/reproducing unit to a tray and place a disc on the tray onto the turntable, wherein the tray driving gear unit is configured such that, in a tray opening operation, the rack provided on each tray is engaged with a respective driving gear as the trays other than a tray above the recording/reproducing unit are pushed by the tray triggering unit, and all driving gears are driven at a same time as one body such that the tray driving gear unit moves all trays other than the tray above the recording/reproducing unit to protrude outward from the mechanical chassis to the disc exchange position at a same time, and wherein the tray driving gear unit is configured to, in a tray closing operation, individually and sequentially move the driving gears engaged with the respective racks from top to bottom, such that the tray driving gear unit is capable of individually and sequentially driving the trays other than the tray above the recording/reproducing unit from the disc exchange position to the standby position from top to bottom in the tray closing operation, whereby each disc on a topmost tray exists at the disc exchange position in the tray closing operation such that the disc on the topmost tray can be checked until the topmost tray is closed.

3. A disc changer for storing a plurality of discs, transporting a disc selected from the plurality of discs, and performing recording/reproducing of an information signal on the disc, the disc changer comprising:

a plurality of trays which respectively can be loaded with discs, can be moved substantially in a horizontal direction parallel to main surfaces of the discs, and are stacked substantially in a vertical direction perpendicular to the main surfaces of the discs;

a tray driving gear unit which has a plurality of driving gears capable of respectively engaging with a rack provided on each tray, such that the tray driving gear unit is capable of shuttling the trays between a standby position in which the trays are stored in a mechanical chassis as a housing of the disc changer and a disc exchange position in which the trays are protruded outward from the mechanical chassis such that the discs can be put on the trays and removed from the trays;

a gear driving mechanism driven by an electrical motor to generate a driving force for driving the tray driving gear unit;

a tray triggering unit capable of locking/unlocking the trays in the standby position, the tray triggering unit being capable of pushing all trays at a same time so as to engage the rack provided on each tray with a respective driving gear of the tray driving gear unit after unlocking the trays;

a recording/reproducing unit for recording and/or reproducing an information signal on a disc placed on a turntable; and an elevation unit capable of moving the recording/reproducing unit with the turntable in the vertical direction to align the recording/reproducing unit to a tray and place a disc on the tray onto the turntable, wherein the tray driving gear unit and the tray triggering unit are configured such that, in a tray opening operation, the tray driving gear unit rotates to RESET condition in which all driving gears can rotate in a same direction all at once as one body, the trays at the standby position not being engaged with the tray driving gear unit after the tray driving gear unit rotates to RESET condition, the tray triggering unit moves and pushes the trays to engage with the respective driving gears of the tray driving gear unit, and all driving gears are driven at a same time as one body so as to drive the trays to the disc exchange position at a same time, and wherein the tray driving gear unit is configured to, in a tray closing operation, individually and sequentially move the driving gears engaged with the respective racks of the trays from top to bottom so as to individually and sequentially move the trays from the disc exchange position to the standby position from top to bottom.

4. A disc changer according to claim 3, wherein the tray driving gear unit is provided with a shaft gear body, comprising a shaft gear connected to a driving source and a shaft on which the driving gears are mounted and stacked in a laminated manner, and each tray is driven by a single driving gear.

5. A disc changer according to claim 3, wherein the tray driving gear unit is provided with a shaft gear body, comprising a shaft gear connected to a driving source and a shaft on which the driving gears are mounted and stacked in a laminated manner, wherein a top level driving gear is fixed to the shaft gear body and rotates as one body therewith at all times, and wherein each driving gear has a rib profile with a stopper rib extending parallel to an axis of the shaft by a predetermined amount, such that when the stopper rib of an upper level driving gear pushes to the stopper rib of a lower level driving gear in a rotational direction of the upper level driving gear, the lower level driving gear is forced to rotate in the rotational direction of the upper level driving gear.

6. A disc changer according to claim 5, wherein at least one spacer ring is provided between two driving gears adjacent to each other, such that the spacer ring allows the upper level driving gear to have an additional rotation before it drives the lower level driving gear, and thereby the additional rotation is provided to each driving gear.

7. A disc changer according to claim 6, wherein the at least one spacer ring has stopper ribs which are the same as the stopper ribs of the driving gears, the size in a rotational direction of the stopper ribs is designed to be equivalent to a multiple of gear teeth pitching angle, and the teeth of the driving gears align after all stopper ribs contact each other, and thereby all the driving gears can be driven to move all trays to the disc exchange position evenly.

8. A disc changer according to claim 7, wherein a total rotational stroke of a driving gear before a lower level driving gear starts to rotate is equivalent to a total stroke for moving a tray from the disc exchange position to the standby position.

* * * * *

UNITED STATES PATENT AND TRADEMARK OFFICE
CERTIFICATE OF CORRECTION

PATENT NO.        : 8,127,317 B2
APPLICATION NO.   : 12/090690
DATED             : February 28, 2012
INVENTOR(S)       : Chi Wei Lee et al.

It is certified that error appears in the above-identified patent and that said Letters Patent is hereby corrected as shown below:

In item (73) Assignee, please add the second Assignee as follows:
--Panasonic AVC Networks Singapore Pte. Ltd., Singapore, Singapore--

Signed and Sealed this
Second Day of October, 2012

David J. Kappos
*Director of the United States Patent and Trademark Office*